(12) United States Patent
Cuong et al.

(10) Patent No.: US 12,109,900 B2
(45) Date of Patent: Oct. 8, 2024

(54) ROBOTIC MOWER WITH INTEGRATED ASSEMBLIES

(71) Applicants: Bui Van Cuong, Changzhou (CN); Wanghao Li, Changzhou (CN); Jie Gao, Changzhou (CN); Jin Cao, Changzhou (CN); Zhigao Pu, Changzhou (CN); Huage Wang, Changzhou (CN); Xian Zhuang, Changzhou (CN); Zhiyuan Li, Changzhou (CN); Yupu Zhou, Changzhou (CN); Stefan Strandberg, Jönköping (SE)

(72) Inventors: Bui Van Cuong, Changzhou (CN); Wanghao Li, Changzhou (CN); Jie Gao, Changzhou (CN); Jin Cao, Changzhou (CN); Zhigao Pu, Changzhou (CN); Huage Wang, Changzhou (CN); Xian Zhuang, Changzhou (CN); Zhiyuan Li, Changzhou (CN); Yupu Zhou, Changzhou (CN); Stefan Strandberg, Jönköping (SE)

(73) Assignee: Globe (Jiangsu) Co., Ltd., Changzhou (CN)

( * ) Notice: Subject to any disclaimer, the term of this patent is extended or adjusted under 35 U.S.C. 154(b) by 809 days.

(21) Appl. No.: 17/218,188

(22) Filed: Mar. 31, 2021

(65) Prior Publication Data

US 2021/0329841 A1 Oct. 28, 2021

(30) Foreign Application Priority Data

Mar. 31, 2020 (CN) .......................... 202020441934.X
Apr. 30, 2020 (CN) .......................... 202020701949.5

(Continued)

(51) Int. Cl.
*B60L 53/16* (2019.01)
*A01D 69/02* (2006.01)
(Continued)

(52) U.S. Cl.
CPC .............. *B60L 53/16* (2019.02); *A01D 69/02* (2013.01); *H02J 7/0042* (2013.01);
(Continued)

(58) Field of Classification Search
CPC .. B60B 7/04; B60B 7/18; B60L 53/16; G01V 3/02; H02J 7/0042; H02J 7/0045;
(Continued)

(56) References Cited

U.S. PATENT DOCUMENTS 5,113,642 A 5/1992 Dunn
9,241,441 B2 * 1/2016 Björn ................. H01H 36/0066
(Continued)

FOREIGN PATENT DOCUMENTS

CA 2924304 C * 6/2019 ............. B60L 53/14
CN 107046942 A * 8/2017 ............. A01D 69/08
(Continued)

*Primary Examiner* — Arpad Fabian-Kovacs

(57) ABSTRACT

A mower is provided and includes: a case; a charging circuit provided in the case, and a combination of a wheel assembly and a charging interface assembly arranged on the case. The combination is electrically connected to the charging circuit. The combination includes: a wheel assembly; and a charging interface assembly electrically connected to the charging circuit. The wheel assembly and the charging interface assembly are integrated molding structure.

20 Claims, 78 Drawing Sheets

(30) Foreign Application Priority Data

| Date | Country | Application No. |
|---|---|---|
| May 7, 2020 | (CN) | 202010376995.7 |
| May 7, 2020 | (CN) | 202010384328.3 |
| May 7, 2020 | (CN) | 202020731501.8 |
| May 7, 2020 | (CN) | 202020731675.4 |
| May 7, 2020 | (CN) | 202020731685.8 |
| May 7, 2020 | (CN) | 202020732348.0 |
| May 14, 2020 | (CN) | 202020799218.9 |
| May 14, 2020 | (CN) | 202020800248.7 |
| Jun. 3, 2020 | (CN) | 202020991642.3 |
| Dec. 21, 2020 | (CN) | 202011518322.7 |
| Dec. 21, 2020 | (CN) | 202011518419.8 |
| Dec. 21, 2020 | (CN) | 202011518432.3 |
| Dec. 21, 2020 | (CN) | 202011519711.1 |
| Dec. 21, 2020 | (CN) | 202011519837.9 |
| Dec. 21, 2020 | (CN) | 202011533027.9 |
| Dec. 21, 2020 | (CN) | 202023091979.8 |
| Dec. 21, 2020 | (CN) | 202023094522.2 |
| Dec. 21, 2020 | (CN) | 202023094544.9 |
| Dec. 21, 2020 | (CN) | 202023096114.0 |
| Dec. 21, 2020 | (CN) | 202023096201.6 |
| Dec. 21, 2020 | (CN) | 202023096221.3 |
| Dec. 21, 2020 | (CN) | 202023096313.1 |

(51) Int. Cl.

| | |
|---|---|
| *H02J 7/00* | (2006.01) |
| *A01D 34/00* | (2006.01) |
| *A01D 101/00* | (2006.01) |
| *B60B 7/04* | (2006.01) |
| *B60B 7/18* | (2006.01) |
| *G01V 3/02* | (2006.01) |

(52) U.S. Cl.
CPC ......... *H02J 7/0045* (2013.01); *A01D 34/008* (2013.01); *A01D 2101/00* (2013.01); *B60B 7/04* (2013.01); *B60B 7/18* (2013.01); *G01V 3/02* (2013.01)

(58) Field of Classification Search
CPC ...... A01D 34/008; A01D 34/78; A01D 34/81; A01D 69/02; A01D 2101/00
See application file for complete search history.

(56) References Cited

U.S. PATENT DOCUMENTS

| | | | |
|---|---|---|---|
| 10,440,879 B2 * | 10/2019 | Björn | B60L 50/66 |
| 11,252,863 B2 * | 2/2022 | Andersson | A01D 34/008 |
| 11,469,604 B2 * | 10/2022 | Towner | B60L 53/35 |
| 2012/0023880 A1 * | 2/2012 | Messina | B60L 3/0061 901/1 |
| 2015/0271991 A1 * | 10/2015 | Balutis | G05D 1/0221 700/264 |
| 2015/0366129 A1 * | 12/2015 | Borinato | G05D 1/0225 701/25 |
| 2017/0042087 A1 * | 2/2017 | Öhrlund | B60L 15/20 |
| 2017/0280623 A1 * | 10/2017 | Yamamura | A01D 34/008 |
| 2018/0184585 A1 * | 7/2018 | Song | A01D 34/74 |
| 2018/0199506 A1 | 7/2018 | Ito et al. | |
| 2019/0216012 A1 * | 7/2019 | Hahn | G05D 1/0272 |
| 2019/0223376 A1 * | 7/2019 | Lee | B25J 13/088 |
| 2019/0307062 A1 * | 10/2019 | Hong | A01D 69/02 |

FOREIGN PATENT DOCUMENTS

| | | | | |
|---|---|---|---|---|
| CN | 108142085 A | * | 6/2018 | ............ H02P 6/06 |
| CN | 210436149 U | * | 5/2020 | ............ B25J 5/00 |
| CN | 216546446 U | * | 5/2022 | ............ A01D 34/00 |
| EP | 2656718 A1 | * | 10/2013 | ............ A01D 34/008 |
| EP | 3549427 A1 | * | 10/2019 | ............ A01D 34/001 |
| EP | 3560312 A2 | | 10/2019 | |
| EP | 3771392 A1 | * | 2/2021 | ............ A47L 11/282 |
| EP | 4009482 A1 | * | 6/2022 | ............ A01D 34/008 |

* cited by examiner

ROBOTIC MOWER WITH INTEGRATED ASSEMBLIES

CROSS REFERENCE TO RELATED APPLICATION

The present application is related to and claims the benefit of priority of the following commonly-owned, presently-pending Chinese patent applications: serial No. 202020441934.X/.9, filed Mar. 31, 2020; serial No. 202020701949.5, filed Apr. 30, 2020; serial No. 202020731685.8, 202020731675.4, 202010384328.3, 202020731501.8, 202010376995.7, 202020732348.0, filed May 7, 2020; serial No. 202020799218.9, 202020800248.7, filed May 14, 2020; serial No. 202020991642.3, filed Jun. 3, 2020; and serial No. 202011533027.9, 202023096114.0, 202011519711.1, 202023096221.3, 202011519711.1, 202023096221.3, 202011518432.3, 202023096201.6, 202011518419.8, 202023096313.1, 202011518322.7, 202023094544.9, 202011519837.9, 202023094522.2, 202023091979.8, filed Dec. 21, 2020, of which the present application is a non-provisional application thereof. The disclosures of the forgoing applications are hereby incorporated by reference in it entirely, including any appendices or attachments thereof, for all purposes.

TECHNICAL FIELD

The disclosure relates to a robotic mower.

BACKGROUND

A mower, which may be a mechanical tool used for mowing lawns, vegetation, etc., may use an engine to rotate blades at a high speed, thereby increasing the efficiency of mowing and greatly reducing the working time and cost of a worker. An intelligent mower may bring the advantages of artificial intelligence and modernization into lawn mowing, and can be environmental-friendly and free-up worker's hands. Therefore, Intelligent mowers become more and more favored by the market and consumers. However, when a conventional intelligent lawn mower is in use, its tires may slip very easily, resulting in the mower fails to work properly.

SUMMARY

An object of the disclosure is to provide a mower including a housing; a movable upper cover, arranged on the housing; and a cutting mechanism, disposed on the housing.

In summary, the mower provided by the disclosure may be an intelligent/smart/robotic mower, which can automatically carry out a mowing operation, so that the user can be far away from a working/operation site, and therefore the harm to the user may be reduced, and the mowing efficiency can be improved.

BRIEF DESCRIPTION OF THE DRAWINGS

FIG. 113 is a schematic cross-sectional structural view of a housing of the mower.

FIG. 114 is a schematic partial enlarged view of the portion A in FIG. 113.

FIG. 115 is a schematic structural view of a collision sensor of the disclosure.

FIG. 116 is a schematic perspective view of an intelligent mower according to an embodiment of the disclosure.

FIG. 117 is a schematic perspective view of a connection device of the intelligent mower according to the embodiment of the disclosure.

FIG. 118 is a schematic cross-sectional view of the connection device in FIG. 117, wherein a locking member of the connection device is at a releasing position.

FIG. 119 is similar to FIG. 118, but the locking member is at a locking position.

FIG. 120 is a schematic perspective view of a mounting base of the connection device.

FIG. 121 is another schematic perspective view of the mounting base, showing a structure of its bottom.

FIG. 122 is a schematic perspective view of the locking member of the connection device.

FIG. 123 is another schematic perspective view of the locking member, showing a structure of its bottom.

FIG. 124 is a schematic perspective view of a bottom plate of the connection device.

Figure 125:
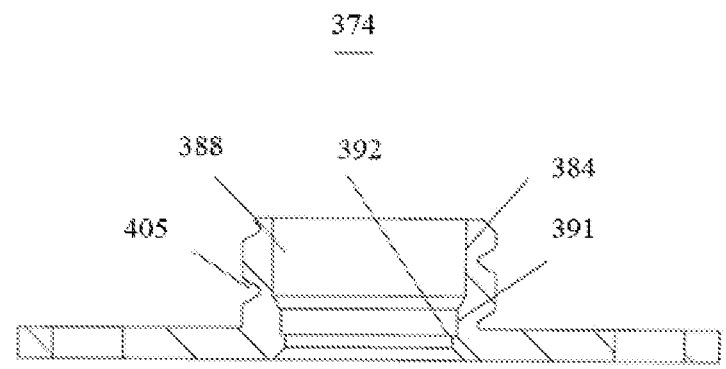

FIG. 125 is a schematic cross-sectional view of the bottom plate.

Figure 126:
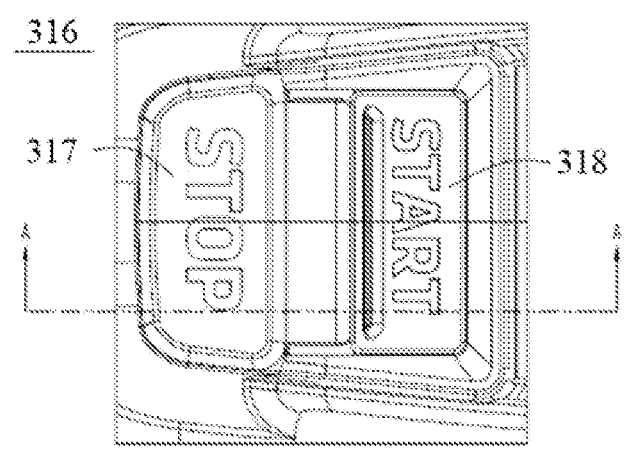

FIG. 126 is a schematic structural view of a switch of the disclosure in a switched-on state.

Figure 127:
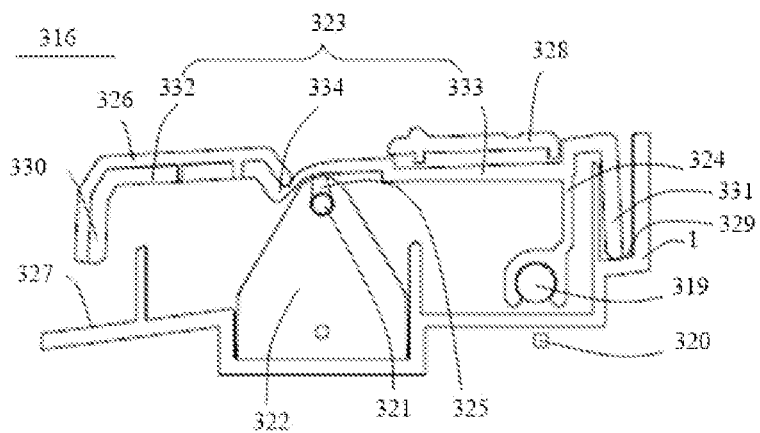

FIG. 127 is a schematic cross-sectional structural view of the switch of the disclosure taken along the line A-A in FIG. 126.

Figure 128:
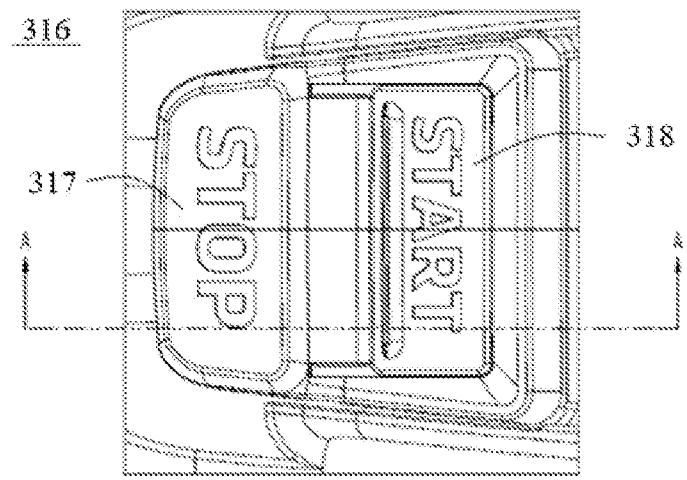

FIG. 128 is a schematic structural view of the switch of the disclosure in a switched-off state.

Figure 129:
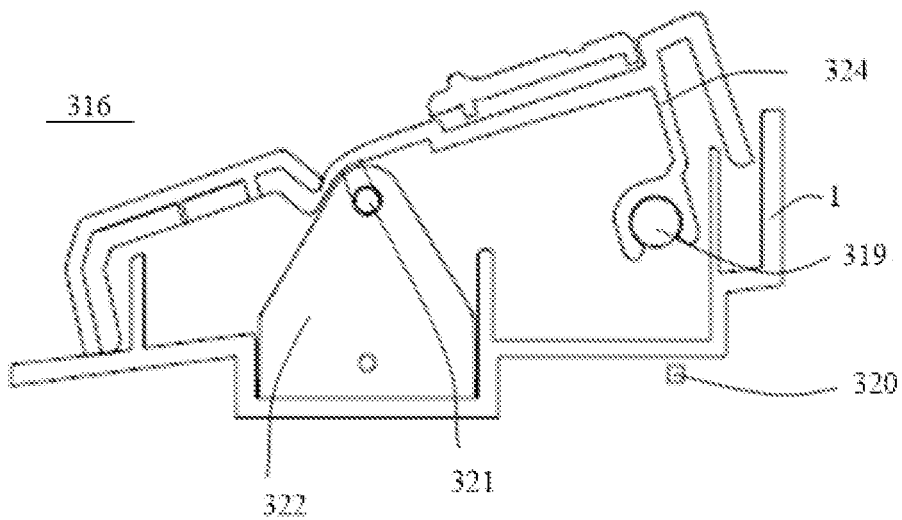

FIG. 129 is a schematic cross-sectional structural view of the switch of the disclosure taken along the line A-A in FIG. 128.

Figure 130:
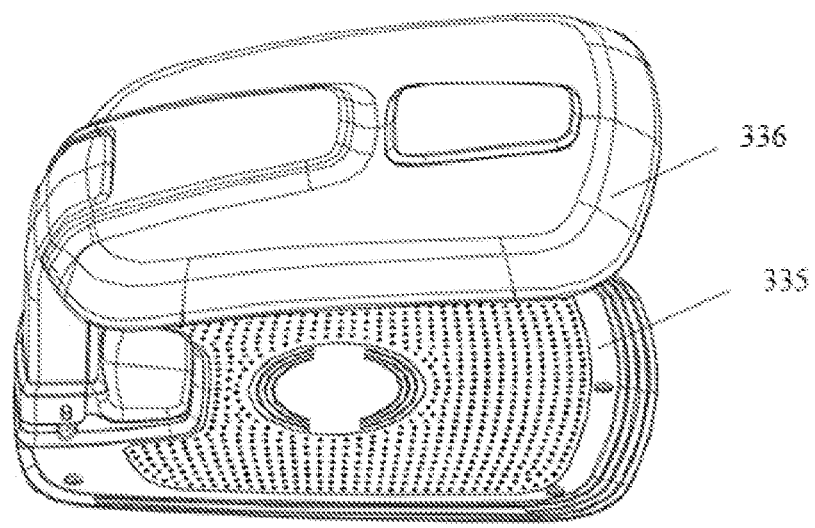

FIG. 130 is a schematic perspective assembled view of a charging station system according to an embodiment of the disclosure.

Figure 131:
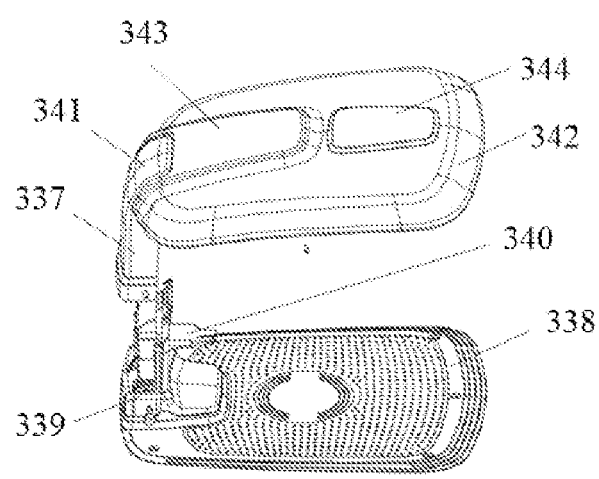

FIG. 131 is another schematic perspective view of the charging station system in FIG. 10, wherein a charging station and a ceiling are separated from each other.

Figure 132:
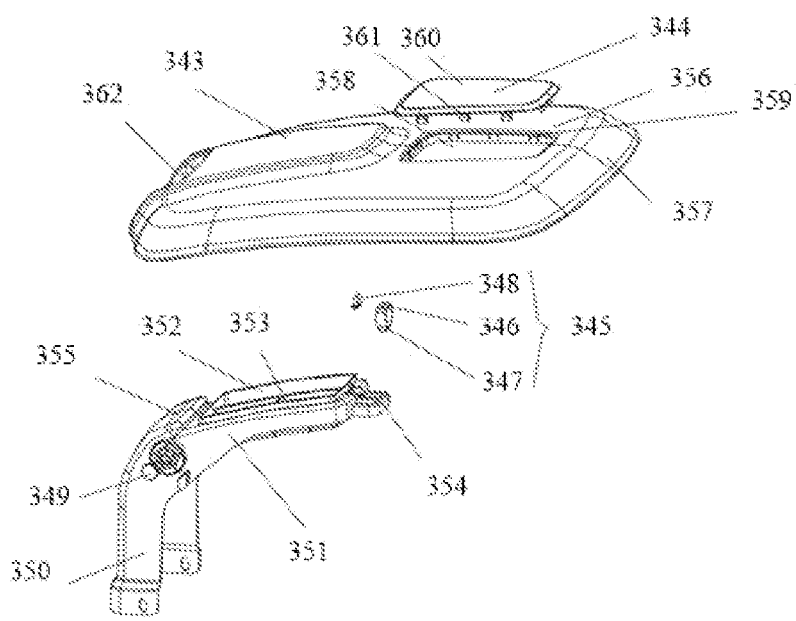

FIG. 132 is a schematic perspective exploded view of the ceiling of the charging station system in FIG. 131.

Figure 133:
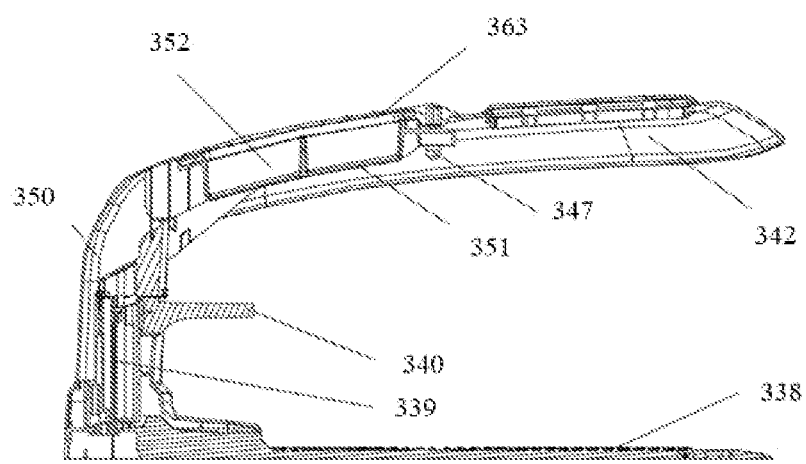

FIG. 133 is a schematic cross-sectional view of the charging station system of the disclosure taken along the direction A-A in FIG. 130.

Figure 134:
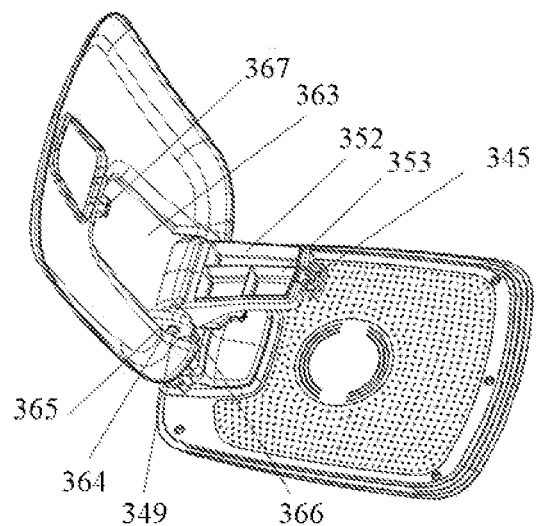

FIG. 134 is a schematic perspective assembled view of the charging station system in FIG. 130 from another viewing angle, wherein the ceiling is in an opened state.

Figure 135:
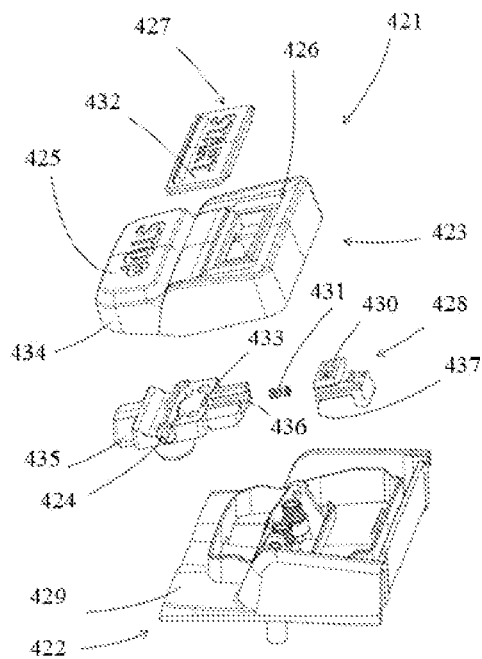

FIG. 135 is a schematic exploded view of a safety switch of the disclosure in a first position.

Figure 136:
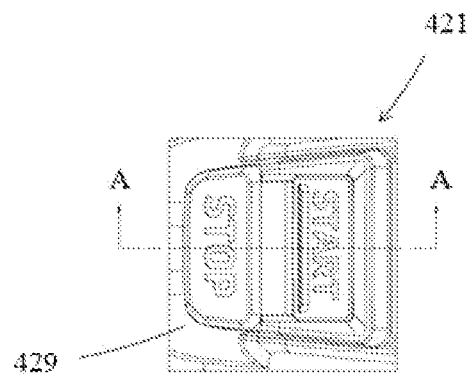

FIG. 136 is a schematic top view of the safety switch of the disclosure.

Figure 137:
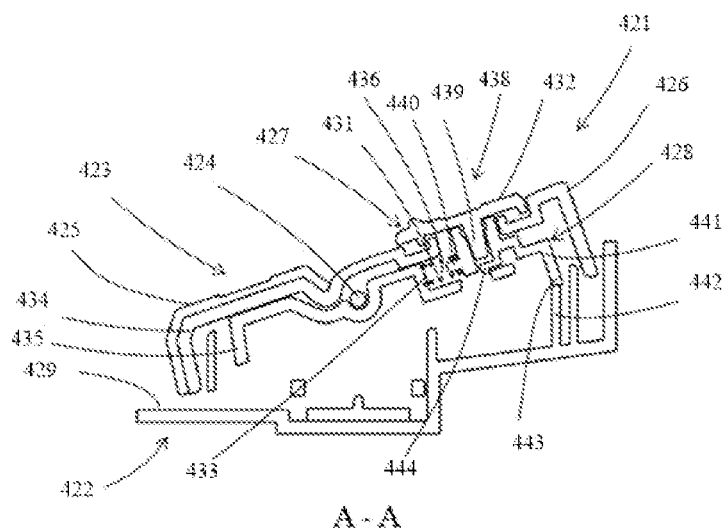

FIG. 137 is a schematic cross-sectional view taken along the direction A-A in FIG. 136.

Figure 138:
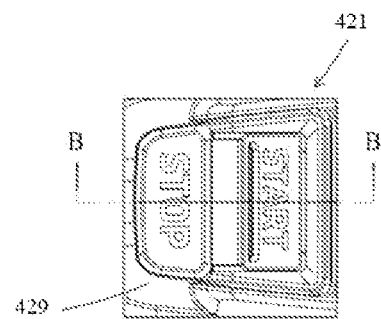

FIG. 138 is a schematic top view of the safety switch of the disclosure in a second position.

Figure 139:
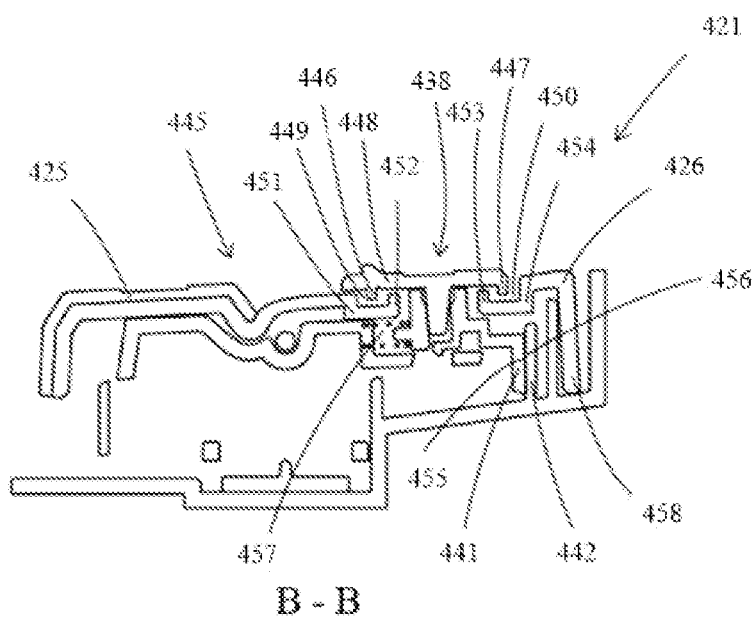

FIG. 139 is a schematic cross-sectional view taken along the direction B-B in FIG. 138.

Figure 140:
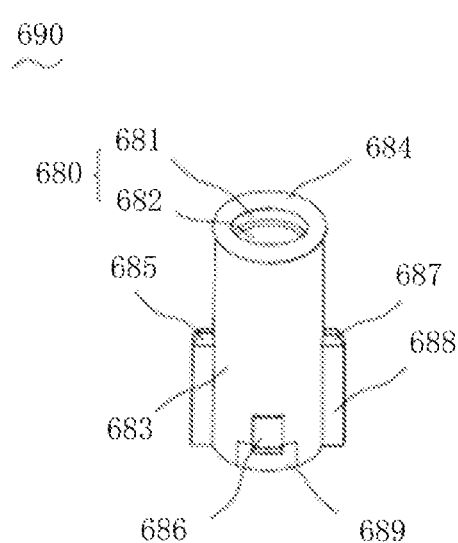

FIG. 140 is a schematic perspective structural view of a light guide member of the disclosure.

Figure 141:
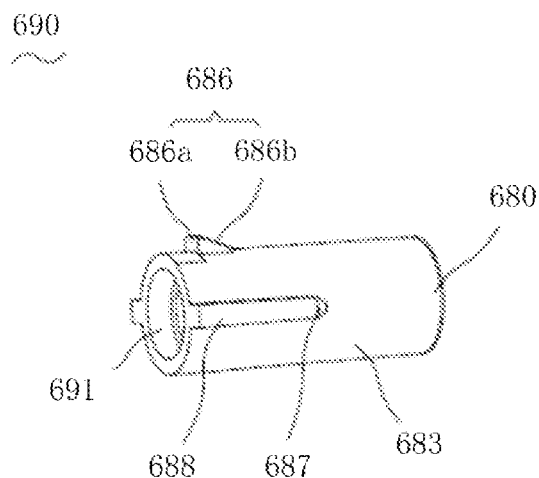

FIG. 141 is a schematic perspective structural view of the light guide member in FIG. 140 from another viewing angle.

Figure 142:
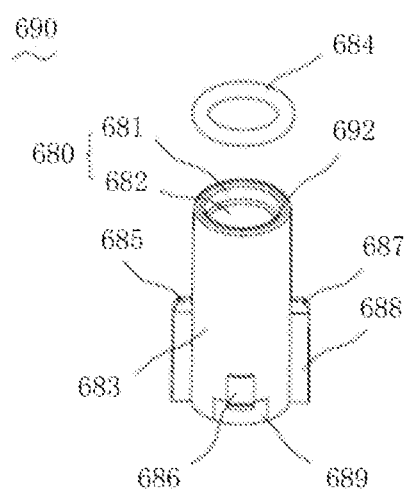

FIG. 142 is a schematic exploded structural view of the light guide member in FIG. 140.

Figure 143:
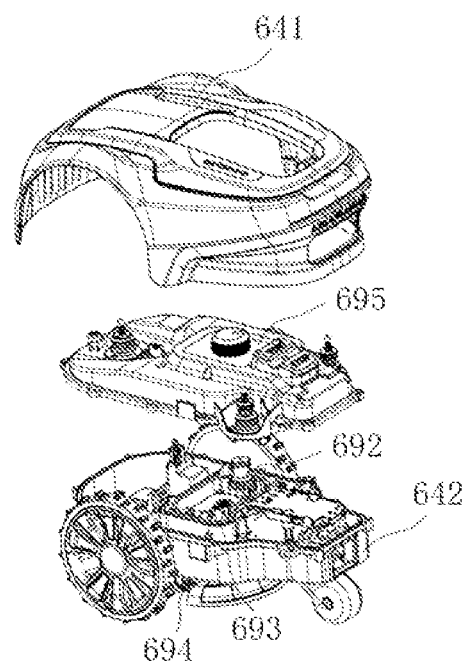

FIG. 143 is a schematic structural dissembled view of the garden tool.

Figure 144:
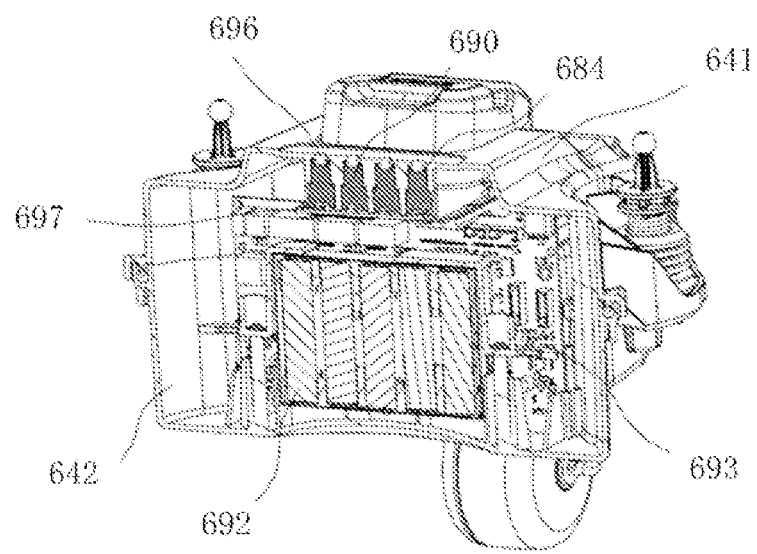

FIG. 144 is a schematic partial cross-sectional view of a light guide post installed on the base.

Figure 145:
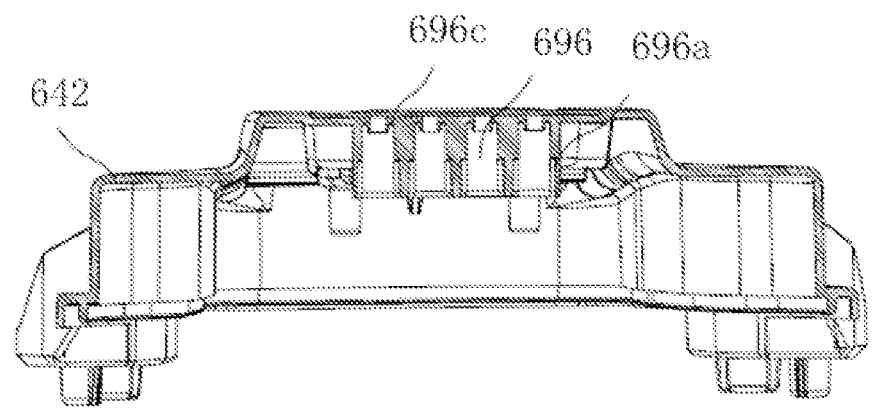

FIG. 145 is a schematic structural view of an upper casing in FIG. 144.

Figure 146:
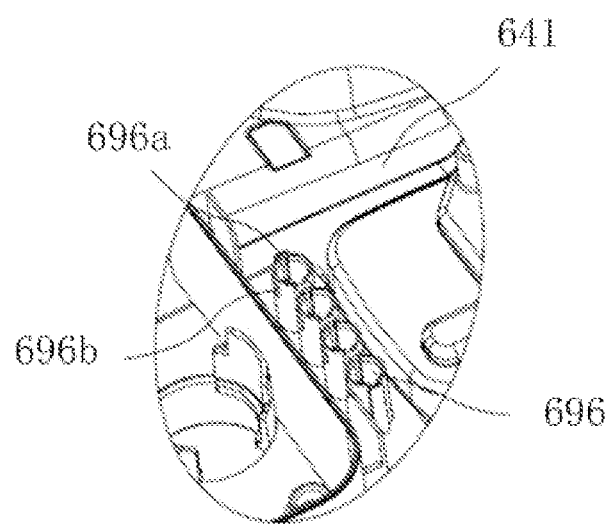

FIG. 146 is a schematic partial enlarged view of the upper casing in FIG. 144 from another viewing angle.

Figure 147:
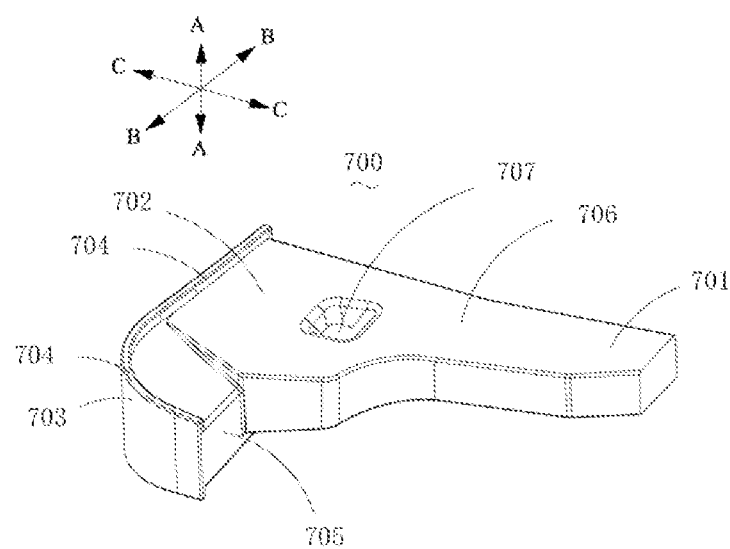

FIG. 147 is a schematic perspective structural view of a light guide member of the disclosure.

Figure 148:
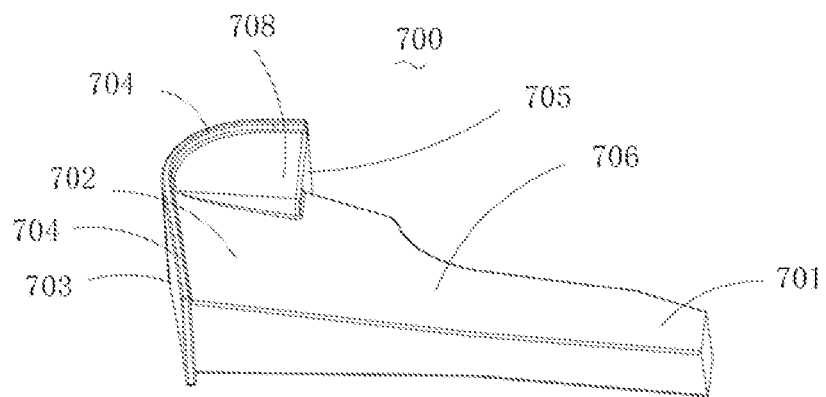

FIG. 148 is a schematic perspective structural view of the light guide member in FIG. 148 from another viewing angle.

Figure 149:
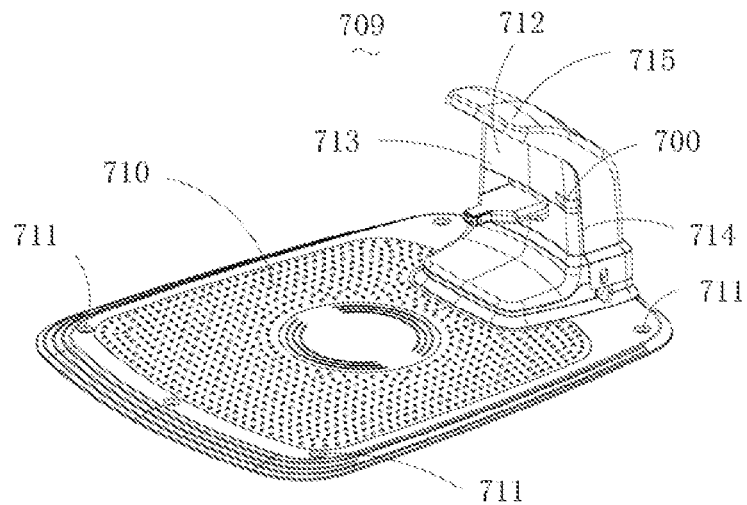

FIG. 149 is a schematic perspective structural view of a charging device of the disclosure.

Figure 150:
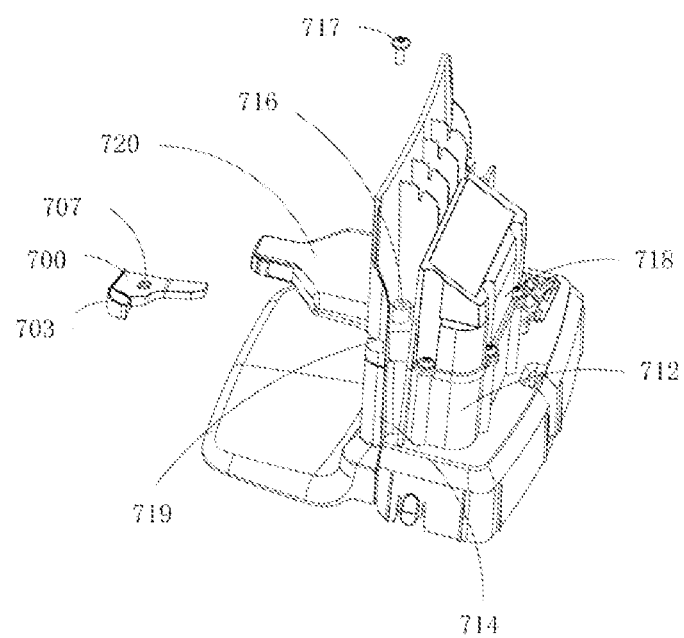

FIG. 150 is a schematic exploded view of the light guide member and a charging part.

Figure 151:
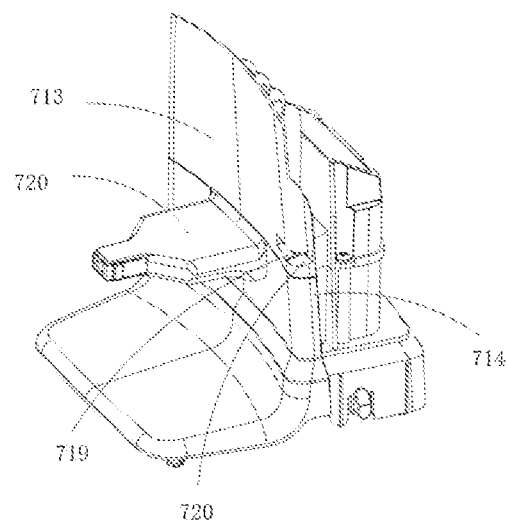

FIG. 151 is a schematic perspective structural view of the charging part.

Figure 152:
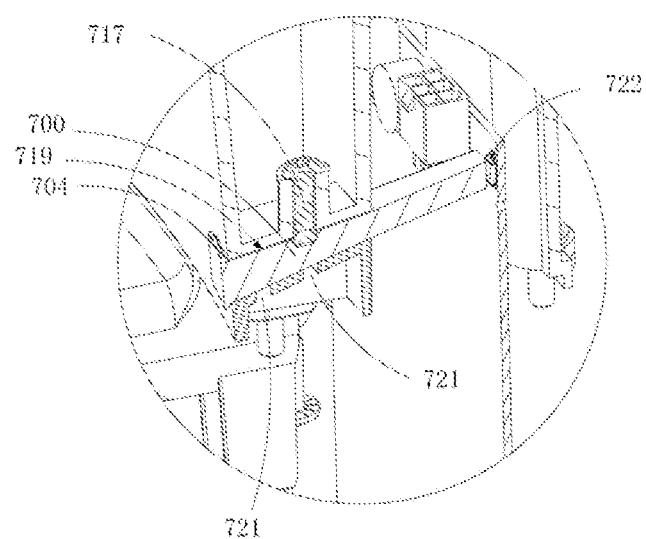

FIG. 152 is a schematic partial cross-sectional view of the light guide member being installed on the charging part.

DETAILED DESCRIPTION

The following embodiments are referring to the accompanying drawings for exemplifying specific implementable embodiments of the present disclosure. Furthermore, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto.

The drawings and description are to be regarded as illustrative in nature and not restrictive. Like reference numerals designate like elements throughout the specification. In addition, the size and thickness of each component shown in the drawings allow ease of understanding and ease of description, but the present disclosure is not limited thereto.

Referring to FIG. 1 through FIG. 4, in some embodiments, an intelligent mower ("mower") is provided. The mower can include, among other parts and components, a housing 1, a movable upper cover 2 positioned above the housing 1, and a control assembly disposed within the housing 1. The movable upper cover 2 can include, among other parts and components, a main body flip cover 4 disposed thereon. The control assembly may be configured (i.e., structured and arranged) to control the mower during operation. The control assembly may include, among other components, a single-chip microcomputer or a processor module, and can perform various functionalities with corresponding driving circuits.

Referring to FIG. 4 and FIG. 5 through FIG. 15c, in which embodiments of a cutting mechanism is illustrated. The mower can include a cutting mechanism 3 for cutting grass. The cutting mechanism 3 can include a prime mover (also referred to as prime motor) 36, a blade carrier disc 5, and an assisted height-adjustment assembly 37 for the blade carrier disc 5. The prime mover 36 is disposed in the housing 1 and configured for driving the rotation of the blade carrier disc 5. The blade carrier disc 5 is disposed at the bottom of the assisted height-adjustment assembly 37 and configured for mounting/installing blades 6 (i.e., having blade mounting positions). The assisted height-adjustment assembly 37 is configured for adjusting a height of the blade carrier disc 5.

Figure 4:
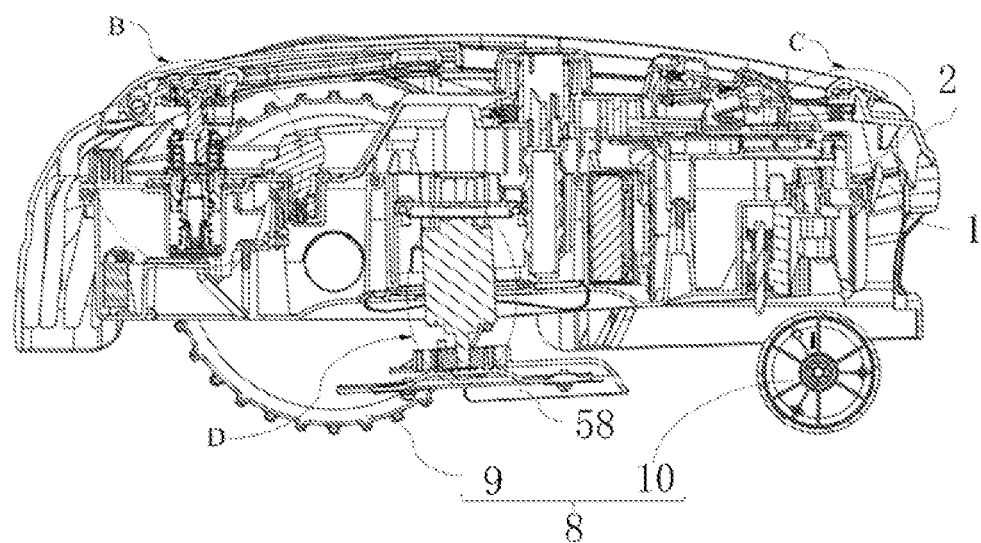
FIG. 4 is a schematic cross-sectional view taken along the line A-A of FIG. 1.
Figure 6:
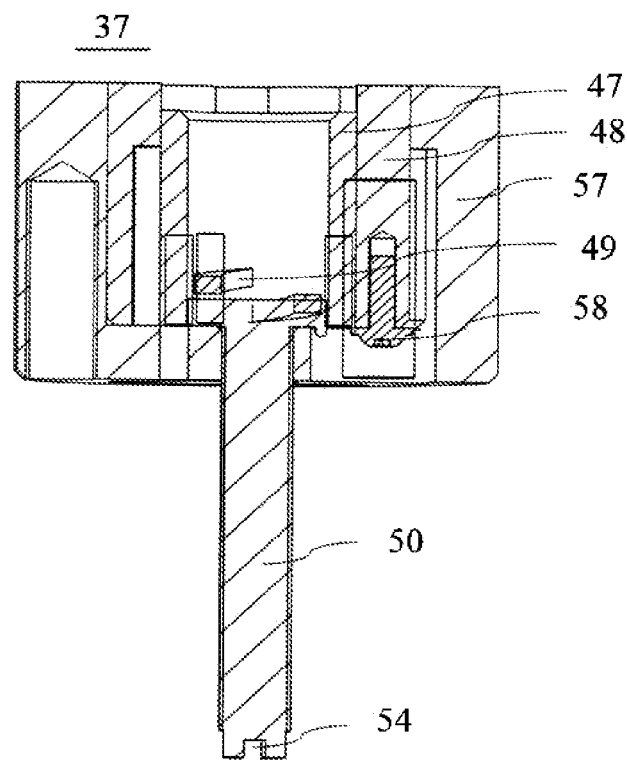
FIG. 6 is a schematic cross-sectional view of the assisted height-adjustment assembly for blade carrier disc.
Figure 7:
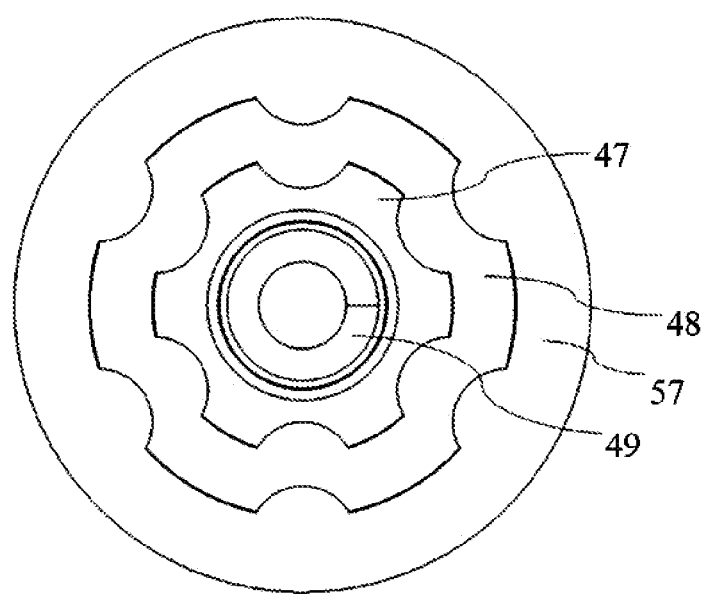
FIG. 7 is a schematic top view of the assisted height-adjustment assembly for blade carrier disc.
Figure 14:
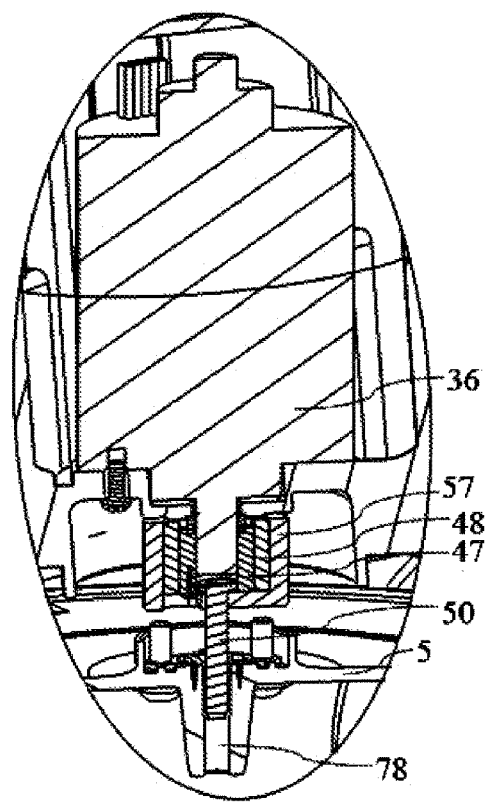
FIG. 14 is a schematic enlarged view of the portion D in FIG. 4.

As illustrated in FIG. 4, FIG. 6 and FIG. 14, the assisted height-adjustment assembly 37 for the blade carrier disc is, without limitation, tightly installed on an output shaft of the prime mover 36. A bottom surface of the assisted height-adjustment assembly 37 can be attached to the blade carrier disk 5, which may be fitted with at least one blade 6 for cutting grass. In the illustrated embodiment, the number/amount of the blades 6 may be three, and the three blades 6 may be evenly arranged/distributed on a circumference of the blade carrier disc 5. In other embodiments, the number of the blades 6 may be adjusted as required. Optionally, a protective cover 58 can be arranged under the blade carrier disc 5 to prevent accidental touching of the blades 6.

As illustrated in FIG. 5 through FIG. 15c, the assisted height-adjustment assembly 37 for the blade carrier disc can include an adjusting element 50 and at least two blade carrier disc connectors, each of which can be sequentially and movably sleeved on and off a shaft. In particular, a first blade carrier disc connector 47 is located at the inner side and can be fixedly installed on the output shaft of the prime mover 36. A second blade carrier disc connector 57 is located at the outer side and configured for connecting to the blade carrier disc 5. An adjusting element 50 is configured for moving the second blade carrier disc connector 57 to along a surface of the first blade carrier disc connector 47 when adjusting the height of the blade carrier disc 5.

As illustrated in FIG. 5 through FIG. 15c, the number/amount of the blade carrier disc connectors may be at least two. When the number of the blade carrier disc connectors is two, the second blade carrier dis connector 57 is directly moving along the sleeve (or the outer surface) of the first blade carrier disc connector 47. When the number of the blade carrier disc connectors is more than two, the additional blade carrier disc connector(s), e.g., a third blade carrier disc connector, can be located between the first blade carrier disc connector and the second blade carrier disc connector, and can move along the sleeves (inner or outer surfaces) of the two connectors. For example, in the accompanying FIG. 7, an embodiment with three blade carrier disc connectors is illustrated, while the number of the blade carrier disc connectors is not limiting.

Figure 10A:
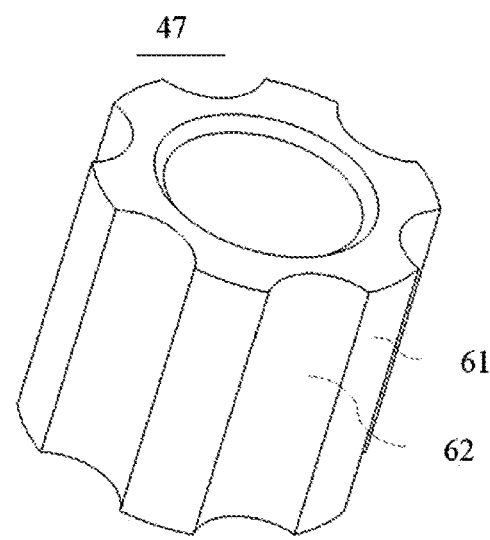
FIG. 10a is a schematic perspective view of a first blade carrier disc connector observed at a top viewing angle.
Figure 10B:
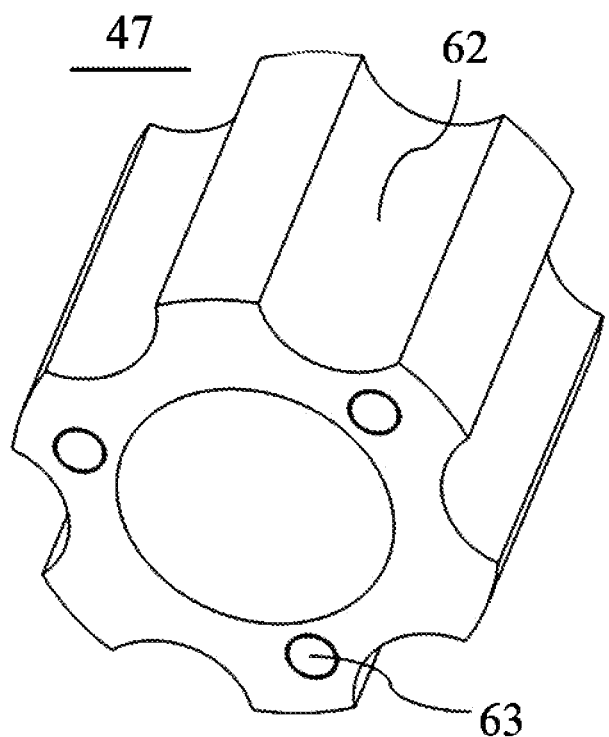
FIG. 10b is a schematic perspective view of the first blade carrier disc connector observed at a bottom viewing angle.

As illustrated in FIG. 10a and FIG. 10b, the first blade carrier disc connector 47 can include a hollow first body 61, and at least one first guide groove 62 on the outer side surface of the first body 61. The first body 61 is closely attached to the output shaft of the prime mover 36, so that power from the prime mover 36 can be transferred to other blade carrier disc connector(s) adjacent to the first blade carrier disk connector 47 via the at least one first guide groove 62.

As illustrated in FIG. 10 and FIG. 10b, the first body 61 can be hollow-in-the-center and cylindrical, with openings both ends to allow the output shaft of the prime mover 36 to be inserted. The first body 61 may also be equipped with an assisted height-adjustment rod. The illustrated first guide grooves 62 are evenly distributed on the outer surface of the first body 61, each of the first guide grooves 62 each may have the same height as the first body 61, meaning the first guide grooves 62 are full grooves.

As illustrated in FIG. 10a and FIG. 10b, one end of the first body 61 may have at least one first mounting hole 63, and the at least one first mounting hole 63 is configured for mounting a first stopper 55. The first stopper 55 may be, without limitation, a screw or a bolt, and may be mounted/installed into the first mounting hole 63 by threads. One end (wider head) of the first stopper 55 may be wider than the other end, and may extend out of the edge of the first guide groove to limit/restrict another blade carrier disc connector from sliding out. That is, the wider end of the first stopper 55 may prevent the blade carrier disc connector adjacent to the first blade carrier disc connector from detaching or sliding away from the first blade carrier disc connector. In other words, when there are two blade carrier disc connectors, the wide head of the first stopper 55 is configured to limit/align two end surfaces of the second blade carrier disc connector and the first blade carrier disc connector; when there are at least three blade carrier disc connectors, the wide head of the first stopper 55 is configured to limit/align the end surfaces of the third blade carrier disc connector from and the first blade carrier disc connector 47.

Figure 11A:
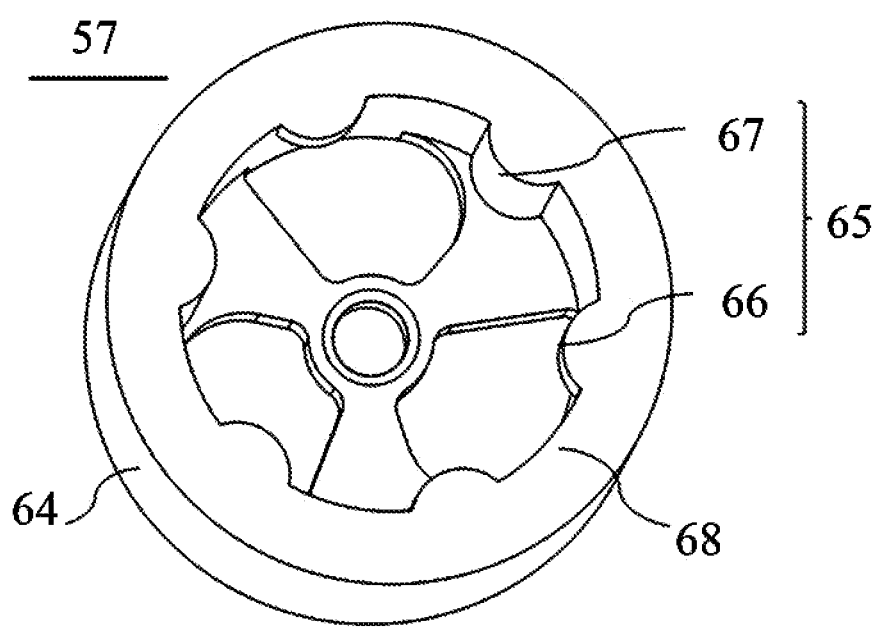
FIG. 11a is a schematic perspective view of a second blade carrier disc connector observed at a top viewing angle.
Figure 11B:
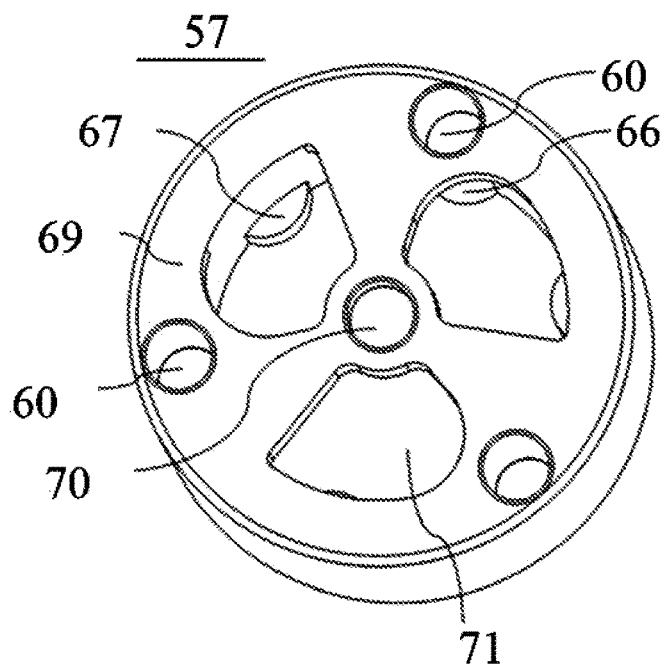
FIG. 11b is a schematic perspective view of the second blade carrier disc connector observed at a bottom viewing angle.

As illustrated in FIG. 11a and FIG. 11b, the second blade carrier disc connector 57 can include a hollow second body 64 and at least one protruded second guide portion 65 on the inner side surface of the second body 64. An open end 68 is located at one end of the second body 64 and configured for inserting an inner blade carrier disc connector into. A closed end 69 is located at the other end of the second body 64 and configured for mounting an adjusting element 50. The second guide portions 65 as illustrated are matched with the guide grooves of the inner blade carrier disc connector, so the second blade carrier disc connector 57 can slide along the inserted inner blade carrier disc connector.

As illustrated in FIG. 11a and FIG. 11b, the second body 64 may be hollow and cylindrical, with one of its ends opened (i.e., open end 68), so as to act as a sleeve to allow another blade carrier disc connector (e.g., the first blade carrier disc connector or the third blade carrier disc connector) to be inserted into. The other end of the second body 64 is partially closed (i.e., closed end 69), and configured for mounting the blade carrier disc and an adjustment end of the assisted height-adjustment rod. The second guide portions 65 as illustrated are evenly distributed on the inner surface of the second body 64.

The second guide portions 65 include at least one second long-protrusion 66 and at least one short-protrusion 67 in an alternately arranged manner. A height of the second long-protrusion 66 is substantially equal to that of the second body 64. The second short-protrusion 67 can include a height smaller than that of the second body 64, and is disposed near the open end 68 of the second body 64. The second short-protrusion 67 may operate with the corresponding stopper to prevent the second blade carrier disc connector from detaching away from the third blade carrier disc connector or the first blade carrier disc connector.

As illustrated in FIG. 11b, the closed end of the second body 64 is disposed with at least one blade carrier disc mounting hole 60 for attaching the blade carrier disc 5 via at least one fastener. The at least one blade carrier disc mounting hole 60 is located at or near the bottom of the second long-protrusions 66.

Figure 5:
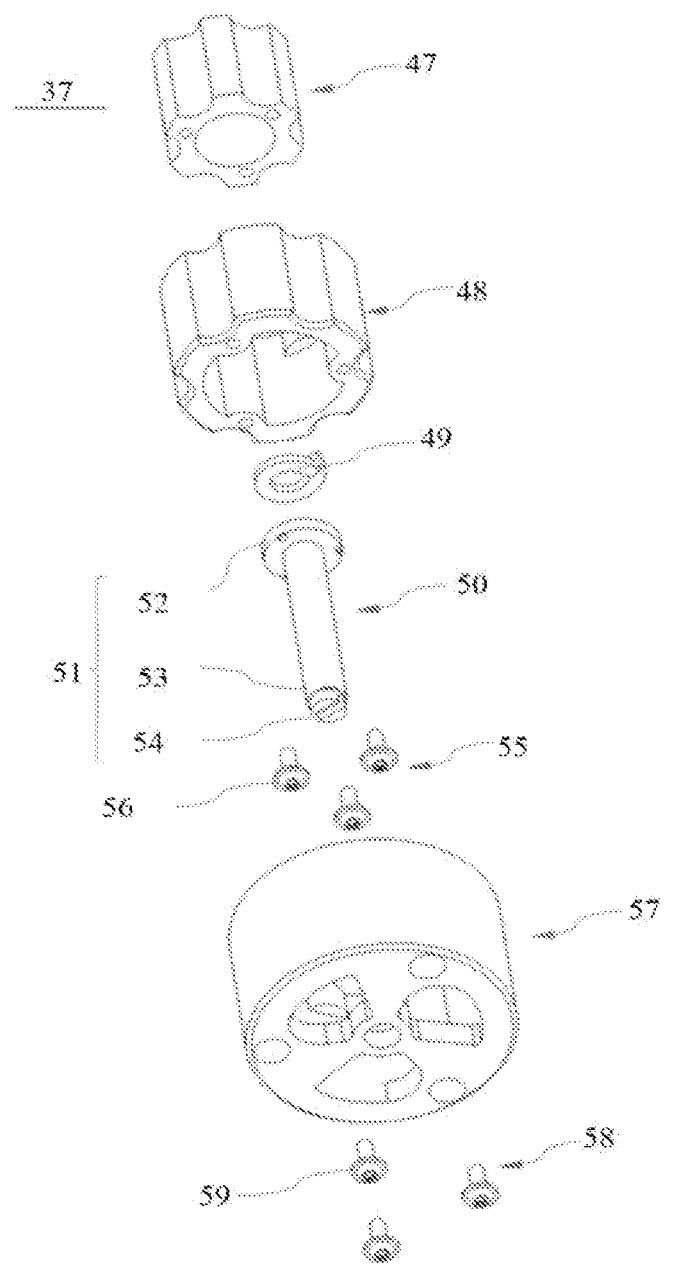
FIG. 5 is a schematic exploded view of an assisted height-adjustment assembly for blade carrier disc.

As illustrated in FIG. 5, at least one third blade carrier disc connector 48 may be inserted between the first blade carrier disc connector 47 and the second blade carrier disc connector 57. When there is one third blade carrier disc connector 48, the number of the blade carrier disc connectors in the assisted height-adjustment assembly for the blade carrier disc is three. When there are two third blade carrier disc connectors 48, the number of the blade carrier disc connectors in the assisted height-adjustment assembly for the blade carrier disc becomes four, and the third blade carrier disc connectors may have the same structure but different dimensions, so as to be sequentially and movably inserted-onto one another from inside to outside.

Figure 12A:
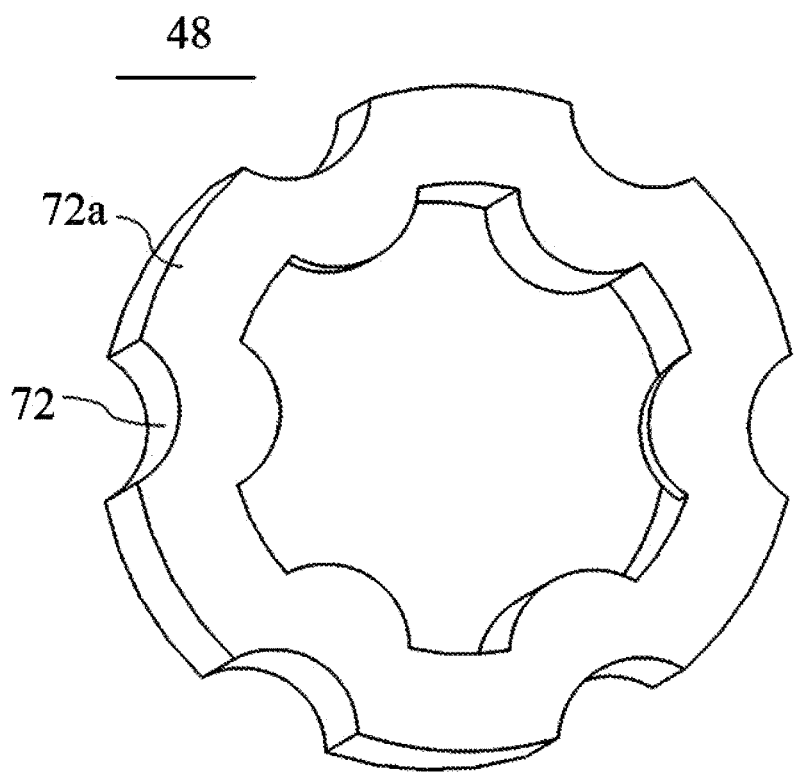
FIG. 12a is a schematic perspective view of a third blade carrier disc connector observed at a top viewing angle.
Figure 12B:
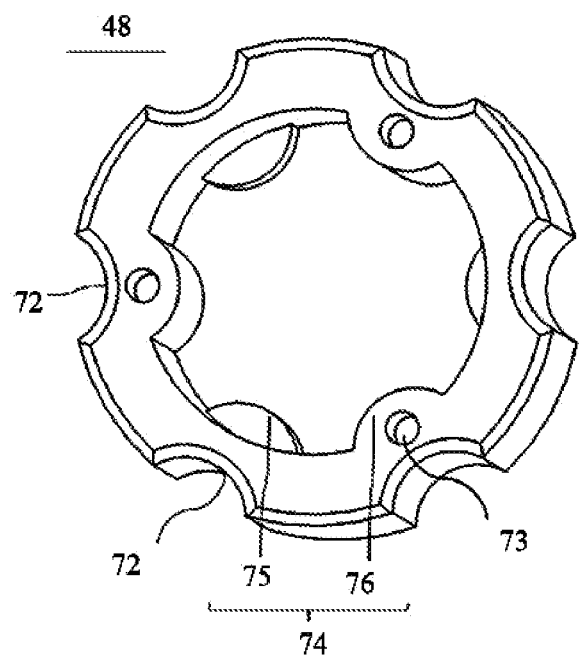
FIG. 12b is a schematic perspective view of the third blade carrier disc connector observed at a bottom viewing angle.

As illustrated in FIG. 12a and FIG. 12b, the third blade carrier disc connector 48 can include a hollow third body 72a and at least one protruded third guide portion 74 which is disposed on the inner side surface of the third body 72a and matched with the guide groove(s) of the internally adjacent blade carrier disc connector. The third blade carrier disk connector may also have at least one third guide groove 72 that is disposed on the outer side of the third body 72a and matched with the guide portion(s) of the externally adjacent blade carrier disc connector.

As illustrated in FIG. 12a and FIG. 12b, the third body 72a is hollow and cylindrical, with its two ends opened so as to allow the inner blade carrier disc connector to be inserted. The third guide grooves 72 as illustrated are evenly distributed on the external side surface of the third body 72a, and each may have a height same as that of the third body 72a (i.e., the third guide grooves 72 are through grooves). The third guide portions 74 as illustrated are evenly distributed on the inner side surface of the third body 72a.

Further, the third guide portions 74 may include at least one third long-protrusion 76 and at least one third short-protrusion 75 in an alternately arranged manner. The at least one third long-protrusion 76 each can include a height substantially the same as that of the third body 72a. The at least one third short-protrusion 75 each can include a height smaller than that of the third body 72a and is located near the bottom end of the third body 72a, so it can operate with a corresponding stopper(s) to prevent the second blade carrier disc connector or other third blade carrier disc connector from detaching away from the third blade carrier disc connector. In the disclosure, the at least one third guide portion and the at least one third guide groove may correspond to each other one to one, and are oppositely arranged on the inner and outer side surfaces of the third body. The at least one third guide portion and the at least one third guide groove can also be arranged staggered, as long as the assembling requirement is met.

Figure 8:
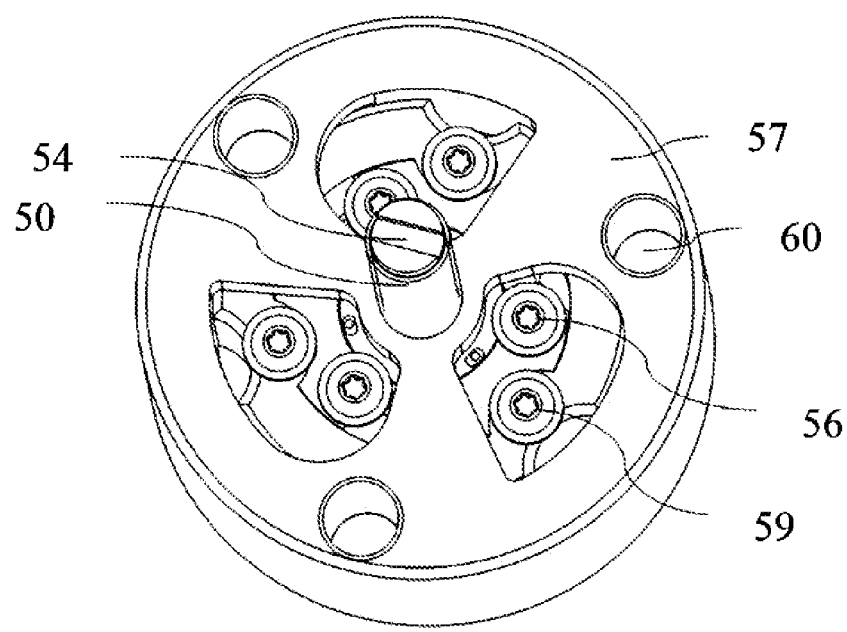
FIG. 8 is a schematic perspective view of the assisted height-adjustment assembly for blade carrier disc observed at a bottom viewing angle.
Figure 9A:
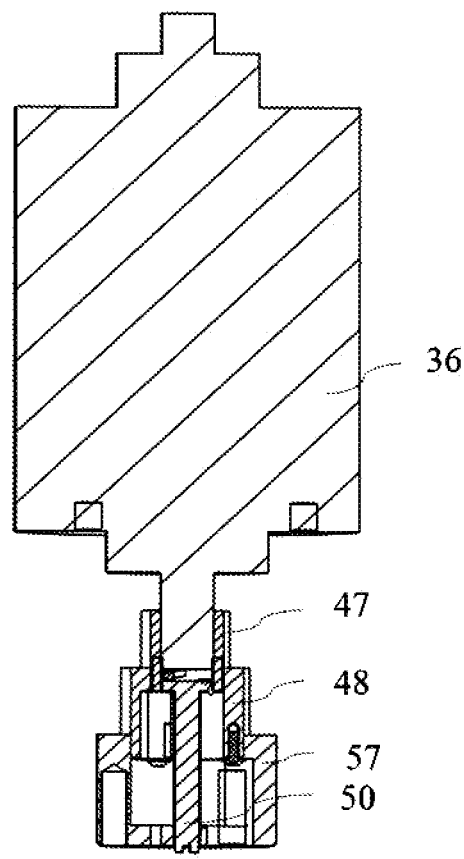
FIG. 9a is a schematic view of the assisted height-adjustment assembly for blade carrier disc in a state of lowering the blade carrier disc.
Figure 9B:
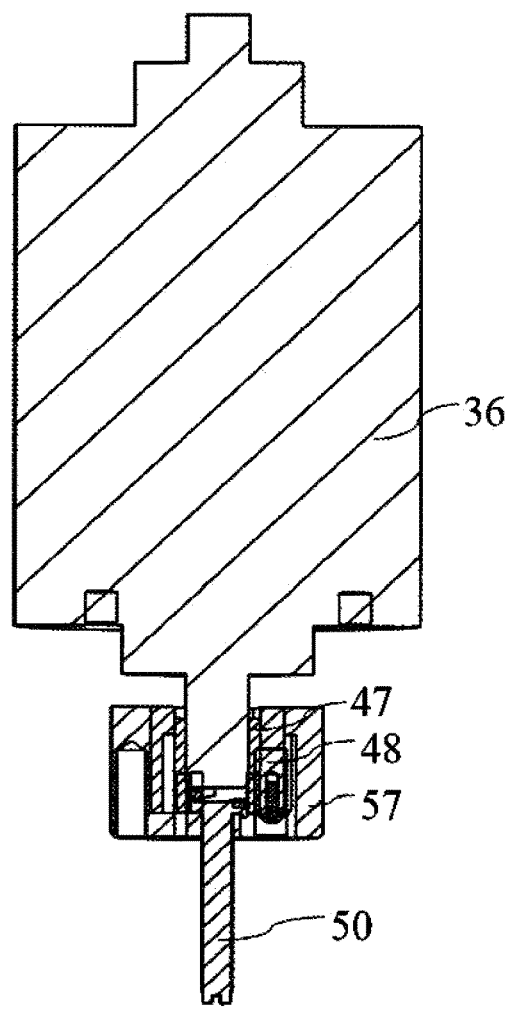
FIG. 9b is a schematic view of the assisted height-adjustment assembly for blade carrier disc in a state of lifting the blade carrier disc.

As illustrated in FIG. 5, FIG. 8 and FIG. 12b, a lower end of the third body 72a is provided with at least one third mounting hole 73 for mounting with a third stopper(s) 58. The third mounting holes 73 as illustrated are located at the bottom of the third long-protrusions 75. The third stopper 58 may be, without limiting, a screw or a bolt, can include a structure similar to or different from that of the first stopper, and can be installed into the third mounting hole 73 via threads. A wide head 59 of the third stopper 58 is protruded into the groove end of the third guide groove 72, so as to restrict the guide portion of the adjacent blade carrier disc connector from sliding out, i.e., restricting the blade carrier disc connector externally adjacent to the third blade carrier disc connector from detaching away.

In the disclosure, as illustrated in FIG. 5, the wide head 56 of the first stopper 55 is configured to prevent the first blade carrier disc connector 47 from detaching from the third blade carrier disc connector 48. When there are three blade carrier disc connectors, the wide head 59 of the third stopper 58 is configured to prevent the second blade carrier disc connector 57 from detaching away from the third blade carrier disc connector 48. When there are four blade carrier disc connectors, the wide head 59 of the third stopper 58 is configured to revent the blade carrier disc connector located at the outer side of the third blade carrier disc connector from detaching away from the third blade carrier disc connector.

Figure 13:
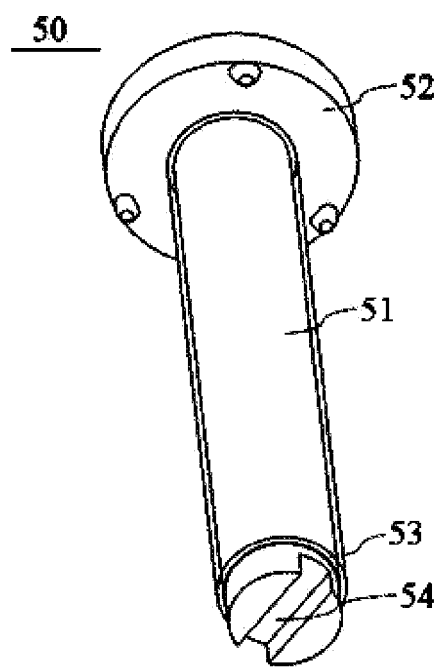
FIG. 13 is a schematic perspective view of an assisted height-adjustment rod observed at a bottom viewing angle.

As illustrated in FIG. 5 and FIG. 13, the adjusting element 50 can include an assisted height-adjustment rod 51, an install end connecting to the output shaft of the prime mover 36, and an adjust end 53 passing through the blade carrier disc connectors threadedly connected with the blade carrier disc 5. When rotating the assisted height-adjustment rod 51, the blade carrier disc 5 drives the second blade carrier disc connector 57 to rotate. The closed end 69 of the second body may include a through hole 70 to allow the blade carrier disc connector suitable for the assisted height-adjustment rod 51 to pass therethrough. The closed end 69 of the second body may be formed with other structural holes 71 for assembling, observation or weight reduction.

As illustrated in FIG. 5 and FIG. 13, the install end 52 of the assisted height-adjustment rod 51 is snap-fitted into the first body 61 using the first stoppers 55. The adjust end 53 of the assisted height-adjustment rod 51 is formed with an adjust groove 54. The blade carrier disc 5 is provided with a threaded through hole 58 suitable for movement via the adjust end 53.

As illustrated in FIG. 6, a spring washer 49 may be added between the assisted height-adjustment rod 51 and the output shaft of the prime mover 36.

As illustrated in FIG. 6 through FIG. 15c, a process to adjust the height of the blade carrier disc by the assisted height-adjustment assembly for the blade carrier disc can be summarized in the following two cases. Other possible implementations of adjusting the height of the blade carrier disc by the assisted height-adjustment assembly for the blade carrier disc should also be within the protection scope of the application.

Step 1: The process of adjusting the height of the blade carrier disc with two blade carrier disc connectors is as follows: manually or by other means (such as using a screwdriver or other tool) to snap into the adjust groove 54, and rotate the assisted height-adjustment rod 51 so that the assisted height-adjustment rod 51 drives the blade carrier disc to up or down. In this case, the blade carrier disc drives the second blade carrier disc connector to move along the first blade carrier disc connector, thereby achieving the height adjustment action of the blade carrier disc. Since the adjustment process of the blade carrier disc and the movement process of the blade carrier disc connectors are relatively simple, they are not illustrated in the drawings.

Figure 15A:
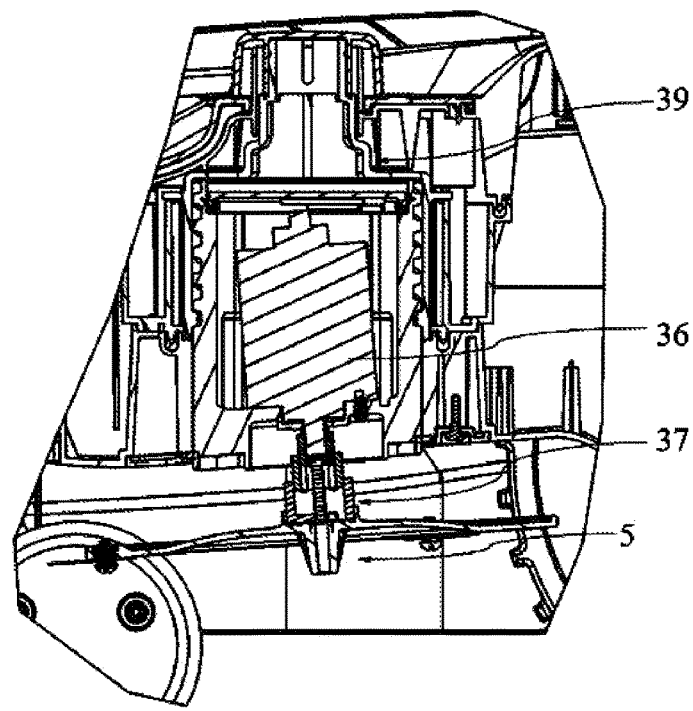
FIG. 15a is a schematic view of lowering the height of the blade carrier disc in the mower.

Step 2: The process of adjusting the height of the blade carrier disc with three or more blade carrier disc connectors are similar. Taking three blade carrier disc connectors as an example, to perform the height adjustment action of the blade carrier disc, a specific adjustment process is illustrated in FIG. 10 and FIG. 10b, or FIG. 15a through FIG. 15c. In this process, the first blade carrier disc connector 47, the third blade carrier disc connector 48, and the second blade carrier disc connector 57 are attached in the above order from inside to outside. To adjust the height of the blade carrier disc, in the first operation (1), first assuming that the cutter head 5 is initially at the lowest possible height (as shown in FIG. 15a), the first stoppers 55 are mounted into the first mounting holes 63, the wide heads 56 of the first stoppers 55 protrude into the first guide grooves 62 and touch against the bottoms of the third short-protrusions 75 so as to prevent the third blade carrier disc connector from detaching away from the first blade carrier disc connector. The wide heads 56 of the first stoppers 55 also protrude into the hollow portion of the first body 61 and touch against the bottom of the install end 52 of the assisted height-adjustment rod 51 so as to prevent the assisted height-adjustment rod 51 from detaching away from the first blade carrier disc connector 47. The third stoppers 58 are installed into the third mounting holes 73, and the wide heads 59 of the third stoppers 58 protrude into the third guide grooves 72 and touch against the bottoms of the second short-protrusions 67 so as to prevent the second blade carrier disc connector 57 from detaching away from the third blade carrier disc connector 48.

In the second operation (2), the assisted height-adjustment rod 51 is rotated in a manner similar to the above-mentioned way, and the rotation of the assisted height-adjustment rod 51 drives the blade carrier disc 5 to move upward. In this case, the blade carrier disc 5 pushes the second blade carrier disc connector 57 to move along the side surface of the third blade carrier disc connector, so as to increase the height of the blade carrier disc from the ground.

In the third operation (3), when the closed end 69 (bottom end) of the second blade carrier disc connector 57 touches against the third stoppers 58 or the bottom of the third body 72a, the second blade carrier disc connector 57 substantially contains the third blade carrier disc connector 48.

Figure 15B:
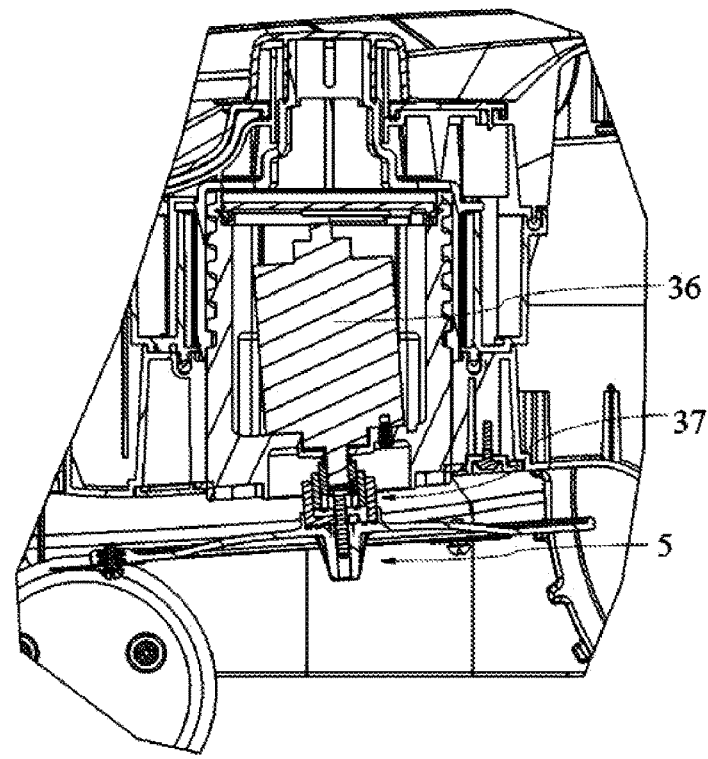
FIG. 15b is a schematic view of adjusting the height of the blade carrier disc in the mower.
Figure 15C:
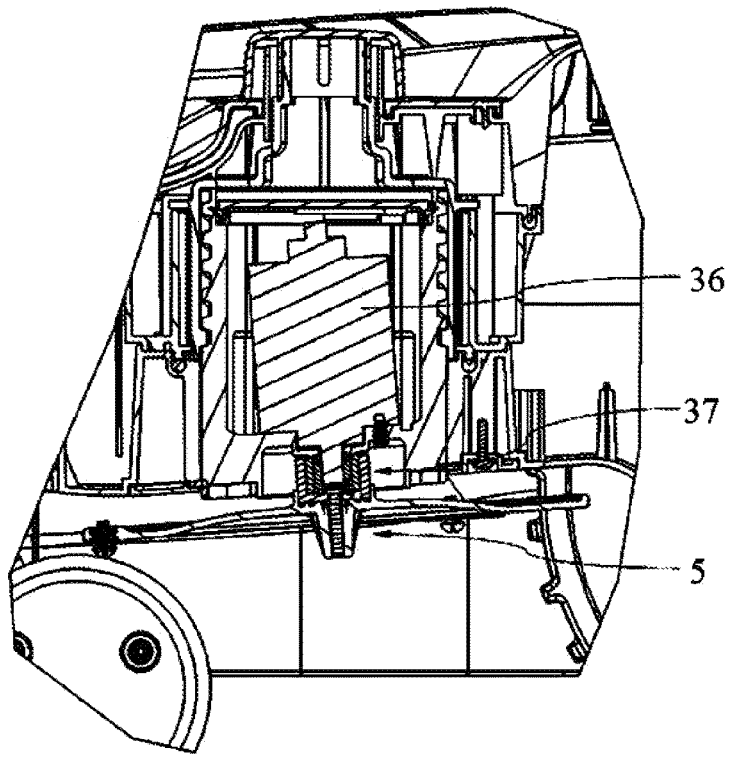
FIG. 15c is a schematic view of lifting the height of the blade carrier disc in the mower.

In the fourth operation (4), the second blade carrier disc connector 57 continues to move upwardly, the third blade carrier disc connector 48 is pushed by the second blade carrier disc connector 57 to move along the side surface of the first blade carrier disc connector 47 (as shown in FIG. 15b), so that the height of the blade carrier disc from the ground is further increased until the third blade carrier disc connector 48 is substantially contain the first blade carrier disc connector 47. In this case, the first blade carrier disc connector 47, the third blade carrier disc connector 48, and the second blade carrier disc connector 57 are completely sleeved one after another in this order from inside to outside, with the closed end of the second blade carrier disc connector 57 touching against the bottom of the first blade carrier disc connector 47, and the blade carrier disc 5 being adjusted to the highest position.

Referring to FIG. 3, FIG. 4, and FIG. 16 through FIG. 19, the mower can further include a detecting mechanism arranged between the housing 1 and the movable upper cover 2 and configured for detecting a relative displacement between the movable upper cover 2 and the housing 1. The control assembly is suitable for adjusting the working state of the mower based on the above detecting mechanism. The detecting mechanism can include at least one suspension-lift detection assembly 20 disposed on the housing 1 and configured for detecting a relative displacement between the movable upper cover 2 and the housing 1 in the vertical direction, and at least one collision detection assembly 93 disposed on the housing 1 and configured for detecting a relative displacement between the movable upper cover 2 and the housing in the horizontal direction. The control assembly is suitable for adjusting the working state of the mower according to detection signals of the at least one suspension-lift detection assembly 20 and the at least one collision detection assembly 93. The control assembly may include a processor, various control circuits, sensing units, and corresponding driving circuits, etc., can detect changes in current signals, and can control shutdown or operation of the mower.

Figure 1:
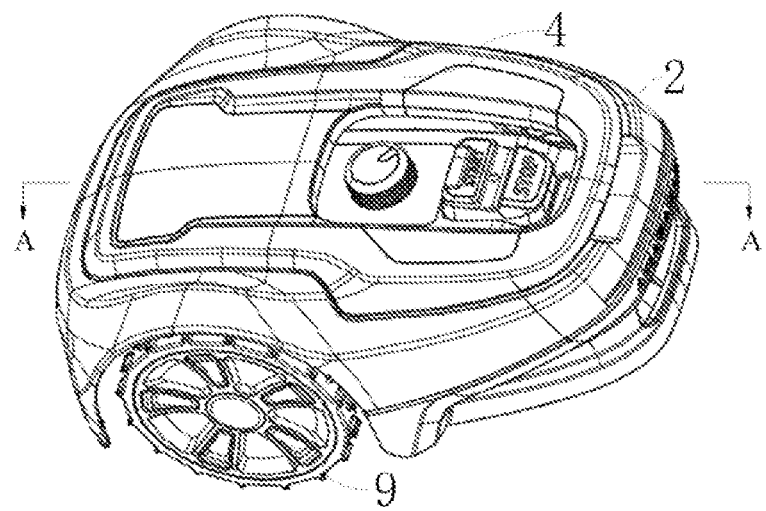
FIG. 1 is a schematic perspective view of a mower observed at a top viewing angle according to the disclosure.
Figure 2:
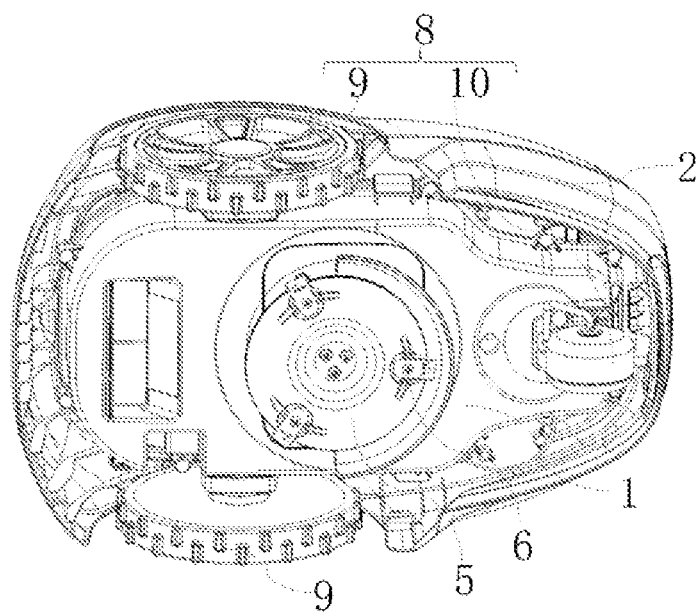
FIG. 2 is a schematic perspective view of the mower observed at a bottom viewing angle.
Figure 3:
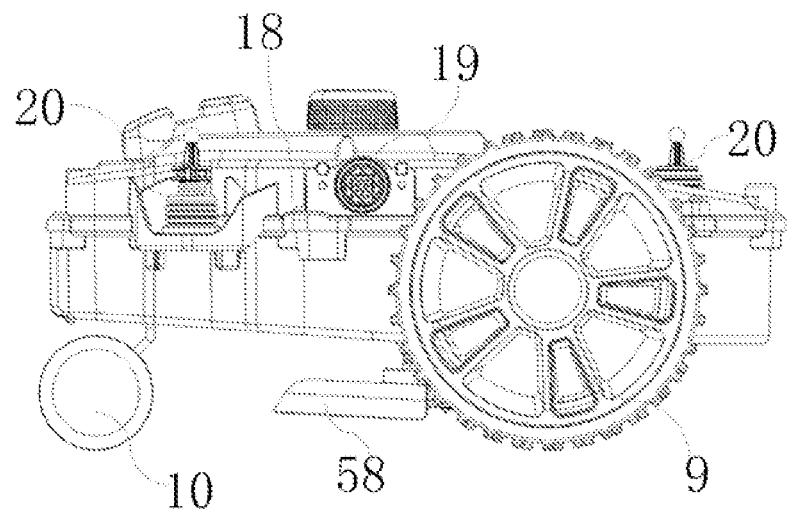
FIG. 3 is a schematic side view of the mower after removing a main body flip cover and a movable upper cover.

As illustrated in FIG. 3 and FIG. 4, the mower may include two suspension-lift detection assemblies 20 respectively arranged at the first mounting locations 16 of the movable upper cover 2 in diagonal positions of the housing 1. Alternatively, the mover may include four suspension-lift detection assemblies 20 that are respectively arranged at the first mounting locations of the movable upper cover 2 in corners of the housing 1. The mover may include two collision detection assemblies 93 respectively arranged at the second mounting locations 17 of the movable upper cover 2 in two ends of the housing 1. The number of the suspension-lift detection assembly and the number of the collision detection assembly can also be adjusted according to machine models and structural requirements, and at the same time, their installation positions on the housing can be changed correspondingly.

Figure 16:
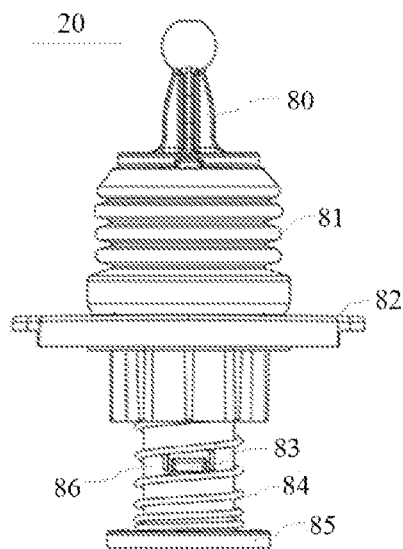
FIG. 16 is a schematic perspective view of a suspension-lift detection assembly.
Figure 17:
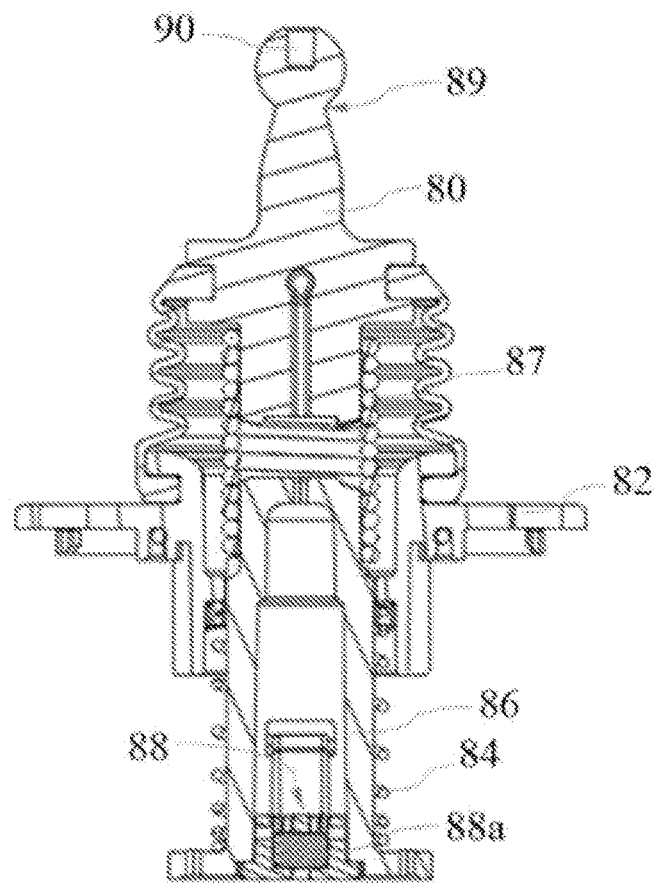
FIG. 17 is a schematic cross-sectional view of the suspension-lift detection assembly.

As illustrated in FIG. 4, FIG. 16 and FIG. 17, the suspension-lift detection assembly 20 can include a suspension ball head 80 fixed on the movable upper cover of the mower; a lifting stopper 86, arranged below and separated from the suspension ball head 80; a suspension spring 87 with two ends thereof fixedly connected to the suspension ball head 80 and the lifting stopper 86 respectively; and a signal trigger module 88 arranged at the bottom of the lifting stopper 86. When the suspension ball head 80 occurs/generates an upward displacement, the suspension spring 87 pulls the lifting stopper 86 to move upward, causing the signal trigger module 88 to send/issue a detection signal.

Figure 18:
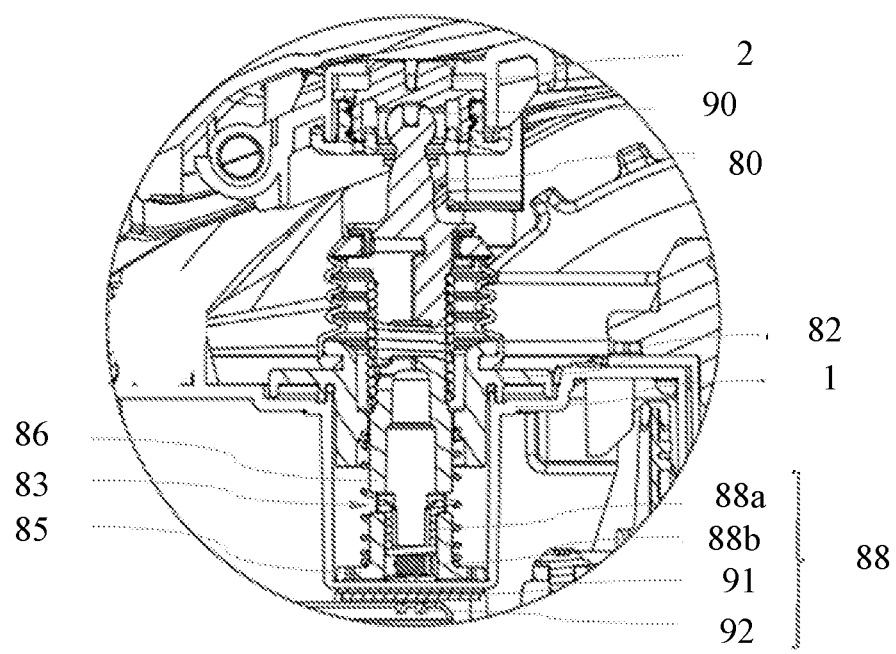
FIG. 18 is a schematic enlarged view of the portion B in FIG. 4.

As illustrated in FIG. 18, a side surface of the suspension ball head 80 is disposed with a ball joint 89, thereby allowing the suspension ball head 80 to be fixed onto the movable upper cover 2 of the mower by a snap-fit structure. The two ends of the suspension spring 87 are respectively connected with the suspension ball head 80 and the lifting stopper 86 through threads. When the movable upper cover of the mower moves upward, the suspension ball head 80 is driven to move upward together. In this case, the suspension spring 87 would pull the lifting stopper 86 to move upward, causing the signal trigger module 88 to issue a detection signal. In addition, a limiting groove 90 is provided at the top of the suspension ball head 80 and used in conjunction with a limiting post on the movable upper cover, so as to avoid horizontal shaking between the suspension ball head and the movable upper cover.

As illustrated in FIG. 18, the suspension spring is a spring with relatively high rigidity, that cannot easily be deformed in the vertical direction. It can not only meet the requirement of the suspension spring 87 pulling the lifting stopper 86 to move upward, but also make the suspension spring to play a role of horizontal damping as well as allow a certain relative displacement between the suspension ball head and the lifting stopper in the horizontal direction. In this way the suspension-lift detection assembly will not be damaged or generate a false alarm when the mower collides. In other embodiment, the suspension spring may be fixedly connected to the suspension ball head by means of buckle or pin lock.

As shown in FIG. 18, the signal trigger module 88 can include a first magnetic block 88a fixed on the lower end of the lifting stopper 86, a first lifting detection board 88b located below the lifting stopper 86, and a first reed switch 91 disposed on the first lifting detection board 88b. When the lifting stopper 86 moves upward, the first magnetic block 88a leaves away from the first reed switch 91, the first reed switch 91 is opened or closed to change the current signal on the first lifting detection board 88b, and the changed current signal may trigger the sending of the detection signal. The first lifting detection board and a second lifting detection board are, without limiting, Hall boards, and are electrically connected to the control assembly. In the illustrated embodiment, the first reed switch 91 is located directly below the first magnetic block 88a.

As illustrated in FIG. 16, the suspension-lift detection assembly can further include a suspension-fixing corrugated sleeve 81 sleeved onto the outer side of the suspension spring 87. One end of the suspension-fixing corrugated sleeve 81 is snapped to the suspension ball head 80, and the other end is fixedly installed onto the housing 1 of the mower by a suspension fixing frame 82. When the lifting stopper moves upward, the suspension-fixing corrugated sleeve 81 is stretched, which can not only produce a restoring tension, but also play the role of sealing protection.

In order to increase the restoring force of the suspension-lift detection assembly, the suspension-lift detection assembly 20 of the mower can further include a suspension restoring spring 84 sleeved on the outer side of the lifting stopper 86. Two ends of the suspension restoring spring 84 respectively touch against the bottoms of the suspension fixing frame 82 and the lifting stopper 86. When the lifting stopper 86 moves upward, the suspension fixing frame 82 stays still, which causes a distance between the bottoms of the suspension fixing frame 82 and the lifting stopper to become smaller, and the suspension restoring spring 84 is compressed to generate a restoring elastic force. After the mower stops working, the suspension-lift detection assembly is restored to avoid jamming.

As illustrated in FIG. 17, the lifting stopper 86 may be hollow rod-shaped, with its sides having an engaging groove 83. The signal trigger module 88 can further include a magnet bracket 92 located in the hollow interior of the lifting stopper 86. The magnet bracket 92 is suspended in the engaging groove 83 of the lifting stopper. The first magnetic block 88a is fixed on the bottom of the magnet bracket 92, so as to ensure that it is also fixed at the hollow bottom end of the lifting stopper 86. Meanwhile, the bottom of the lifting stopper 86 is disposed with an outwardly extending lifting stopper flange 85, and an outer diameter of the lifting stopper flange 85 is greater than an inner diameter of the suspension fixing frame 82, so that the lifting stopper flange 85 can limit a vertical stroke of the first magnetic block 88a, thereby ensuring the overall stability of the suspension-lift detection assembly.

As illustrated in FIG. 4 and FIG. 18, the collision detection assembly 93 can include a second magnetic block 94 arranged on the movable upper cover 2; a second reed switch 95 arranged on the housing 1 and below the second magnetic block 94; and a second lifting detection board 96 arranged between the second magnetic block 94 and the second reed switch 95. When a relative displacement in the horizontal direction between the movable upper cover 2 and the housing 1 occurs, the second magnetic block 94 approaches or leaves away from the second reed switch 95. With the second reed switch 95 opening or closing, a current signal on the second lifting detection board 96 is changed. The second lifting detection board 96 is electrically connected to the control assembly and sends the current signal to the control assembly as a detection signal. In the illustrated embodiment, the second reed switch 95 is arranged just below the second magnetic block 94.

Figure 19:
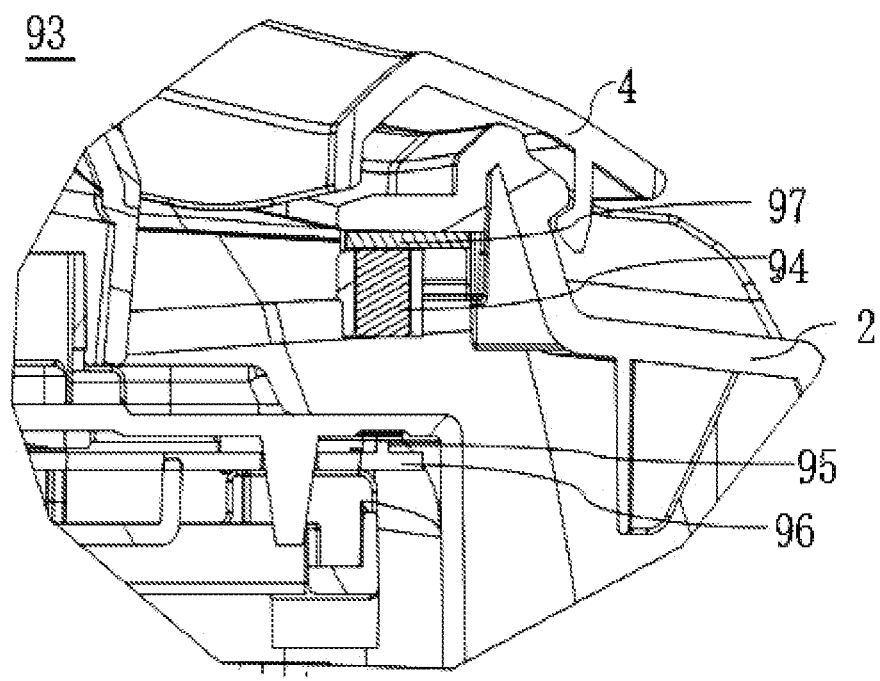
FIG. 19 is a schematic enlarged view of the portion C in FIG. 4.
Figure 20:
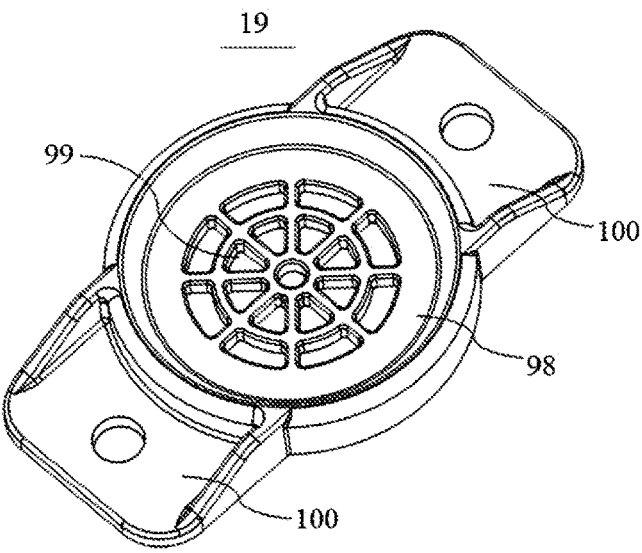
FIG. 20 is a schematic perspective view of an air filter hood.
Figure 21:
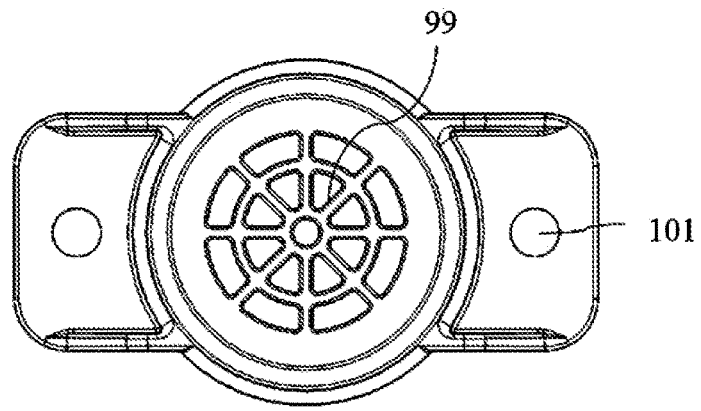
FIG. 21 is a schematic top view of the air filter hood.
Figure 22:
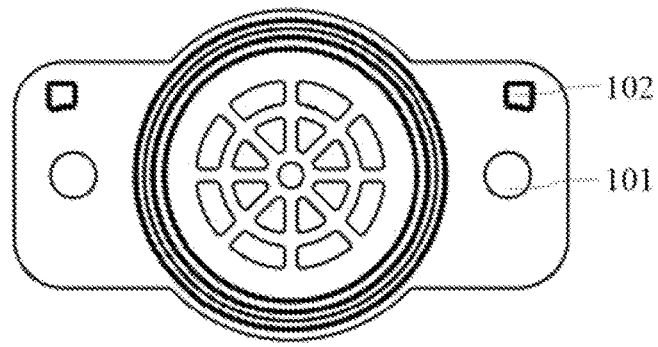
FIG. 22 is a schematic bottom view of the air filter hood.

As illustrated in FIG. 19, the collision detection assembly 93 can further include a magnetic-block support 97 fixed on the movable upper cover 2. The magnetic-block support 97 is magnetic sheet, such as an iron sheet for attracting the second magnetic block 94, so as to leave a certain gap between the second magnetic block 94 and the second reed switch 95.

Referring to FIG. 3, and FIG. 20 through FIG. 27, the housing 1 can further include an internally sealed case 18; a function hole or a function mounting location (covered by an air filter hood 19, not shown) formed on the case 18 and interconnecting the interior and exterior of the case 18; and a functional module selectively detachably mounted on the function hole to detect a sealing state of the casing or maintain a balance of air pressure between inside and outside of the casing.

As illustrated in FIG. 20 through FIG. 23, when the functional module is an air filter hood 19, it can balance the air pressure between the inside and outside of the case 18 when the mower is working. The air filter hood 19 can include a ventilation base 98 mounted at the function hole for ventilation, and can include air filter hood mounting portions 100 extending outwardly from the ventilation base 98. The ventilation base 98 is disposed with corresponding vent holes 99 and may be made of a breathable material to achieve the purpose of breathability.

There may be two air filter hood mounting portions 100 respectively extend from the ventilation base 98 in two opposing directions, and thus symmetrically arranged at two sides of the ventilation base 98. As to the air filter hood 19, the air filter hood mounting portions 100 are mechanically fixed onto the case 18 through fasteners. The fasteners can be suitable parts such as, without limiting, screws, bolts or engaging members. Optionally, the air filter hood mounting portions 100 are provided with corresponding air filter hood mounting holes 750, so that the air filter hood mounting portions 100 are mechanically fixed onto the case 18 by screws.

Figure 23:
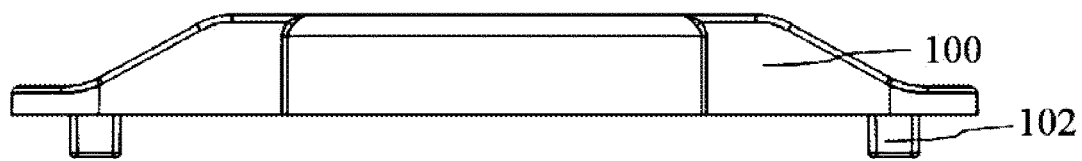
FIG. 23 is a schematic front view of the air filter hood.
Figure 24:
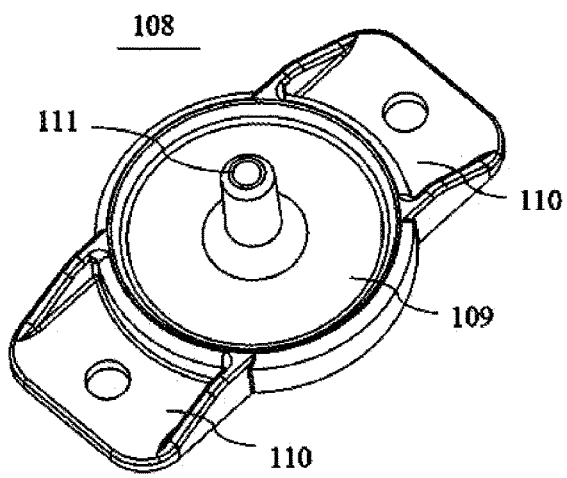
FIG. 24 is a schematic perspective view of an airtight nozzle.
Figure 25:
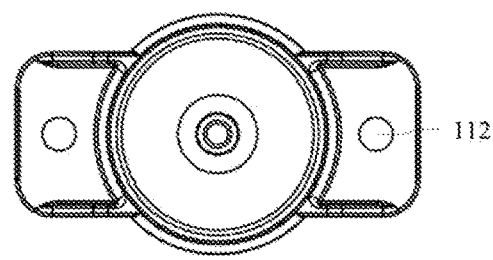
FIG. 25 is a schematic top view of the airtight nozzle.
Figure 26:
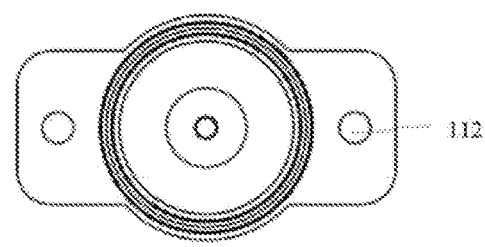
FIG. 26 is a schematic bottom view of the airtight nozzle.

As illustrated in FIG. 23, an inner side of the air filter hood 19 (i.e., a side near the casing) is further provided with raised columns 102. The raised columns 102 are located at edges of the air filter hood mounting portions 100 and matched with holes on the casing so as to positionally restrict the air filter hood 19 during installation. Each of the air filter hood mounting portions 100 is provided with a slope on the outside of the air filter hood 19 (i.e., the side facing away from the casing). After the air filter hood 19 is installed, the ventilation base 98 gradually protrudes from the casing.

As illustrated in FIG. 24 through FIG. 27, when the functional module is an airtight nozzle 108, an air tightness of the housing can be detected by a barometer. The airtight nozzle 108 can include a body part 109 installed at the function hole and mounting parts 110 extending outwards from the body part 109. Two mounting parts 110 may respectively extend from the body part 109 in two opposing directions and thus are symmetrically arranged on two sides of the body part.

Figure 27:
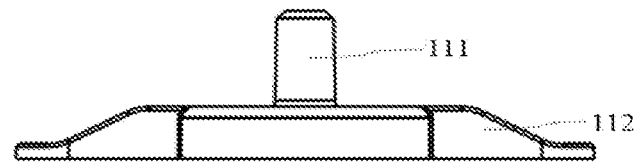
FIG. 27 is a schematic front view of the airtight nozzle.
Figure 28:
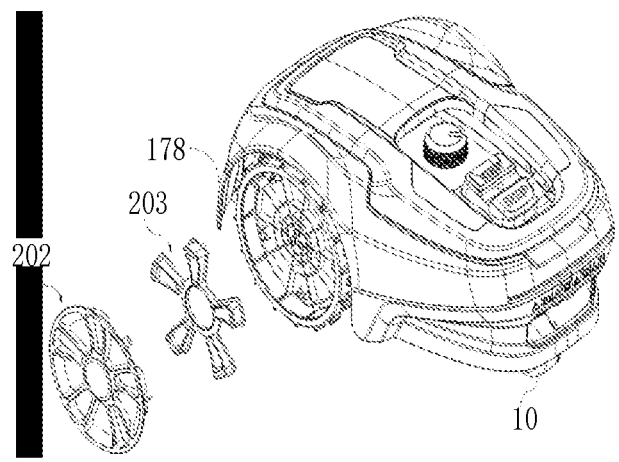
FIG. 28 is a schematic perspective view of the mower in which a walking wheel is exploded/disassembled.

As shown in FIG. 27, an outer side (i.e., a side facing away from the casing) of the body part 109 is provided with a conduct pipe 111 protrudes outwardly, and the conduct pipe 111 is suitable for connecting with the barometer to detect air tightness of the mower. Extending directions of the mounting parts 110 are perpendicular to an extending direction of the conduct pipe 111. As to the airtight nozzle 108, the mounting parts 110 and the case 18 are mechanically fixed by fasteners (not shown), and the fasteners may be suitable parts such as, without limiting, screws or bolts. Optionally, the mounting parts 110 are provided with corresponding mounting holes 112, and the mounting parts 110 and mechanically fixed onto the case 18 by screws. The outer side (i.e., a side facing away from the casing) of each of the mounting parts 110 is provided with a slope, and after the airtight nozzle 108 is installed, the body part 109 gradually protrudes from the casing.

As illustrated in FIG. 24 through FIG. 27, different functional modules can be installed at the function hole manually or by other means to facilitate the detection of the sealing state or the air pressure balance inside and outside of the case 18, for meeting the functional requirements of the mower in different working conditions. For example, during operation, the mower uses the air filter hood 19 to balance the air pressure inside and outside of the case 18 of the mower. In another example, when it is necessary to detect the air tightness, the air filter hood 19 may be replaced by the airtight nozzle 108, a rubber sleeve is sheathed on the conduct pipe 111 of the airtight nozzle 108, and a barometer is used to check whether an upper limit of inflation air pressure and a pressure holding capacity meet the standards, thus reliability of the seal is checked.

Referring to FIG. 1, FIG. 2, and FIG. 28 through FIG. 39, the mower can further include a walking/travelling assembly 8 configured for driving the mower to move forward. The walking assembly 8 may include at least one walking wheel 9 (i.e., driving wheel) disposed on the housing 1; and at least one universal wheel 10 disposed on the housing 1. The walking wheel 9 can include a wheel hub 178, a wheel cover 202 disposed on the wheel hub 178, and a wheel cover trim 203 detachably mounted on the wheel cover 202.

Figure 29:
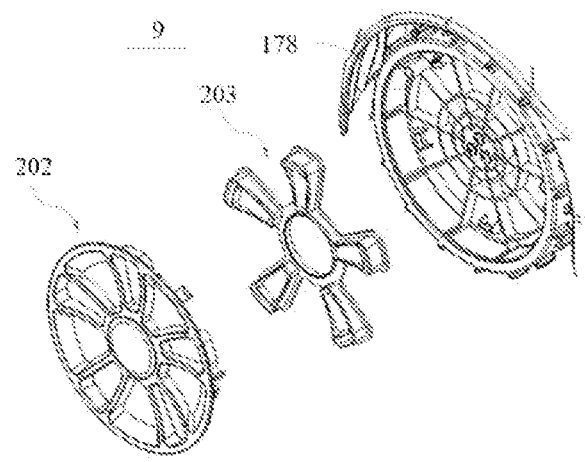
FIG. 29 is a schematic exploded view of the walking wheel.

As illustrated in FIG. 29, the wheel cover 202 and the wheel hub 178 are detachably assembled, and the wheel cover trim 203 is interposed between the wheel hub 178 and the wheel cover 202. When the wheel cover trim 203 is replaced, the wheel cover 202 is firstly removed from the wheel hub 178, then a new wheel cover trim 203 is assembled on the wheel cover 202. Finally, the wheel cover 202 and the wheel hub 178 are assembled together. The changing of the color of the walking wheel can be realized by replacing the wheel cover trim.

Figure 30:
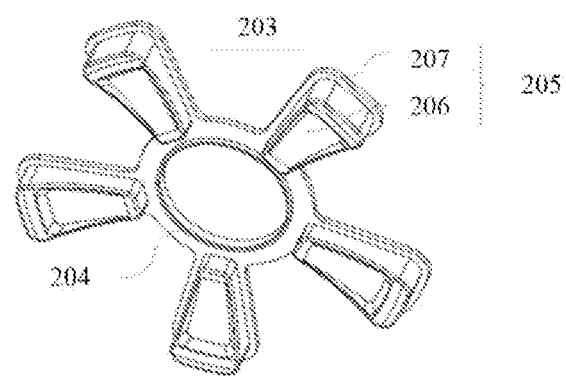
FIG. 30 is a schematic perspective view of a wheel cover trim observed at a front viewing angle.
Figure 31:
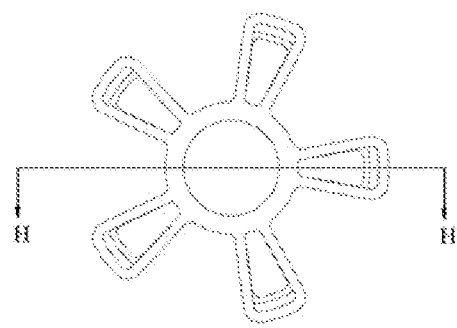
FIG. 31 is a schematic front view of a rear side of the wheel cover trim.
Figure 32:
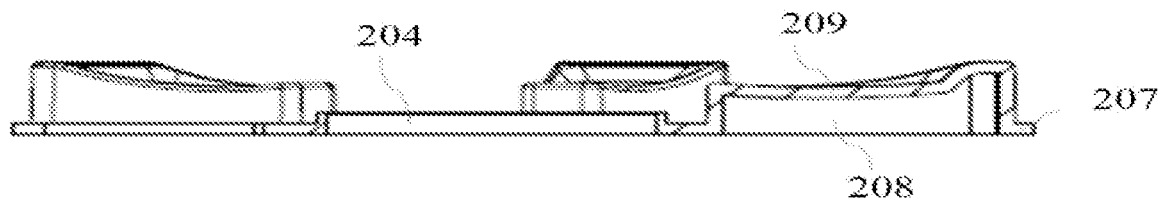
FIG. 32 is a schematic cross-sectional view taken along the line E-E in FIG. 31.

As illustrated in FIG. 30 through FIG. 32, the wheel cover trim 203 can include a middle portion 204 with multiple (i.e., more than one) protrusions 205 extending outward in the circumferential direction from the middle portion 204. The protrusions 205 are embedded in corresponding wheel cover mounting holes 210.

As illustrated in FIG. 30, the middle portion 204 has a ring-shaped body and coaxial with the wheel hub 178 and the wheel cover 202. The protrusions 25 can include a decorative block 206 adapted to the wheel cover mounting hole 210, and a flange 207 located on one side of the decorative block 206 and protruding from the decorative block 206. When the protrusion 205 is embedded in the corresponding wheel cover mounting hole 210, the decorative block 206 is fitted into the corresponding wheel cover mounting hole 210 and exposed from the outer side of the wheel cover 201. Further, the flange 207 may touch against the periphery of the wheel cover mounting hole 210.

As illustrated in FIG. 31 and FIG. 32, the rear side (i.e., a side near the wheel hub) of the wheel cover trim 203 is plane-shaped, and the front side (i.e., the side near the wheel cover) of the wheel cover trim 203 is protruded through the decorative block 206 so as to fit into the wheel cover mounting hole. In order to reduce the weight of the decorative block, the rear side of the decorative block 206 is formed with a weight reduction groove 208. The front side of the decorative block 206 is provided with a color-setting groove, and the groove bottom of the color-setting groove is provided with a corresponding color plate 209. Therefore, the color plate can be recessed in the color-setting groove to prevent the color plate from being worn and faded, thereby protecting the color plate. The color plate can be designed separately, or integrated with the color-setting groove to ensure consistence of color.

Figure 33:
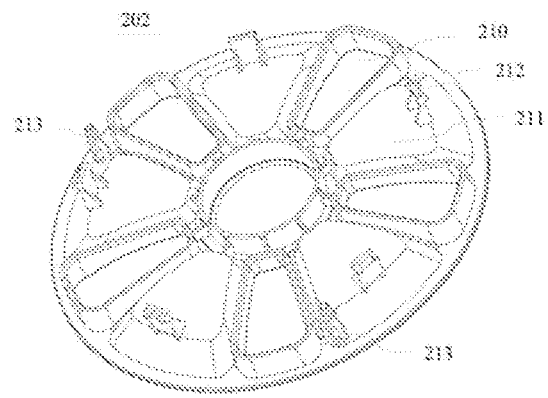
FIG. 33 is a schematic perspective view of an inner side of a wheel cover.
Figure 34:
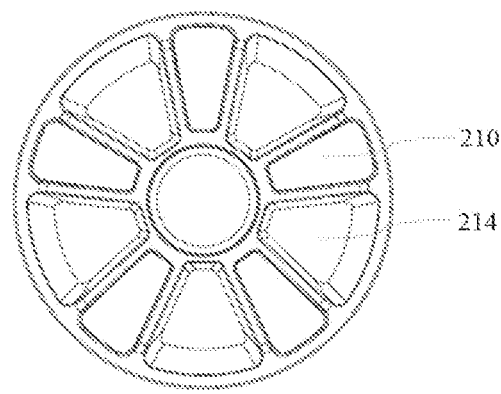
FIG. 34 is a schematic front view of an outer side of the wheel cover.

As illustrated in FIG. 33 and FIG. 34, multiple wheel cover mounting holes 210 are arranged in the circumferential direction of the wheel cover 202 and used to engage with the protrusions 205 of the wheel cover trim 203. There are inner protrusions 211 (located at the inner side of the wheel cover 202, i.e., the side near the wheel cover trim) and outer grooves 214 (located at the outer side of the wheel cover 202, i.e., the side away from the wheel cover) provided on intervals among the wheel cover mounting holes 210. An edge of the inner protrusion 211 is disposed with a fitting head 212 for engaging with the wheel hub 178. In particular, the inner protrusions 211 and the outer grooves 214 can adopt the same shape and structure design, or be designed with different shapes and structures, but they should not form through-holes, so as to ensure that the wheel cover is covered on the outer side of the walking wheel, and the internal structure of the walking wheel is sealed.

Figure 35:
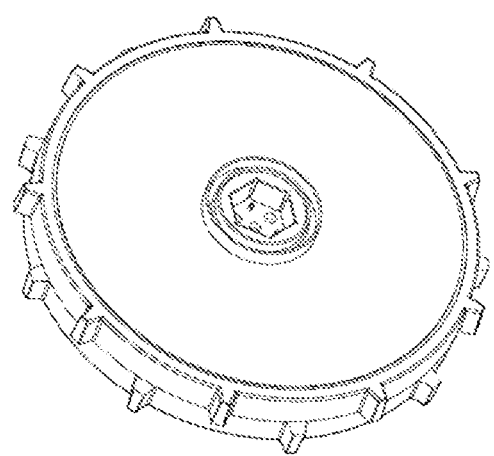
FIG. 35 is a schematic perspective view of an inner side of a wheel hub.
Figure 36:
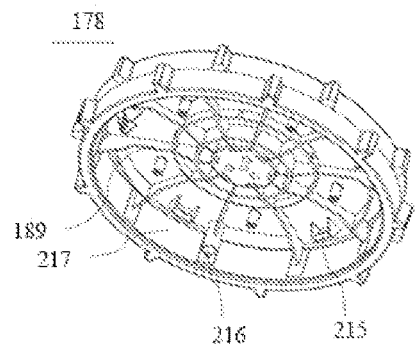
FIG. 36 is a schematic perspective view of an outer side of the wheel hub.
Figure 37:
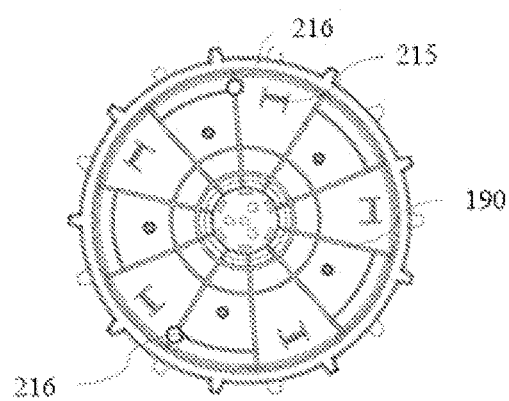
FIG. 37 is a schematic front view of the outer side of the wheel hub.

As illustrated in FIG. 35 through FIG. 37, the inner side (i.e., the side close to the housing) of the wheel hub 178 is flat to meet the overall assembling requirement of the mower. The outer side of the wheel hub 178 (i.e., the side close to the wheel cover trim) is provided with a wheel cover mounting location 217 for installing the wheel cover. On the wheel cover mounting location 217, there may be multiple reinforcing ribs 189 for supporting the wheel hub.

Figure 38:
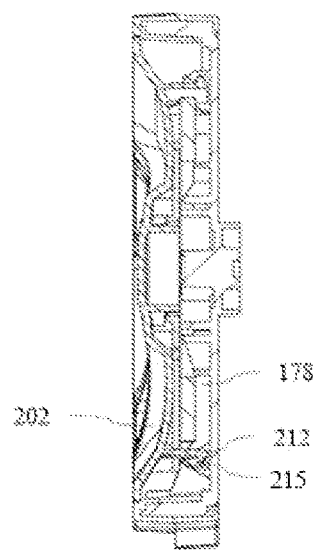
FIG. 38 is a schematic assembling diagram of a fastening member.

As illustrated in FIG. 38, multiple wheel hub fitting grooves 215 are provided in the wheel cover mounting location 217. The wheel hub fitting grooves 215 are evenly distributed on the circumference of the wheel hub 178 and form fastening members together with the fitting heads 212 of the wheel cover 202, so as to detachably install the wheel cover onto the wheel hub by the fastening members.

Figure 39:
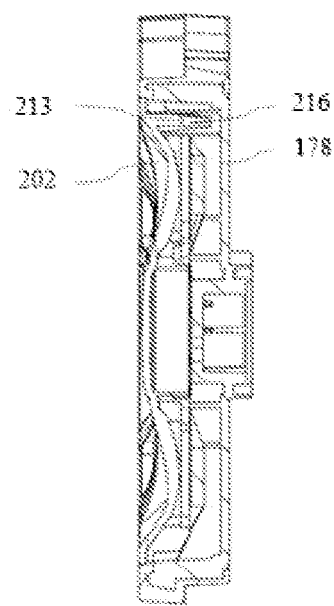
FIG. 39 is a schematic assembling diagram of a positioning member.

As illustrated in FIG. 39, the wheel cover 202 and the wheel hub 178 are positioned and installed by at least two asymmetrically arranged positioning members. The positioning members can include a positioning rod 213 arranged on the circumference of the wheel cover 202, and include a wheel hub positioning hole 216 arranged on the circumference of the wheel hub 178 and matched with the positioning rod 213. By inserting the positioning rod 213 into the corresponding wheel hub positioning hole 216, the wheel cover 202 and the hub 178 are positioned and then assembled together.

Referring to FIG. 2, and FIG. 40 through FIG. 51, a process of implementable assembling the walking assembly 8 is illustrated. The machine body is provided with two walking wheels 9 located at two sides of the machine body respectively. The walking wheels 9 generally are arranged at the front of the machine body. The two walking wheels 9 are respectively driven by two drive motors. If rotation speeds of the drive motors are different, the mower may turn toward one direction; if the rotation speeds of the drive motors are the same, the mower may travel in a straight line; and if the rotation speeds of the drive motors are opposite, the mower may perform a turn-around at the same position. There is at least one universal wheel 10 disposed at the rear of the machine body. The mower is supported by the walking wheels 9 and the universal wheel 10 when moving around. The universal wheel 10 provides convenient for the turning of the mower.

Figure 40:
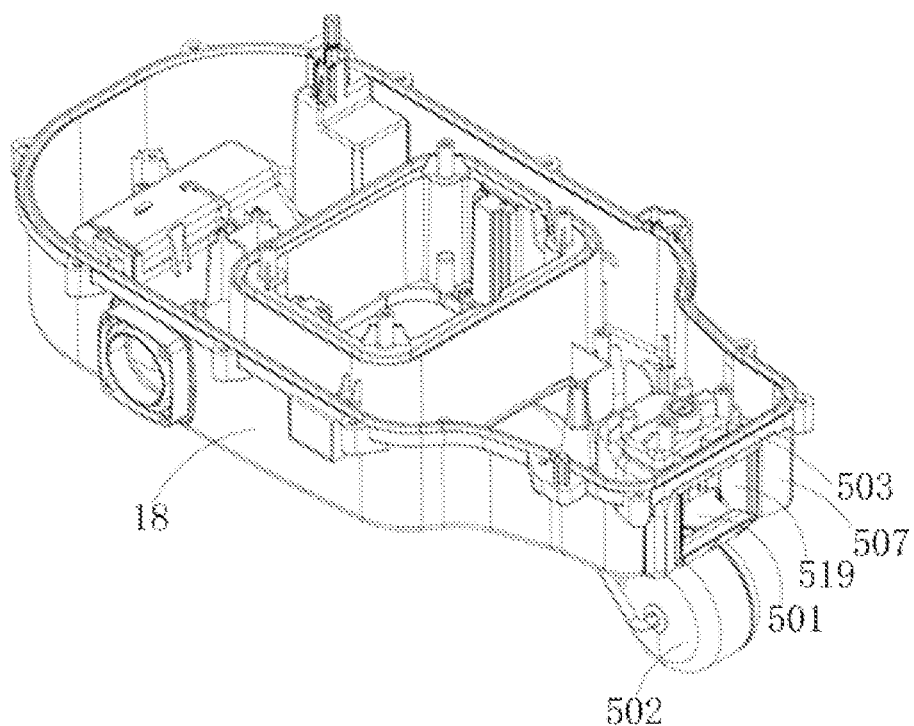
FIG. 40 is a schematic perspective view of a lower casing and a combination device of the mower of the disclosure.
Figure 41:
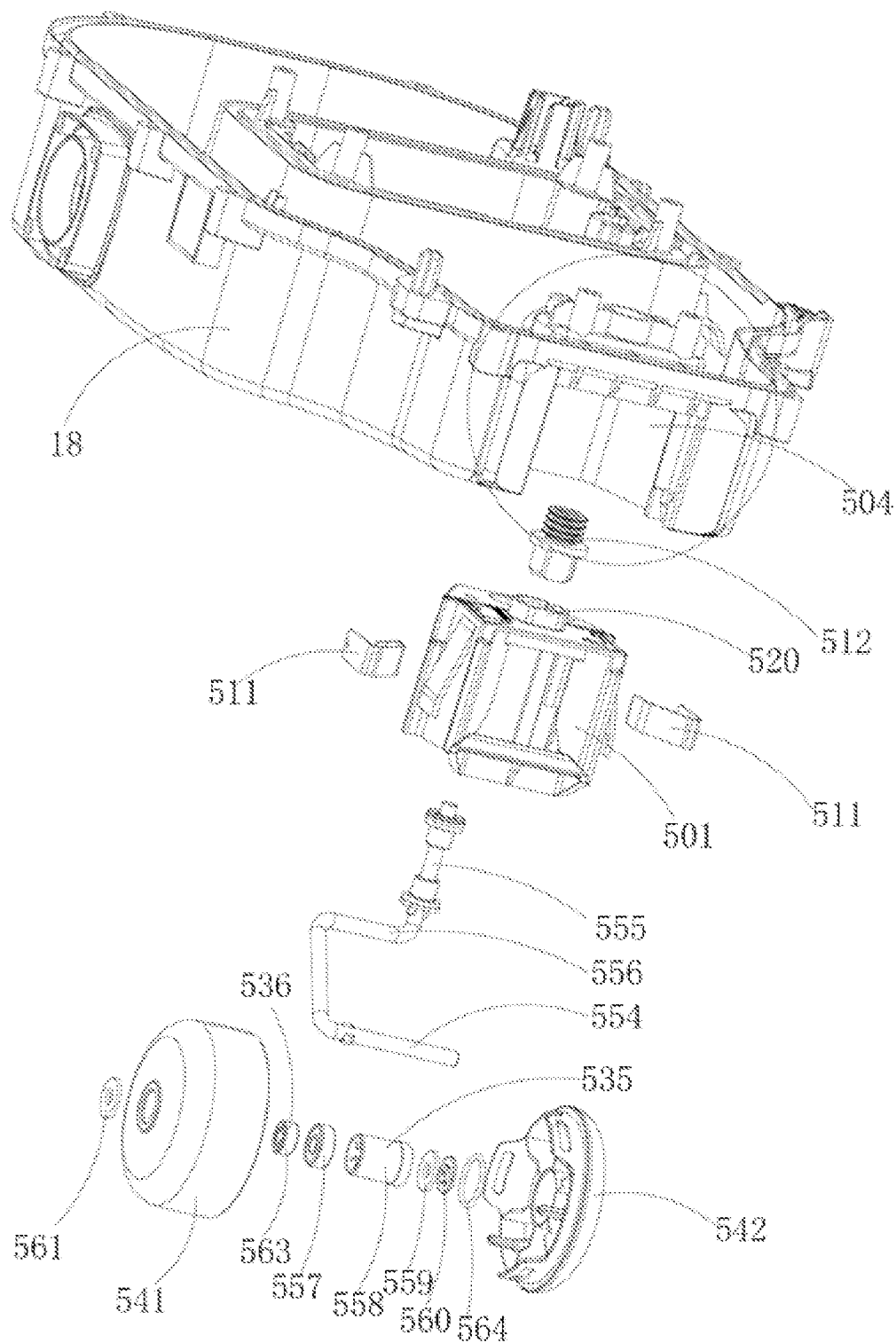
FIG. 41 is a schematic exploded view of the lower casing and the combination device in FIG. 40.

As illustrated in FIG. 3, FIG. 40 and FIG. 41, the disclosure provides a combination structure (or combination device). The combination structure can include a charging interface assembly 501 and a wheel assembly 502. The charging interface assembly 501 is electrically connected to a charging circuit, and the wheel assembly 502 and the charging interface assembly 501 form an integrated molding structure. The case 18 is provided with a cover 503 covering the charging interface assembly 501, and the cover 503 is matched with an outer contour of the charging interface assembly 501. The case 18 is provided with a receiving part 504 for accommodating the combination structure, and the receiving part 504 is arranged at the front or bottom of the case 18. Specifically, the cover 503 is formed on the case 18, and the receiving part 504 is below the cover 503.

Figure 42:
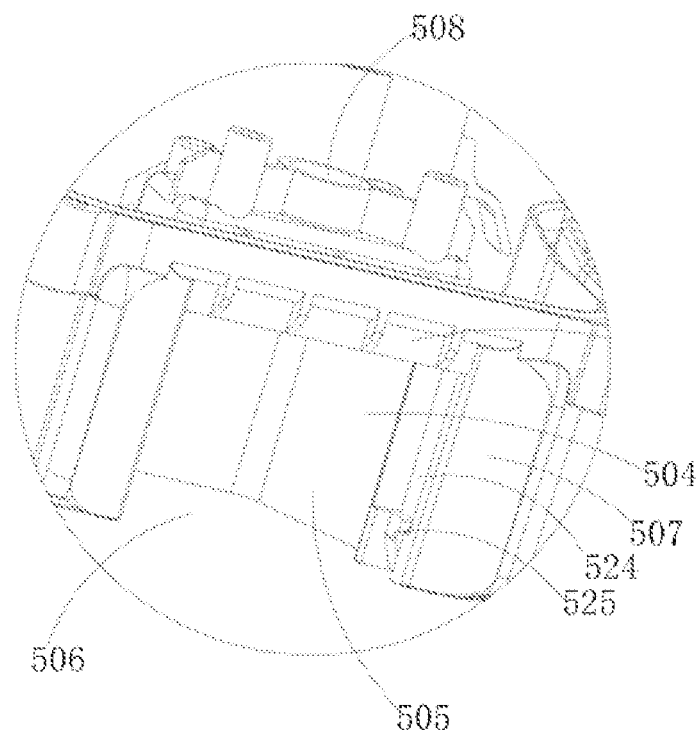
FIG. 42 is a schematic enlarged view of the circle portion in FIG. 41.
Figure 43:
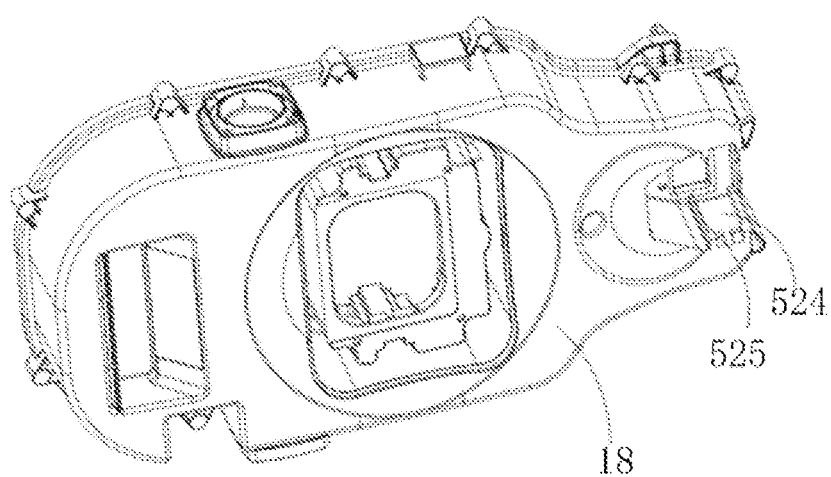
FIG. 43 is a schematic perspective view of the lower casing in FIG. 41.
Figure 44:
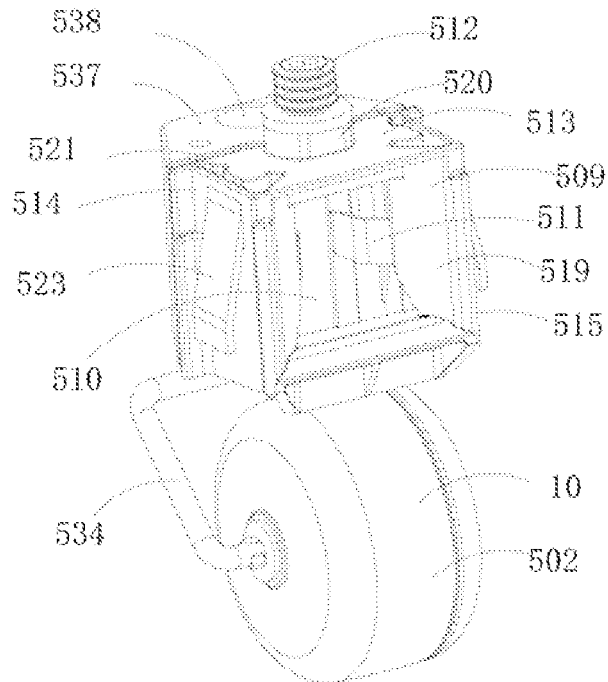
FIG. 44 is a schematic perspective view of the combination device in FIG. 41.
Figure 45:
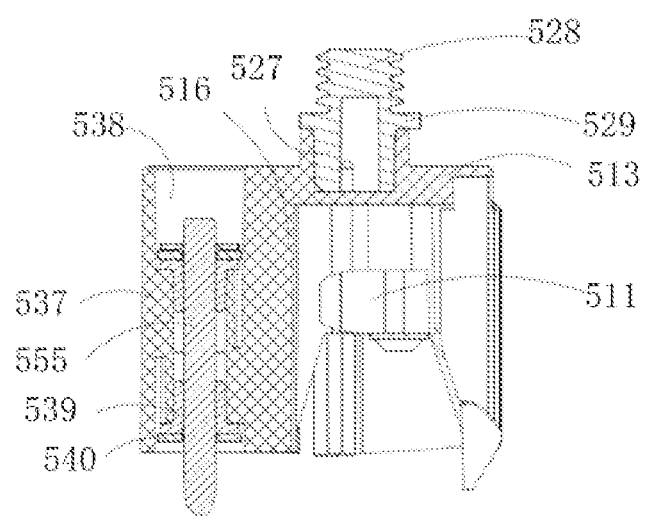
FIG. 45 is a schematic cross-sectional view of the combination device in FIG. 44 after removing a support wheel.
Figure 46:
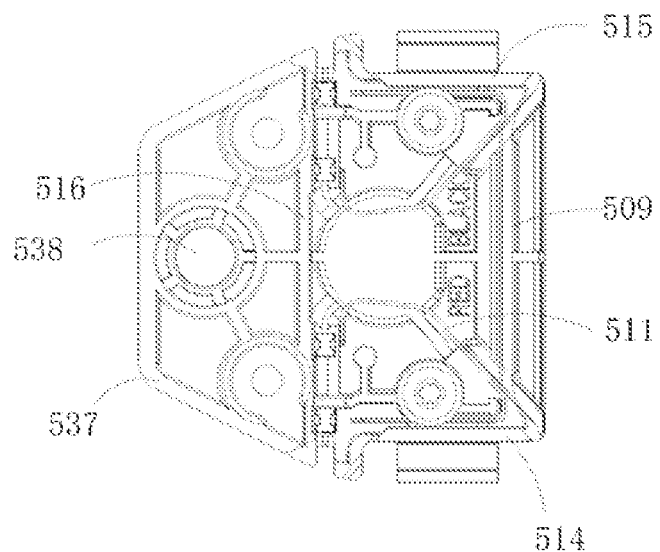
FIG. 46 is a schematic bottom view of a charging interface assembly and a support wheel mounting seat in FIG. 44.
Figure 47:
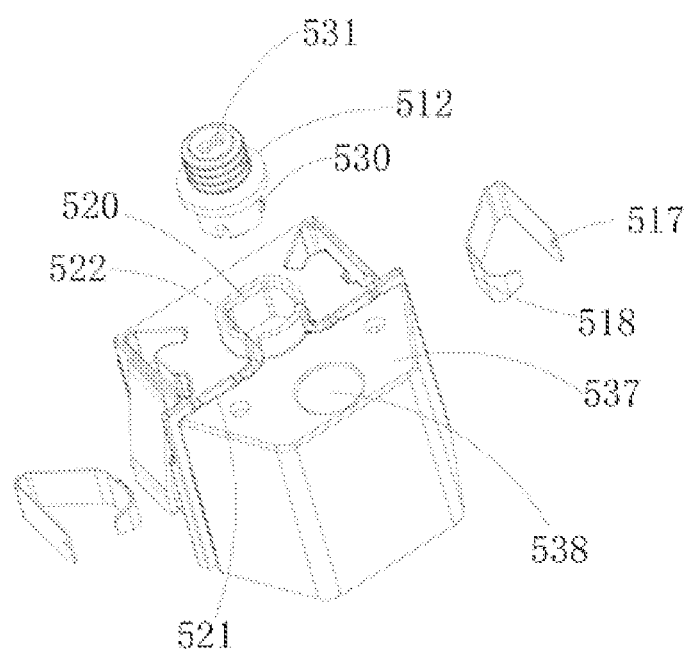
FIG. 47 is a schematic perspective view of the charging interface assembly and the support wheel mounting seat in FIG. 44.
Figure 48:
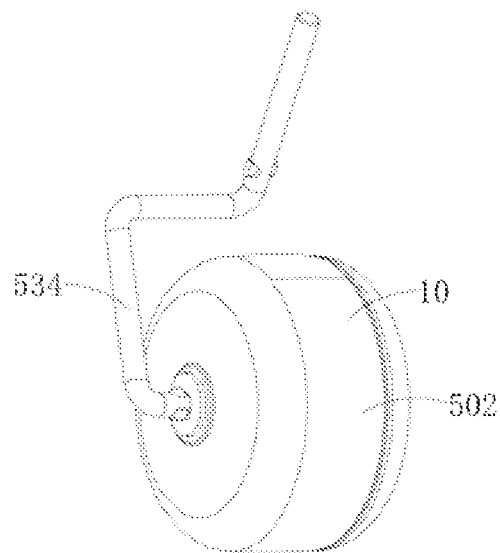
FIG. 48 is a schematic perspective view of a wheel assembly of the discourse after removing the support wheel mounting seat.

Please refer to FIG. 41 and FIG. 42 together, the receiving part 504 is provided with a charging opening 505 and a mounting opening 506 at the front and bottom of the case 18 respectively, so as to facilitate the installation of the charging interface assembly 501 and the using of a charging connector to mate with the charging interface assembly 501 from the front. The case 18 is provided with a pair of first guiding pieces 507 located on both sides of the charging opening 505 in an oblique manner. The cover 503 is provided with a cylindrical first wire-through portion 508.

As illustrated in FIG. 44 through FIG. 47, the charging interface assembly 501 can include a charging socket 509, a charging interface 510 disposed on the charging socket 509, charging terminals 511, and a charging seal 512. The charging terminals 511 include at least a pair of guiding pieces electrically connected to a charging circuit. The charging terminals 511 are installed on two sides of the charging socket 509 and extend into the charging interface 510.

As illustrated in FIG. 44 through FIG. 49, the charging socket 509 can include a top wall 513, opposite first and second side walls 514, 515, and a third side wall connecting the first and second side walls 514, 515. The first side wall 514, the second side wall 515, the third side wall 516, and the top wall 513 together define the charging interface 510. The charging terminals 511 are fixed on the charging socket 509. Each of the charging terminals 511 include a connecting end 517 connected to a charging cable and a charging end 518 in contact with a charging connector. The charging interface 510 is arranged at the rear of the charging opening 505. The charging socket 509 is disposed with a pair of second guiding pieces 519 located at the rear of the first guiding pieces 507 and arranged obliquely to guide the charging connector to connect into the charging interface 510.

As illustrated in FIG. 44 through FIG. 49, a second wire-through portion 520 corresponding to the first wire-through portion 508 is disposed at the top of the charging socket 509 and connects with the charging interface 510. The charging socket 509 is further disposed with a wire positioning groove 521 for connecting with the second wire-through portion 520. The second wire-through portion 520 and the wire positioning groove 521 are illustratively located on the top wall 513. The second wire-through portion 520 is cylindrical, and a notch 522 is formed on the second wire-through portion 520. The wire positioning groove 521 connects with the second wire-through portion 520 through the notch 522. The wire positioning groove 521 first extends to both sides of the charging socket 509, and then extends a distance downward to connect with the charging interface 510.

As illustrated in FIG. 44 through FIG. 49, the charging interface assembly 501 is provided with retainers 523 for fixing with the case 18, and the retainers 523 are disposed on the charging socket 509. Specifically, the retainers 523 are a pair of resilient sheets respectively arranged at two sides of the charging socket 509. Upper ends of the resilient sheets are connected with the charging socket 509, and lower ends of the resilient sheets are free ends. The receiving part 504 is provided with sliding grooves 524 for receiving the resilient sheets, and bottoms of the sliding grooves 524 are provided with protrusions 525 that engage with the lower ends of the resilient sheets. When assembling, the charging socket 509 may be put upwards into the receiving part 504 along the sliding grooves 524, and the resilient sheets may be resiliently deformed downwards in the process of extending. When being installed in place, the resilient sheets will restore and snap into the two protrusions 525 to prevent the charging socket 509 from moving downwards.

As illustrated in FIG. 44 through FIG. 49, the charging seal 512 are matched with both the second wire-through portion 520 and the first wire-through portion 508, so as to lead the charging cable into the case 18 in a sealed manner. A part of the charging seal 512 matched with the first wire-through portion 508 is a threaded structure, another part of the charging seal 512 matched with the second wire-through portion 520 is formed with notches 526. The charging seal 512 can include a hollow cylindrical shape. Further, the charging seal 512 can include a first fixing part 527 installed on the second wire-through portion 520, a second fixing part 528 fixed to the first wire-through portion 508, and a connecting part 529 connecting the first fixing part 527 and the second fixing part 528. An outer diameter of the connecting part 529 is greater than the outer diameters of the first fixing part 527 and the second fixing part 528. The connecting part 529 is located between the second wire-through portion 520 and the first wire-through portion 508 and acts as a buffer. Two notches 530 are defined at the lower end of the first fixing part 527.

As illustrated in FIG. 44 through FIG. 49, after the charging seal 512 is assembled with the second wire-through portion 520, the notches 522 and the notches 530 are aligned with each other. An outer side of the second fixing part 527 is provided with threads to increase friction between the charging seal 512 and the case 18. A top end of the second fixing part 527 is provided with two wire-through holes 531 for allowing the charging cable to pass through. One end of the charging cable is welded to the connecting end 517. The other end of the charging cable enters the charging seal 512 through the wire positioning groove 521, sequentially passes through the notches 522 and the notches 530, and finally passes through the wire-through holes 531 and enters into the case 18. The opening size of the wire-through hole 531 is set to be slightly smaller than the outer diameter of the charging cable, so that the charging cable fits tightly with the charging seal 512 in the wire-through hole 531.

As illustrated in FIG. 40, FIG. 41, FIG. 44, FIG. 45, FIG. 48 and FIG. 49, the wheel assembly 502 can include, among other components, a wheel shaft 534 which the universal wheel 10 mounted to, a wheel shaft positioning assembly 535, a sealing assembly 536, and a support wheel mounting seat 537. In the illustrated embodiment, the support wheel mounting seat 537 and the charging interface assembly 501 form an integrated structure. Specifically, the support wheel mounting base 537 and the charging socket 509 are an integrally-constructed structure (also referred to as one-piece structure). Please also refer to FIG. 47, in which the support wheel mounting seat 537 is arranged behind the third side wall 516, the support wheel mounting seat 537 is provided with a mounting hole 538 extending from top to bottom, and the wheel shaft 534 is fixed in the mounting hole 538. Specifically, the wheel shaft 534 extends upward into the mounting hole 538 and is fixed in the mounting hole 538 by two shaft sleeves 539 and fasteners 540.

Figure 49:
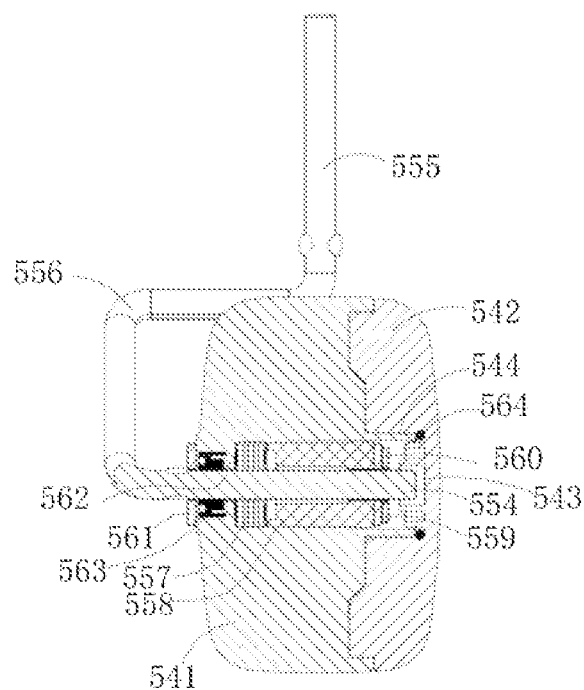
FIG. 49 is a schematic cross-sectional view of the wheel assembly in FIG. 48 after removing the support wheel mounting seat.

As illustrated in FIG. 49, the universal wheel 10 can include a first half-wheel 541 and a second half-wheel 542. The first half-wheel 541 and the second half-wheel 542 are engaged with each other to form an accommodating cavity 543. The wheel shaft 534 passes through the first half-wheel 541 and enters the accommodating cavity 543. The accommodating cavity 543 can include a first fitting gap formed by the first half wheel 541 and the wheel shaft 534, and a second fitting gap formed by the first half wheel 541 and the second half wheel 542. The first fitting gap and the second fitting gap are respectively located on two sides of the accommodating cavity 543.

Figure 50:
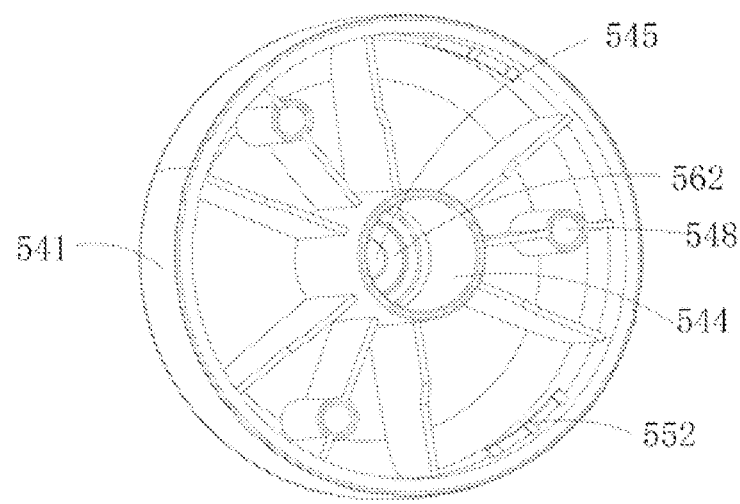
FIG. 50 is a schematic perspective view of a first half-wheel in FIG. 49.
Figure 51:
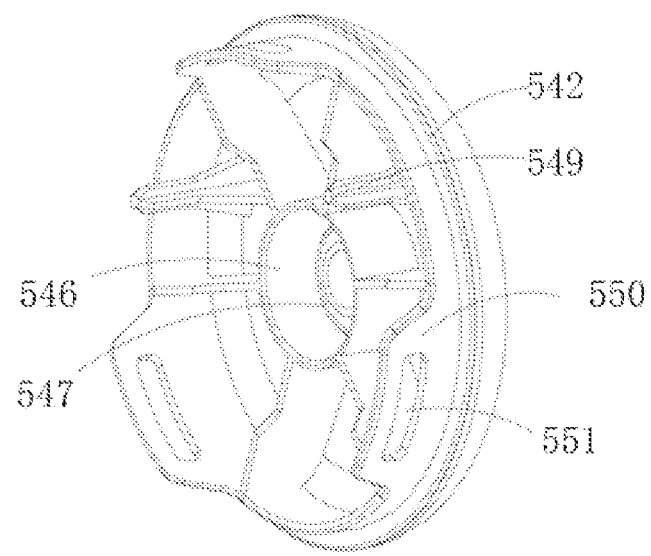
FIG. 51 is a schematic perspective view of a second half-wheel in FIG. 49.

As illustrated in FIG. 49 through FIG. 51, the first half-wheel 541 and the second half-wheel 542 are disk-shaped respectively. The first half-wheel 541 is provided with a first cylindrical portion 544 protruding toward the second half-wheel 542, and one side of the first cylindrical portion 544 is provided with a through-hole 545 allowing the wheel shaft 534 to pass through. The second half-wheel 542 is provided with a second cylindrical portion 546 and a third cylindrical portion 547 protruding toward the first half-wheel 541, and a ring groove (not labelled) is formed between the second cylindrical portion 546 and the third cylindrical portion 547. When the first half wheel 541 and the second half wheel 542 are engaged, the first cylindrical portion 544 extends into the ring groove. The first cylindrical portion 544 and the second cylindrical portion 546 together form the accommodating cavity 543. Since the two half-wheels are assembled with each other, two fitting gaps will be generated to affect the overall sealing of the accommodating cavity 543. One of them is the first fitting gap formed between the through hole 545 and the first half wheel 541, and the other is the second fitting gap formed between the first cylindrical portion 544 and the second cylindrical portion 546.

As illustrated in FIG. 50 and FIG. 51, the first half wheel 541 is provided with multiple mounting holes 548, and the second half wheel 542 is provided with multiple mounting posts 549 corresponding to the mounting holes 548. In addition, the second half-wheel 542 is provided with multiple engaging members 550 in the circumferential direction. Each of the engaging members 550 are provided with an engaging opening 551. The first half-wheel 541 is provided with a locking block 552 which is matched with a corresponding engaging member 550, and the locking block 552 is capable of being snapped into a corresponding engaging opening 551. Furthermore, each of the first half-wheel 541 and the second half-wheel 542 are provided with a number of reinforcing ribs (not labeled).

As illustrated in FIG. 41 through FIG. 49, the wheel shaft 534 can include a horizontal support portion 554 mounted on the support wheel 553, a vertical mounting portion 555 mounted on the support wheel mounting seat 537, and a connecting portion 556 connecting the support portion 554 and the mounting portion 555. The wheel shaft 534 extends via the through hole 545 into the accommodating cavity 543, and its end is located in the third cylindrical portion 547 of the second half-wheel 542.

As illustrated in FIG. 41 through FIG. 49, the wheel shaft positioning assembly 535 can include, sequentially arranged on the wheel shaft 534, a bearing 557, a bearing pressing block 558, a washer 559, a bearing clamp 560, and a washer 561 located outside the first half-wheel 541. The wheel shaft positioning assembly 535 can be used to rotatably install the universal wheel 10 on the wheel shaft 534. The bearing 557, the bearing pressing block 558, the washer 559, the washer 561, and the bearing clamp 560 are all arranged on the support portion 554. The first half wheel 541 is provided with a ring portion 562 near the through hole 545, and the ring portion 562 and the washer 561 cooperatively limit the position of a first seal 563.

As illustrated in FIG. 49, the sealing assembly 536 can include the first seal 563 for sealing the first fitting gap and a second seal 564 for sealing the second fitting gap, so as to protect the wheel shaft 534 and the wheel shaft positioning assembly 535 in the accommodating cavity 543. In one embodiment, the first seal 563 is an oil seal, the second seal 564 is an O-ring gasket, and the second seal 564 is located in the ring groove and touches against the first cylindrical portion 544.

As illustrated in FIG. 44 through FIG. 49, when assembling, the combination device is first assembled into one unit, and the charging cable, the charging terminals 511 and the charging seal 512 are then assembled onto the charging socket 509. One end of the charging cable is welded to the charging terminals, and the other end passes through the charging seal 512. Afterwards, the combination device as a whole is assembled into the receiving part 504 of the case 18 from below the mounting opening 506, the charging cable is inserted into the first wire-through portion 508, the lower part of the charging seal 512 and the charging socket 509 are tightly sealed, and the upper part of the charging seal 512 is tightly sealed with the case 18.

Referring to FIG. 40 through FIG. 51, by integrating the wheel assembly and the charging interface unit, the electric equipment of the disclosure is not only compact in structure, but can effectively reduce the overall volume. Sine the above two components are integrated and then fastened to the casing, it makes the assembling of the whole machine convenient.

In addition, a charging seal is provided at the connection between the charging interface unit and the inside of the casing. The charging seal allows the charging cable to pass through while isolating inside and outside of the casing and keeping the inside of the casing to be sealed. Furthermore, in the disclosure, the first seal and the second seal are arranged on both sides of the accommodating cavity, so that the accommodating cavity can provide good sealing performance, so as to protect metal parts such as the bearing therein and seal the key parts of the wheel shaft.

Figure 52:
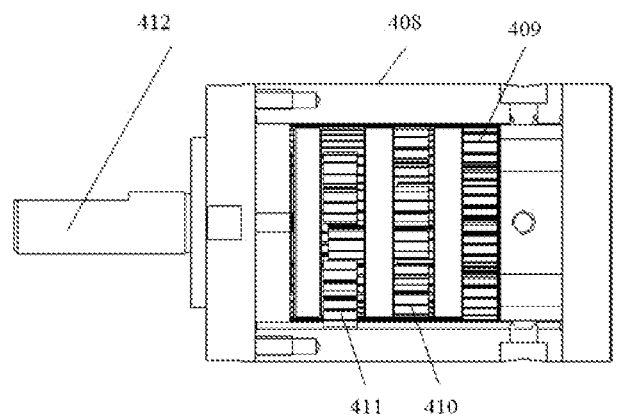
FIG. 52 is a schematic structural view of an embodiment of a planetary gearbox of the disclosure.
Figure 53:
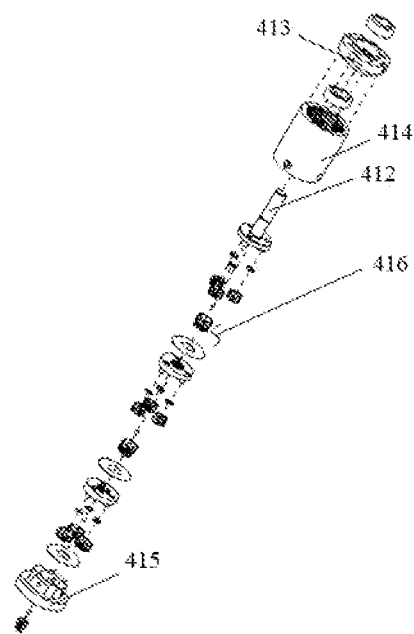
FIG. 53 is a schematic structural exploded view of the planetary gearbox in FIG. 52.
Figure 54:
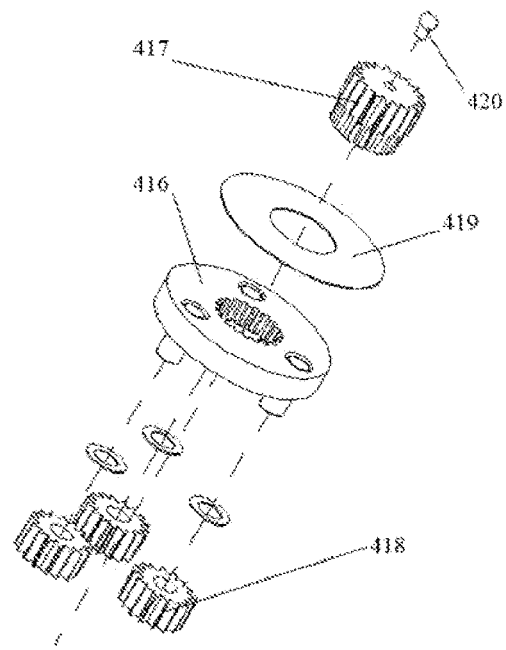
FIG. 54 is a schematic partial structural view of the planetary gearbox in FIG. 53.

Referring to FIG. 52 through FIG. 54, a planetary gearbox can include a housing 408 having an upper cover 413, an internal ring gear 414, and a bottom casing 415. A planetary gear device 414 is arranged in the housing 408 and is connected with an output shaft 578 to output power. The planetary gear device 414 can include at least a first planetary gear assembly 409. The first planetary gear assembly 409 can include a planet carrier 416, a sun gear 417, and multiple planet gears 418. The planet gears 418 mesh with the sun gear 417 and the planet carrier 416 respectively. The sun gear 417 and the planet carrier 416 are separated structures, and the sun gear 417 and the planet gears 418 are installed on the planet carrier 416 in coordination. The sun gear 417 and the planet carrier 416 are separately manufactured and then assembled. The gears and the planet carrier 416 are precision manufactured to improve the accuracy of the gears. The precision level of powder metallurgy parts generally should be level 7, while the precision of the finished gears is level 4-6, so it can significantly improve the degree of fit and reduce noise. Optionally, the teeth profile of the sun gear can be implemented using involute spline teeth. Compared with rectangular splines, the involute splines have the advantages of more teeth, thicker teeth ends and roots, stronger load-bearing capacity, easier self-centering and higher installation accuracy. When used in garden tools such as an intelligent mower (robotic mower), the involute spline teeth profile can achieve better noise reduction and higher precise control effects.

As illustrated in FIG. 54, a washer 419 is arranged between the planet carrier 416 and the sun gear 417 to avoid overheating friction between the sun gear 417 and the planet carrier 416. The sun gear 417 is equipped with a rolling pin shaft 420, and the usage of the rolling pin shaft 20 can reduce the friction area, reduce the noise, and improve the transmission efficiency of the gearbox.

As illustrated in FIG. 54, the planetary gears 418 of the first planetary gear assembly 409 may be plastic gears. The sun gear 417 and the internal ring gear 414 may be metal gears. When plastic planetary gears mesh with metal gears, noise can be effectively reduced due to the elastic cushioning effect of plastics.

As illustrated in FIG. 53, the planetary gear device 414 can include a first planetary gear assembly 409 and a second planetary gear assembly 410. The second planetary gear assembly 410 is disposed above the first planetary gear assembly 409 and connected to the output shaft. The planet gears 418 of the first planetary gear assembly 409 are plastic gears, while the sun gear 417 and the internal ring gear 414 are metal gears. The planet gears 418, the sun gear 417, and the internal ring gear 414 of the second planetary gear assembly 410 are metal gears. Alternatively, the planet gears 418 of the first planetary gear assembly 409 and the second planetary gear assembly 410 are plastic gears, and the sun gears 417 and the internal ring gears 414 are metal gears.

As illustrated in FIG. 52 through FIG. 54, the planetary gear device 414 can include a first planetary gear assembly 409, a second planetary gear assembly 410, and a third planetary gear assembly 411. The first planetary gear assembly 409, the second planetary gear assembly 410, and the third planetary gear assembly 411 are sequentially arranged from bottom to top, with the third planetary gear assembly 411 being connected to the output shaft. The planet gears 418 of the first planetary gear assembly may be plastic gears, the sun gear 417 and the internal ring gear 414 may be metal gears. The planet gears 418, the sun gears 417 and the internal ring gears of the second planetary gear assembly 410, and the third planetary gear assembly 411 may be metal gears. Since the second planetary gear assembly 410 and the third planetary gear assembly 411 have low gear speeds and large transmission torques, the gears made of metal materials can support a large transmission ratio.

Alternatively, the planet gears 418 of the first planetary gear assembly 409, the second planetary gear assembly 410, and the third planetary gear assembly 411 may be plastic gears, and the sun gears 417 and the internal ring gears 414 may be metal gears. In the case of relatively small transmission ratio, the second planetary gear assembly 410 and the third planetary gear assembly 411 may also use plastic planetary gears. A transmission ratio of the first planetary gear assembly 409 may be about 6.3, a transmission ratio of the second planetary gear assembly 410 may be about 3.79, a transmission ratio of the third planetary gear assembly 411 may be about 3.79, and the total transmission ratio may be about 90.3. The planetary gearbox provided by the disclosure can reduce the noise generated in the transmission process, with more stable transmission torque, and high degree of coordination.

Figure 55:
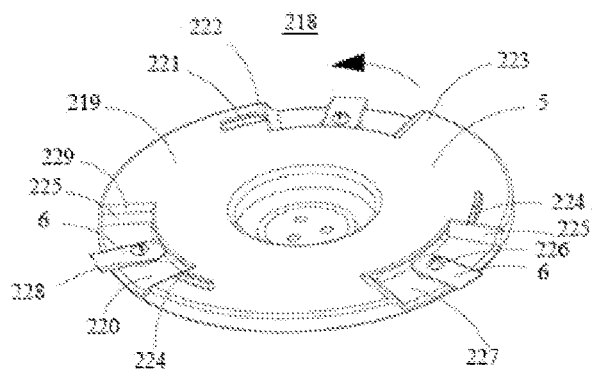
FIG. 55 is a schematic perspective view of a blade carrier disc assembly of the disclosure.
Figure 56:
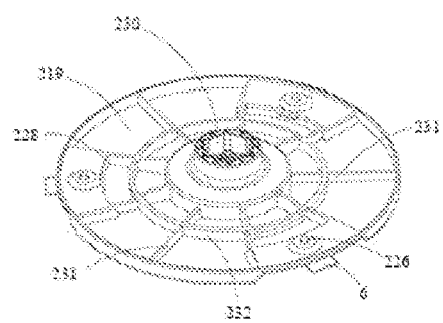
FIG. 56 is a schematic perspective view of the blade carrier disc assembly in FIG. 55 from another viewing angle.

Referring to FIG. 55 and FIG. 56, the disclosure also provides a blade carrier disc assembly 218 for mowing lawns and other similar operations. The blade carrier disc assembly 218 can include a blade carrier disc 5 and blades 6 mounted on the blade carrier disc 5.

Figure 57:
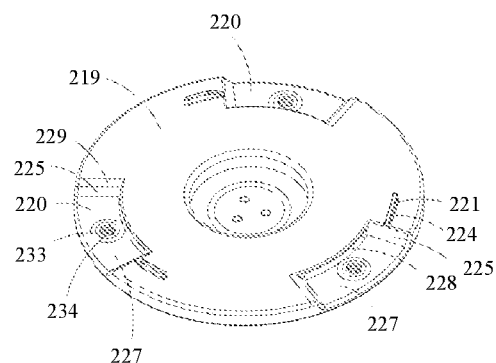
FIG. 57 is a schematic perspective view of the blade carrier disc.

As illustrated in FIG. 55 through FIG. 57, the blade carrier disc assembly 218 can include a disc body 219, with blade mounting grooves 220 recessed inwardly from the edge of the disc body 219 along an axial direction of the disc body 219. In the illustrated embodiment, the disk body 219 may be circular. In other embodiments, the disk body 219 can also be set in other shapes as needed, such as a regular polygon. The disc body 219 is provided with guide platforms 221 on the side facing the lawn. An axle sleeve 230 and reinforcing ribs 231 are provided on the side of the disc body 219 facing away from the lawn. Each the guide platform 221 is provided by protruding outward from the side of the disc body 219 facing the lawn. The guide platform 221 is adjacent to the blade mounting groove 220 and is located on the first grass-incoming side of the blade mounting groove 220.

When the blade carrier disc assembly 218 rotates counterclockwise in the direction of the arrow shown in FIG. 55, the first grass-incoming side of the blade mounting groove 220 may be deemed the first side 222, and a secondary grass-incoming side may be deemed the second side 223. When the blade carrier disc assembly 218 rotates clockwise in the opposite direction of the arrow shown in FIG. 55, the first grass-incoming side may be deemed the second side 223, and the secondary grass-incoming side may be deemed the first side 222. With this arrangement, the guide platform 221 can touch the grass before the blade mounting groove 220, so that the guide platform 221 first straightens and cleans the long grass on the lawn before the blade 6 cuts the grass, thereby preventing long grass, long vines, etc. from being entangled on the blade 6.

A guiding wall 224 is provided on the side of the guide platform 221 facing away from the rotation direction of the disk body 219. In the illustrated embodiment, each blade mounting groove 220 corresponds to one guide platform 221, and the guide platform 221 is located on the first grass-incoming side of the blade mounting groove 220. In other embodiments, the first grass-incoming side of the blade mounting groove 220 may be provided with multiple guide platforms 221 as required, or the guide platforms 221 may be provided on both the first grass-incoming grass side and the secondary grass-incoming side of the blade mounting groove 220. In the illustrated embodiment, the side of the guide platform 221 facing away from the disc body 219 is a smooth protrusion. In other embodiments, the side of the guide platform 221 facing away from the disc body 219 can be provided cutting edges (not shown) so as to enhance the ability of the guide platform 221 to straighten out and clean up long grass and long vines. In the illustrated embodiment, the guide platform 221 is in the shape of an arc. In other embodiments, the guide platform 221 may also be configured in other shapes, such as a V-shape.

Please refer to FIG. 56, the axle sleeve 230 is located at a center of the side of the disc body 219 facing away from the lawn. The axle sleeve 230 is used to operate with an output shaft of a power mechanism, so that the blade carrier disc assembly 218 rotates under the power from the output shaft. The reinforcing ribs 231 are arranged along the radial direction of the disc body 219 and are evenly distributed around the axle sleeve 230 along the circumference of the disc body 219. In one embodiment, the side of the disc body 219 facing away from the lawn can further include secondary reinforcing ribs 232 arranged in the circumferential direction, so as to further enhance the strength of the disc body 219.

Figure 58:
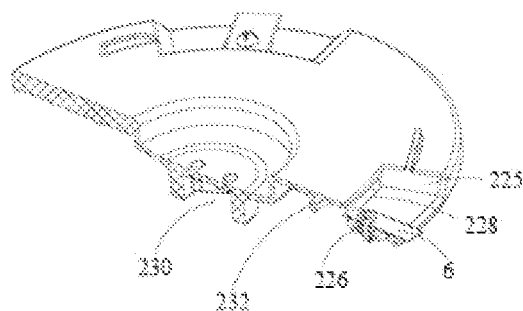
FIG. 58 is a schematic cross-sectional view of the blade carrier disc assembly in FIG. 56.
Figure 59:
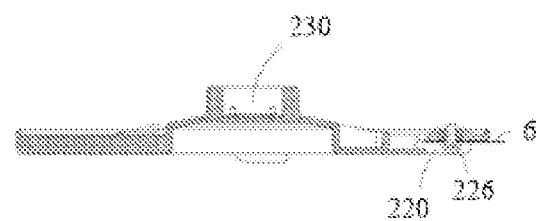
FIG. 59 is a schematic plan view of a cross-section of the blade carrier disc assembly in FIG. 58.

Referring to FIG. 57 through FIG. 59, each blade mounting groove 220 is formed by recessing inward from the side of the disc body 219 facing toward the lawn, and located between the adjacent two reinforcing ribs 231. The blade 6 is installed in the blade mounting groove 220 by a fastener 226 and arranged as such that in the axial direction of the disc body 219, the blade 6 and the fastener 226 do not protrude out of the blade mounting groove 220. With this arrangement, the blade 6 can be hidden in the blade mounting groove 220, so as to prevent the blade 6 and the fastener 226 from colliding with hard objects on the lawn, and prevent the fastener 226 from being removed. Moreover, such arrangement can also prevent the blade 6 from directly contacting broken grass and soil on the lawn, thereby effectively preventing the broken grass from being entangled on the blade 6, and preventing the soil from entering between the blade 6 and the fastener 226.

The blade mounting groove 220 can include a groove bottom wall 227 and groove side walls 225 located on both sides of the groove bottom wall 227. The groove bottom wall 227 is provided with a boss 233 and a mounting hole 234 recessed inward from the boss 233. The blade 6 is detachably mounted on the boss 233 through the fastener 226 and the mounting hole 234. Such configuration can effectively reduce the friction between the blade 6 and the disc body 219, thereby avoiding disadvantageous large friction from blades being conventionally and directly mounted on the disc body 219, and improving the working efficiency of the blade carrier disc assembly 218.

The angle between the groove bottom wall 227 and the groove side wall 225 is an obtuse angle, and a chamfer 229 is provided at the intersection of the groove side wall 225 and the disc body 219; such configuration can effectively reduce the friction between the disc body 219 and the lawn, thereby effectively improving the working efficiency of the blade carrier disc assembly 218. In the radial direction of the disc 219, the side of the blade mounting groove 220 near the axis of the disc 219 is also provided with a through groove 123, so as to facilitate the passing through of blade 6, grass, stones, etc.

In one embodiment, the guide platforms 221 and the fasteners 226 are in a circle. In the illustrated embodiment, the fastener 226 may be, without limiting, a screw or other parts. In other embodiments, the blade mounting groove 220 may also be provided with a groove cover (not shown) disposed opposite to the groove bottom wall 227 to prevent grass, vines and soil from jamming the blade 6. The groove cover and the blade mounting groove 220 may be integrally constructed, or may be separately manufactured. The blade carrier disc assembly 218 of the disclosure installs the blades 6 in the respective blade mounting grooves 220 of the blade carrier disc 5, so that the blades 6 are hidden in the blade carrier disc 5, thereby avoiding the blades 6 from grass or mud jamming and improving the working efficiency of the blade carrier disc assembly 218.

Figure 60:
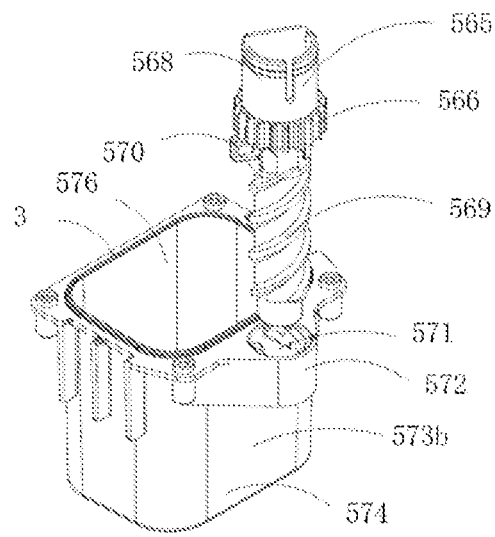
FIG. 60 is a schematic perspective view of a housing and a height-adjustment mechanism of the mower of the disclosure.
Figure 61:
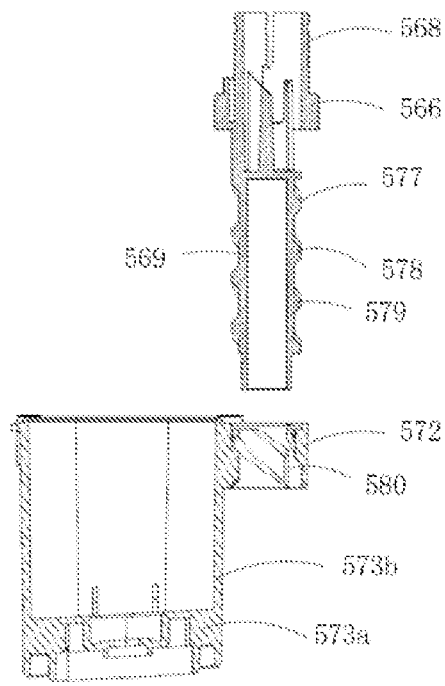
FIG. 61 is a schematic cross-sectional view of the height-adjustment mechanism and the housing in FIG. 60.

Referring to FIG. 60 and FIG. 61, in the disclosure, the mower can include a height-adjustment mechanism 565 arranged in the case 18. The rotating of the height-adjustment mechanism 565 drives the cutting mechanism 3 to move up and down relative to the housing 1, in order to change the cutting height of the cutting mechanism 3. A multi-thread mating structure (not labeled) is provided between the height-adjustment mechanism 565 and the cutting mechanism 3. The multi-thread mating structure can include a first threaded portion 569 provided on the height-adjustment mechanism 565 and a second threaded portion 580 provided on the cutting mechanism 3. Both the first threaded portion 569 and the second threaded portion 580 are provided with multi-screw threads. Specifically, the height-adjustment mechanism 565 can include the first threaded portion 569, a limiting portion 570, a locking portion 566, a connecting portion 568, and a knob sequentially arranged from bottom to top in that order. The height-adjustment mechanism 565 may be integrally manufactured, or may be an assembled structure.

Figure 62:
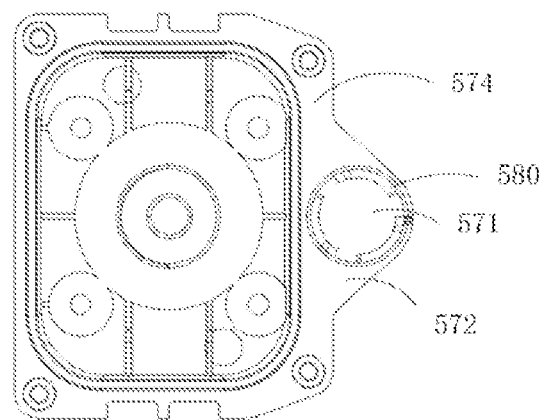
FIG. 62 is a schematic top view of the housing of the mower.
Figure 63:
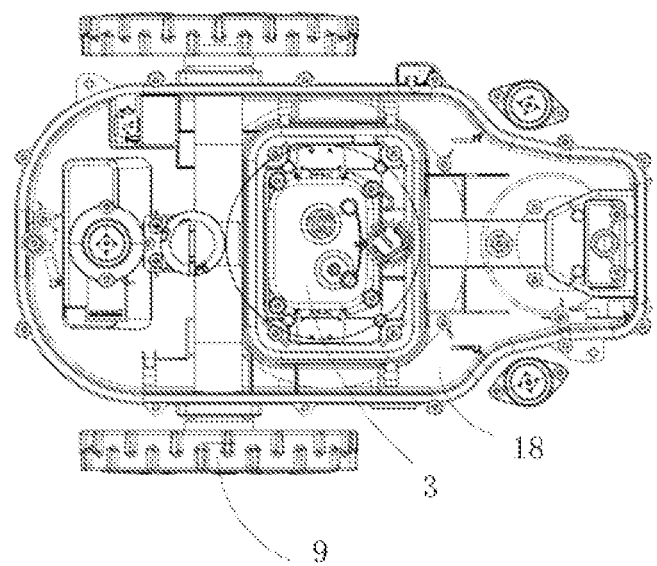
FIG. 63 is a schematic top view of the mower of the disclosure after removing an upper casing and an upper cover.

Referring to FIG. 60 through FIG. 62, the cutting mechanism 3 can include a housing 574, a motor (not shown) disposed on the housing 574, and a cutting assembly (not shown) disposed on an output shaft of the motor for cutting grass. The second threaded portion 580 is disposed on the housing 574. The housing 574 can include a bottom wall 573a and another bottom wall 573b. The bottom wall 573a and the bottom wall 573b form a receiving cavity 576 for accommodating the motor. The bottom wall 573b protrudes outward to form a protruding portion 572. The protruding portion 572 is provided with a through hole 571 penetrating therethrough, and the second threaded portion 580 is provided on the inner wall of the through hole 571. In the illustrated embodiment, the first threaded portion 569 may be a male thread, and the second threaded portion 580 may be a female thread. In other embodiments, the first threaded portion 569 may be a female thread, and the second threaded portion 580 may be a male thread.

As illustrated in FIG. 60 through FIG. 62, the multi-thread mating structure can include different thread thicknesses. In the illustrated embodiment, the multi-thread mating structure may be a three-threaded thread, in which the two threads 577, 578 of the first thread portion 569 have the same thread thickness, and a thread thickness of the third thread 579 is smaller than the thread thickness of the threads 577 and 578. When the first threaded portion 569 is screwed into the second threaded portion 580, if positions of the multi-thread portions are misaligned, the first threaded portion 569 cannot be screwed in normally, only the corresponding thread with the same thickness can be screwed in.

The screw-in direction of the first threaded portion 569 is unique, thereby restricting the height-adjustment mechanism 565 to be assembled to the cutting mechanism 3 from a specific direction. With this setting, there is no need to provide a sign or other auxiliary device to guide the operator to install, and the installation becomes convenient. In addition, since there are three stress points at the connection during connecting multi-screw threads, the first threaded portion 569 and the second threaded portion 580 are not easy to jam during the mating. Therefore, the multi-threaded design of different thicknesses plays a good role in foolproof. As illustrated in FIG. 60 through FIG. 64, in other embodiments, the thread thicknesses of two threads can be made equal, and the thread thickness of the third thread 579 is greater than the thread thicknesses of the two threads. Alternatively, the thread thicknesses of the three threads are set to be different from one another, which can also restrict the height-adjustment mechanism 565 to be assembled to the cutting mechanism 3 from a specific direction.

As illustrated in FIG. 60 through FIG. 64, the limiting portion 570 is used to limit a rotation angle of the height-adjustment mechanism 565. The housing 1 is provided with a protrusion (not shown) that cooperates with the limiting portion 570. The limiting portion 570 and the protrusion block each other to limit rotation positions of the height-adjustment mechanism 565 in two directions, thereby restricting the highest position and the lowest position achieved by the rotations of the height-adjustment mechanism 565. Due to the mutual blocking between the limiting portion 570 and the protrusion, a rotation angle of the height-adjustment mechanism 565 is less than 360°.

Figure 64:
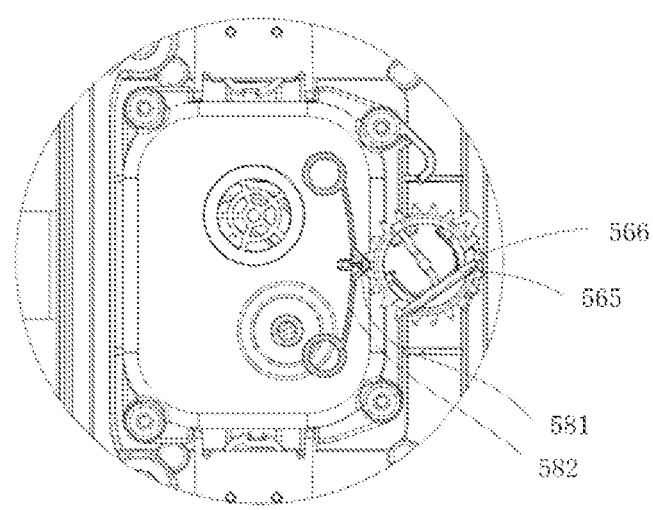
FIG. 64 is a schematic partial enlarged view of the circle portion in FIG. 63.

As illustrated in FIG. 64 through FIG. 64, the locking portion 566 is used to lock the height-adjusting mechanism 565 after the height-adjustment mechanism 565 completes height-adjustment, so as to avoid an unexpected change in the cutting height. As shown in FIG. 64, the housing 1 is fixed with a resilient member 582 that cooperates with the locking portion 566. The locking portion 566 may be a gear structure, and the resilient member 582 is locked with a tooth groove of the gear structure to lock the height-adjustment mechanism 565. Specifically, the resilient member 582 can include a top end 581 that matches the shape of the tooth groove of the gear structure, and the top end 581 is snapped in the tooth groove to prevent the height-adjustment mechanism 565 from rotating. When the height-adjusting mechanism 565 is manually rotated, the gear structure rotates accordingly, and the resilient member 582 is elastically deformed and snapped into next tooth groove.

As illustrated in FIG. 60 through FIG. 62, the connecting portion 568 is used as the adjusting knob, and the adjusting of the height-adjustment mechanism 565 is achieved by manually rotating the knob. In other embodiments, the knob can also use a gear structure linked with an output shaft of another motor through a transmission gear, so as to realize electric drive rotation, thereby further improving the experience of the operator.

Figure 65:
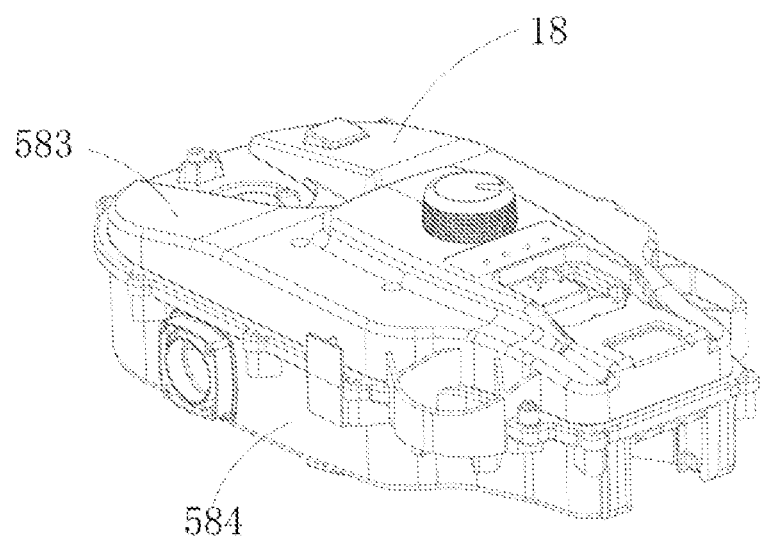
FIG. 65 is a schematic perspective structural view of bases and an adjusting mechanism after being assembled.
Figure 66:
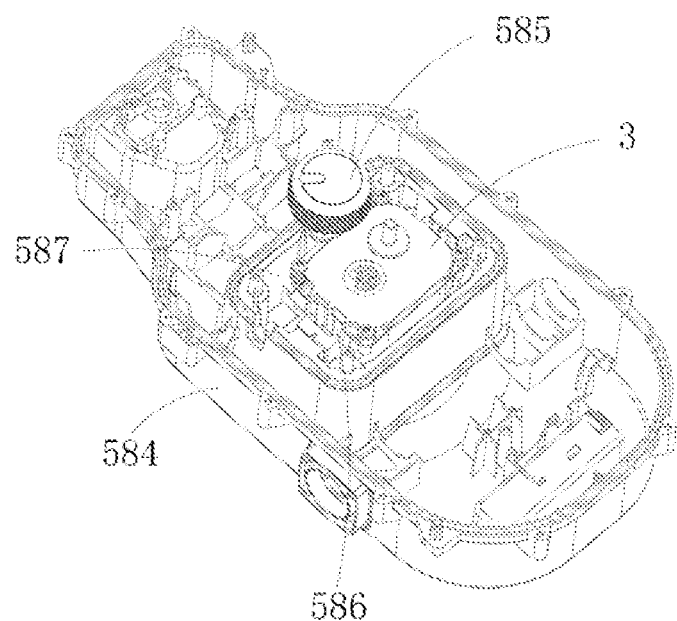
FIG. 66 is a schematic perspective structural view of a lower base and the adjusting mechanism after being assembled.

Referring to FIG. 65 and FIG. 66, regarding an embodiment of the mower as provide by the disclosure, the case 18 can include an upper base 583 and a lower base 584 that is matched with the upper base 583. The lower base 584 is provided with a sliding passage 587 penetrating through the lower base 584. The cutting mechanism 3 can slide in the sliding passage 587, and at least partially protrude from the sliding passage 587 in a direction facing away from the bottom surface of the lower base 584, thereby allowing the cutting mechanism 3 to cut lawns, vegetation and so on. In the illustrated embodiment, the casing includes two parts such as the upper base 583 and the lower base 584, and the sliding passage 587 only penetrates the lower base 584. In other embodiments, the case 18 can also be made of one or more than two parts, and the sliding passage 587 can penetrate through the case 18.

Figure 67:
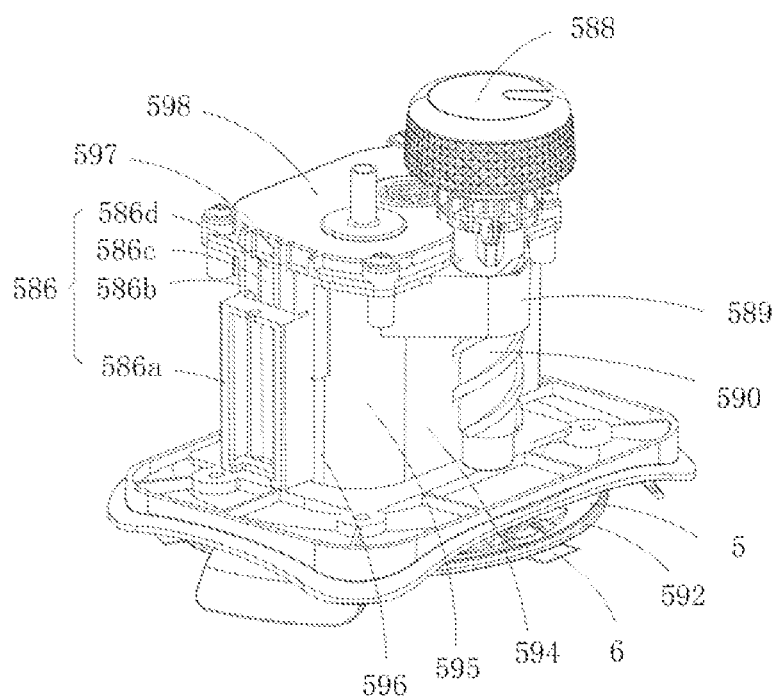
FIG. 67 is a schematic perspective view of the adjusting mechanism and the cutting mechanism after being assembled.
Figure 68:
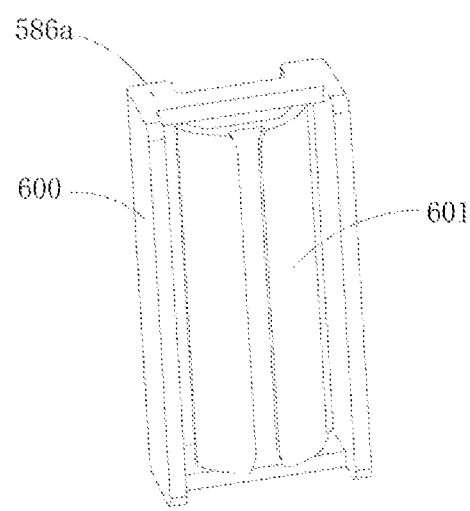
FIG. 68 is a schematic perspective structural view of a resilient guide member.
Figure 69:
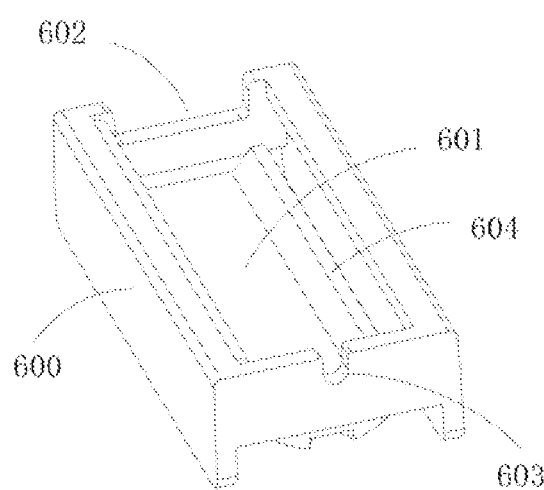
FIG. 69 is a schematic perspective structural view of the resilient guide member in FIG. 68 from another viewing angle.
Figure 70:
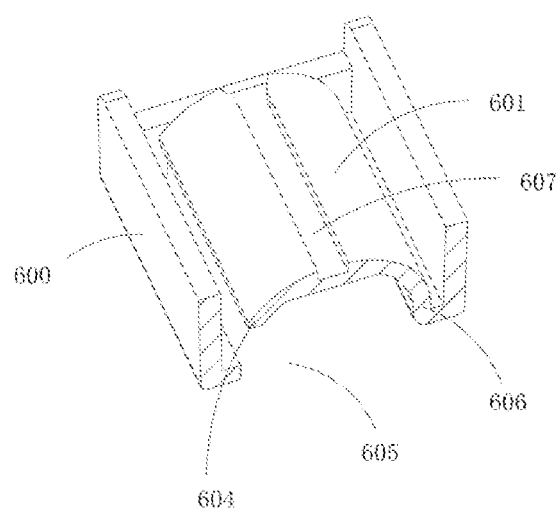
FIG. 70 is a schematic cut-away view of the resilient guide member in FIG. 68.

Referring to FIG. 67, the cutting mechanism 3 is arranged in the sliding passage 587 and used for cutting lawns, vegetation and so on. The cutting mechanism 3 can include a base 595, a prime mover (e.g., a motor) 598 mounted on the base 595, and a cutting assembly 592 mounted on the output shaft of the prime mover 598. The base 595 can include a first side wall 594, a second side wall opposite to the first side wall 594, a third side wall 596 perpendicular to the first side wall 594, and a fourth side wall opposite to the third side wall 596. The first side wall 594 protrudes toward an adjusting mechanism 585 to form a protruding portion 589. The protruding portion 589 is provided with a threaded hole penetrating through the protruding portion 589, and an internal thread is provided in the threaded hole.

In the illustrated embodiment, the prime mover 598 may be an electric motor. In other embodiments, the prime mover 598 may also be a gasoline engine. The cutting assembly 592 can include a blade carrier disc 5 installed on the output shaft of the prime mover 598 and blades 6 installed on the blade carrier disc 5. The output shaft of the prime mover 598 rotates at a high speed, which drives the blade carrier disc 5 and the blades 6 to rotate at a high speed, which is beneficial for the blades 6 to cut lawn, vegetation, etc.

As illustrated in FIG. 67, the adjusting mechanism 585 is used to adjust a cutting height of the cutting mechanism 3. The adjusting mechanism 585 can include an adjusting member 588 and a driving member 590 rotating with the adjusting member 588. In the illustrated embodiment, the adjusting member 588 is a knob, and the driving member 590 is a screw rod provided with an external thread. The driving member 590 cooperates with the internal thread of the protruding portion 589 through the external thread, and drives the base 595 to move up and down in the sliding passage 587, which may in turn adjust a length that is from the cutting assembly 592 protruded out an end of the sliding passage 587 facing away from the casing 1, thereby achieving the purpose of adjusting the cutting height of the cutting mechanism 3.

In order to make the engagement between the external thread and the internal thread smoothly during adjustment, the screw rod is provided with multiple threads. In the illustrated embodiment, the screw rod is provided with at least three threads, the adjustment member 588 is a knob, and the adjustment is achieved by manually rotating the knob. The knob is provided with an indicator label, and the housing 1 is provided with level/grade labels matched with the indicator label. When the knob is rotated, the indicator label can point to different level labels, so that the operator can easily and quickly know the mowing height. In other embodiments, the adjusting member 588 may also be a gear, and rotate with a motor output shaft through a transmission gear, thereby accomplishing electric-driven rotation and further improving the user experience. Since the protruding portion 589 protrudes from the first side wall 594, the driving member 590 is biased to one side of the base 595. With this arrangement, the overall height of the cutting mechanism 3 and the adjusting mechanism 585 after being assembled together can be reduced, thereby lowering the center of gravity, so that the mower can run more stably.

Referring to FIG. 67 through FIG. 70, a guiding mechanism 586 can include a resilient guide member 586a and a guide groove 586d. The guide groove 586d and the resilient guide member 586a can slide relatively. One of the guide groove 586d and the resilient guide member 586a is provided on the case 18, and the other is provided on the base 595. In the illustrated embodiment, the guide groove 586d is provided on the base 595, and the resilient guide member 586a is fixedly installed on the case 18. Specifically, in the illustrated embodiment, there are two guide grooves 586d, which are respectively located on the third side wall 596 and the fourth side wall.

In other embodiments, one guide groove 586d may be arranged on the second side wall. One end of the resilient guide member 586a is provided with a positioning hole 603, and the other end is provided with a positioning groove 602. The resilient guide member 586a is matched with corresponding fixing structures (not shown) on the case 18 through the positioning hole 603 and the positioning groove 602, so that the resilient guide member 586a is fixedly installed on the case 18. The guide groove 586d can include a groove bottom wall 586c and a pair of groove side walls 586b. The resilient guide member 586a is located between the pair of groove side walls 586b. The groove bottom wall 586c is further provided with a guide rail 597. The resilient guide member 586a can include a base body 600 and a cantilever 601 protruding from the base body 600 toward the groove bottom wall 586c. The cantilever 601 elastically touches against the groove bottom wall 586c to limit the base 595. The base 600 is provided with a slot 605 along a direction perpendicular to the groove bottom wall 586c, and the cantilever 601 goes across the slot 605.

In the illustrated embodiment, the slot 605 penetrates through the base body 600. In other embodiments, the slot 605 may be a blind slot. In additional embodiments, the base body 600 may not be provided with the slot 605.

A cross section of the cantilever 601 in the transverse direction is arc-shaped. In the illustrated embodiment, the cantilever 601 spans the slot 605 in a direction perpendicular to the groove side wall 586b. The cantilever 601 can include a first end 606 and a second end 604 located on both sides of the slot 605. The first end 606 is fixedly connected to the base body 600, and the second end 604 is separated from the base body 600. The cantilever 601 is further provided with a guide groove 607 penetrating the cantilever 601 along the sliding direction of the base 595, and the guide groove 607 is located between the first end 606 and the second end 604. The guide groove 607 cooperates with the guide rail 597 to facilitate alignment during installation. An end of the guide groove 607 is trumpet-shaped/horn-shaped.

Figure 71:
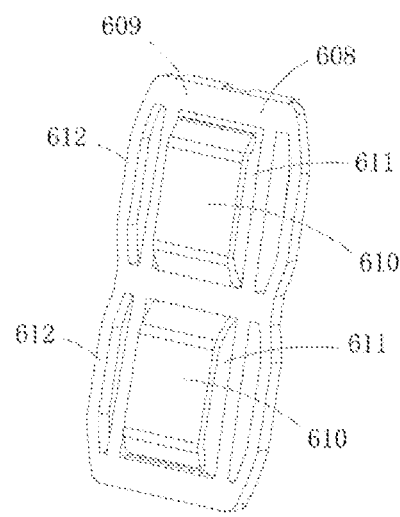
FIG. 71 is a schematic perspective structural view of a second embodiment of a resilient guide member.
Figure 72:
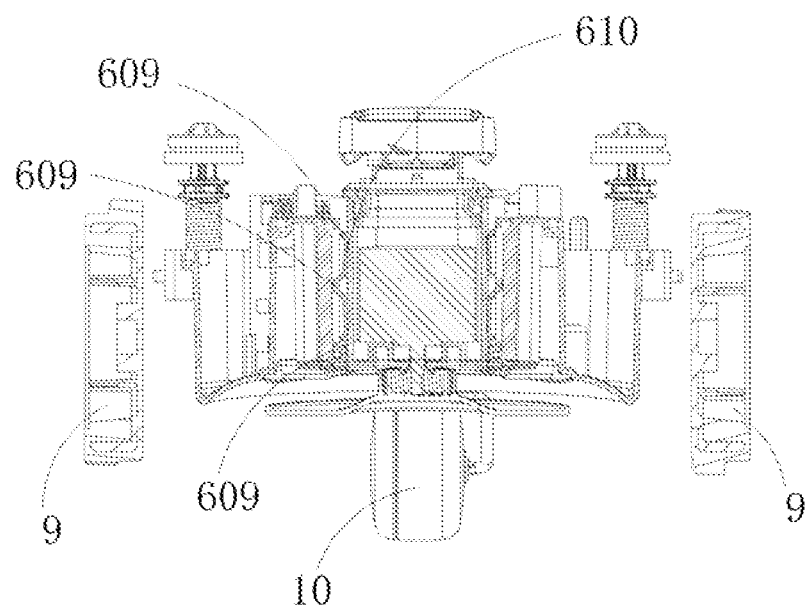
FIG. 72 is a schematic cross-sectional view of a mower employing the resilient guide member in FIG. 71.

Referring to FIG. 71 and FIG. 72, FIG. 71 shows a resilient guide member 608 according to another embodiment. The resilient guide member 608 can include a base body 609 and cantilevers 610 protruding outward from the base body 609. The base body 609 is provided with slots 611 along a direction perpendicular to the groove bottom wall 586c. In the illustrated embodiment, the slot 611 penetrates through the base body 609. In another embodiment, the slot 611 may be a blind slot. In still another embodiment, the base body 609 may not be provided with the slot 611. In the illustrated embodiment, there may be two slots 611 and two cantilevers 610, the two slots 611 are arranged along the sliding direction of the base 595, and the two cantilevers 610 are arranged across the pair of slots 611 respectively along sliding direction of the base 595. Resilient arms 612 are provided on the side of the base body 609 opposite to the groove side wall 586b, and the resilient arm 612 and the base body 609 together may form an O-shape structure.

As illustrated in FIG. 67, to adjust the mowing height of the cutting mechanism 3 of the mower, the adjusting member 588 may be adjusted so that the driving member 590 may rotate, thereby driving the base 595 to slide along the sliding passage 587, and achieving the adjusting of the mowing height of the cutting mechanism 3. In this case, the cantilever arm 601 may moderately touch against the side wall of the base 595 to limit the base 595 in a direction perpendicular to the groove bottom wall 586c. The base body 600 and the resilient arms 612 appropriately touch against the groove side wall 586b to limit the base 595 in a direction perpendicular to the groove side wall 586b, so as to avoid problems such as bending of the sliding path of the base 595 and tilting of the base 595, and thereby ensure that the base 595 will not get stuck. By setting the guiding mechanism 586, it can avoid the problems such as the bending of the sliding path of the prime mover and the tilting of the prime mover during the process of adjusting the mowing height of the mower, thereby effectively improving the user experience.

Figure 73:
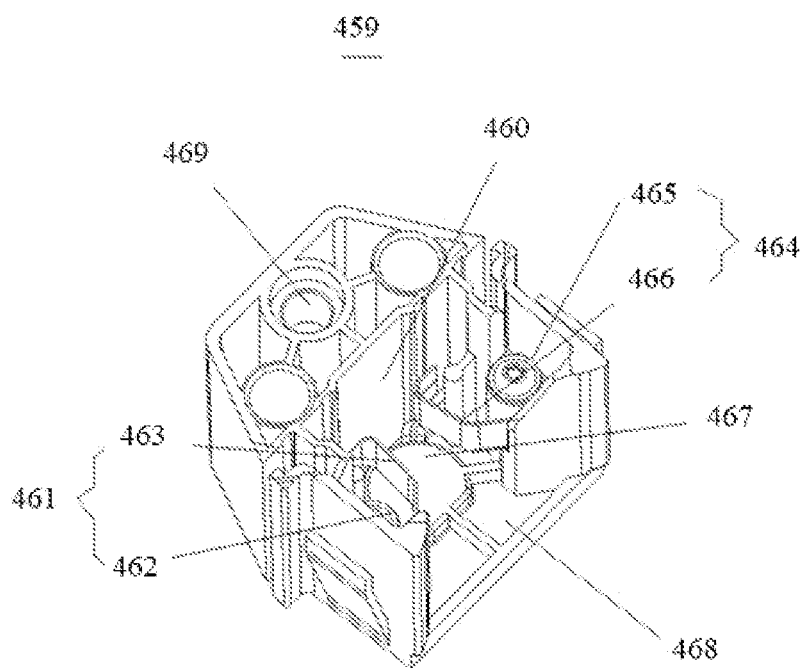
FIG. 73 is a schematic structural view of a first charging assembly of the disclosure.
Figure 75:
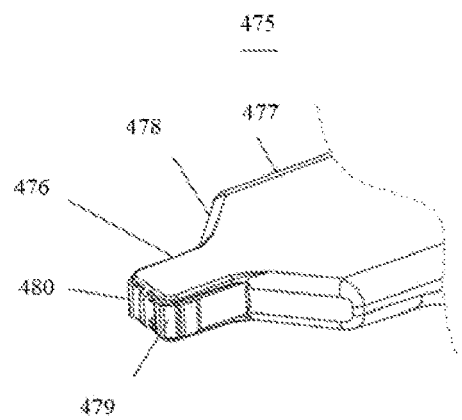
FIG. 75 is a schematic structural view of a second charging assembly of the disclosure.

Referring to FIG. 73 and FIG. 75, an embodiment of the disclosure further provides a charging device. The charging device can include a first charging assembly 459 and a second charging assembly 475 corresponding with the first charging assembly 459. The first charging assembly 459 can include a symmetrical structure and is provided with a receiving cavity 460 inside. The receiving cavity 460 is provided with a first resilient terminal assembly 461 and a second resilient terminal assembly 464. The first resilient terminal assembly 461 can include a first groove 462 and a first resilient terminal 463. The first groove 462 is located in the receiving cavity 460, and the first resilient terminal 463 is fixed in the first groove 462. The second resilient terminal assembly 464 can include a second groove 465 and a second resilient terminal 466. The second groove 465 is located in the receiving cavity 460, and the second resilient terminal 466 is fixed in the second groove 465. An embedded space 467 is formed between the first resilient terminal 463 and the second resilient terminal 466. One side of the first charging assembly 459 is provided with a tapered opening 468, and the tapered opening 468 connects with the embedded space 467. An end of the first charging assembly 459 opposite to the tapered opening 468 is provided with a first mounting portion 469.

Figure 74:
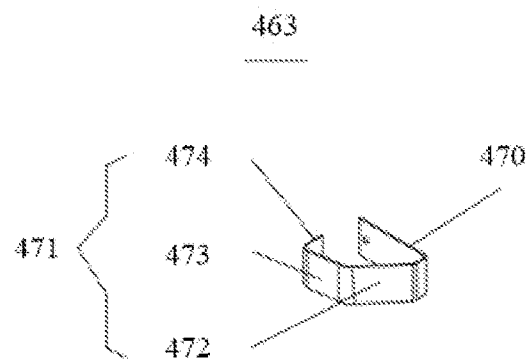
FIG. 74 is a schematic structural view of a first resilient terminal of the disclosure.

As illustrated in FIG. 73 and FIG. 74, the first resilient terminal 463 can include a first fixing part 470 and a first contact part 471. The first contact part 471 can include a first initial contact portion 472 and a first charging contact portion 473. The first charging contact portion 473 is connected to the first fixing portion 470 by the first initial contact portion 472. The first fixing part 470 is fixed in the first groove 462. The first contact part 471 can further include a first bend tail portion 474, and the first bent tail portion 474 is connected to the first charging contact portion 473. The first fixing part 470 and the first initial contact portion 472 may form a first rounded corner (not shown in the drawings), and an angle of the first rounded corner may be less than 90 degrees. The first initial contact portion 472 and the first charging contact portion 473 may form a second rounded corner (not labelled in the drawings), and an angle of the second rounded corner may be greater than 90 degrees and less than 180 degrees. The first bent tail portion 474 faces away from the embedded space 467. The angle of the rounded corner should be understood as an intersection angle of extension lines of two sides of the rounded corner. The second resilient terminal 466 and the first resilient terminal 463 may have similar structure.

As illustrated in FIG. 75, the second charging assembly 475 can include a symmetrical structure. One side of the second charging assembly 475 is provided with a protruding portion 476, and the other side of the second charging assembly 475 opposite to the protruding part 476 is provided with a second mounting portion 477. The protruding portion 476 is connected to the second mounting portion 477 through a tapered portion 478. The protruding portion 476 is provided with a third resilient terminal 479 and a fourth resilient terminal 480.

Figure 76:
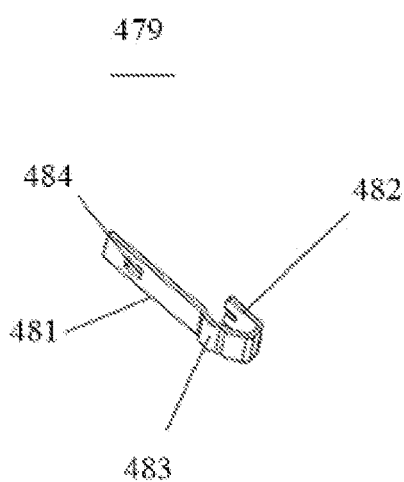
FIG. 76 is a schematic structural view of a third resilient terminal of the disclosure.

FIG. 76 is a schematic structural view of the third resilient terminal 479 in an embodiment of the disclosure. As illustrated in FIG. 76, the third resilient terminal 479 may have a shape similar to a fishhook. The third resilient terminal 479 can include a third fixing part 481 and a first hook part 482. The third fixing part 481 is provided with a first bump 483 and a first fitting opening 484. The first bump 483 is located at an end of the third fixing part 481 connected to the first hook part 482, and the first bump 483 is located at a side of the third fixing part 481 facing away from the first hook part 482. The first fitting opening 484 is located at an end of the third fixing part 481 away from the first hook part 482. The structure of the fourth resilient terminal 480 is similar to the structure of the third resilient terminal 479.

Figure 77:
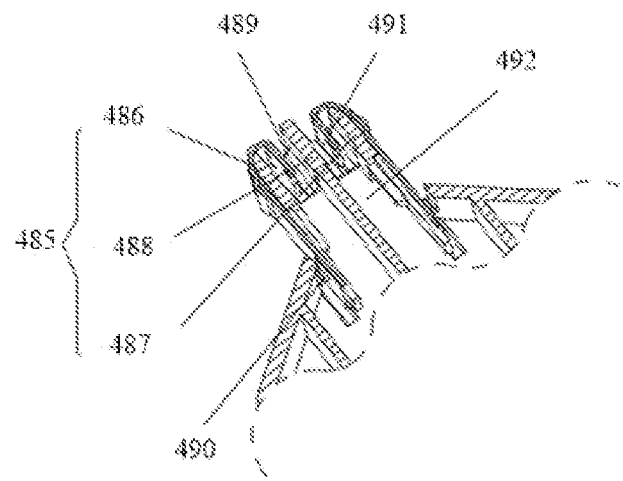
FIG. 77 is a schematic cross-sectional view of the second charging assembly of the disclosure.

FIG. 77 is a cross-sectional view of the second charging assembly described in an embodiment of the disclosure. As illustrated in FIG. 75 through FIG. 77, the protruding portion 476 can include a terminal fixing assembly 485 of protruding portion, a lower cover plate 492, and an upper cover plate (not shown in the drawings). The terminal fixing assembly 485 is disposed between the lower cover plate 492 and the upper cover plate (not shown). The terminal fixing assembly 485 can include a first fixing plate 486, a second fixing plate 487, and a built-in plate 488. The first fixing plate 486 and the second fixing plate 487 are arranged on each side of the built-in plate 488.

A first embedded groove 489 is provided between the first fixing plate 486 and the built-in plate 488. A first fixing buckle 490 is provided on the side of the first fixing plate 486 facing away from the built-in plate 488. The first hook part 482 is embedded in the first embedded groove 489. The first fitting opening 484 is detachably connected to the first fixing buckle 490. A second embedded groove 491 is provided between the second fixing plate 487 and the built-in plates 488. A second fixing buckle (not labelled in the drawings) is provided on the side of the second fixing plate 487 facing away from the built-in plate 488. The second hook part (not labelled in the drawings) is embedded in the second embedded groove 491. The second fitting opening (not labelled in the drawings) and the second fixing buckle (not labelled in the drawings) are detachably connected with each other.

As illustrated in FIG. 77, the first hook part 482 is provided with a first block opening, the first embedded groove 489 is provided with a first block plate therein, and the first block plate is embedded in the first block opening so as to prevent the first hook part 482 from moving up and down. The second hook part is provided with a second block opening, the second embedded groove 491 is provided with a second block plate therein, and the second block plate is embedded in the second block opening so as to prevent the second hook part from moving up and down.

Figure 78:
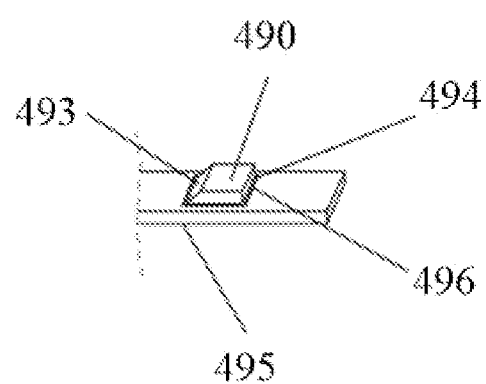
FIG. 78 is a schematic structural view of a first fixing buckle of the disclosure.

FIG. 78 is a schematic structural view of the first fixing buckle 490 in an embodiment of the disclosure. The structure of the second fixing buckle is similar to the structure of the first fixing buckle 490. As shown in FIG. 78, the first fixing buckle 490 can include an inclined surface 493 and a perpendicular surface 494. The inclined surface 493 and the perpendicular surface 494 are located on opposite sides of the first fixing buckle 490, and the inclined surface 493 faces toward the first hook part (not labelled in the drawings). The inclined surface 493 facilitates the first fixing buckle 490 to be inserted into the first fitting opening 484. The perpendicular surface 494 prevents the first fixing buckle 490 from being separated from the first fitting opening 484.

Figure 79:
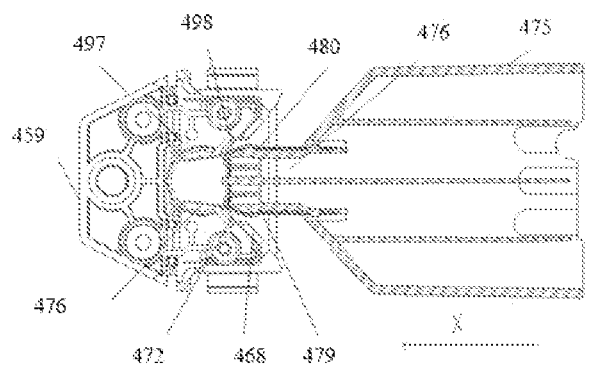
FIG. 79 is a schematic first process diagram of using the first charging assembly and the second charging assembly of the disclosure.

FIG. 79 is a schematic diagram of a first process of using the first charging assembly 459 and the second charging assembly 475 in an embodiment of the disclosure. Referring to FIG. 73, FIG. 74, FIG. 75 and FIG. 79, a distance between the first charging contact portion 473 and the second charging contact portion 497 is smaller than a distance between the third resilient terminal 479 and the fourth resilient terminal 480. The second charging assembly 475 is inserted into the first charging assembly 459 along the X direction. During the first process of using the first charging assembly 459 and the second charging assembly 475, the third resilient terminal 479 is in resilient contact with the first initial contact portion 472, and the fourth resilient terminal 480 is in resilient contact with the second initial contact portion 498. When the second charging assembly 475 is inserted into the first charging assembly 459 in the X direction, since the opening size of the tapered opening (also referred to as tapered port) 468 is relatively large, the protruding portion 476 is easy to be inserted into the tapered opening 468. The side walls of the tapered opening 468 can play a role of guiding the insertion direction of the protruding portion 476, and under the guiding of the side walls, the protruding portion 476 slides into the embedded space 467 along the side walls.

Figure 80:
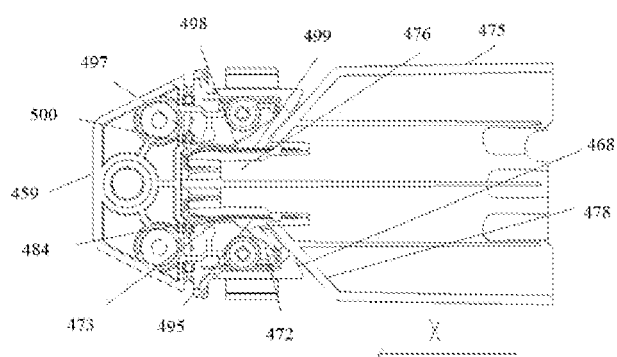
FIG. 80 is a schematic second process diagram of using the first charging assembly and the second charging assembly of the disclosure.

FIG. 80 is a schematic diagram of a second process of using the first charging assembly 459 and the second charging assembly 475 in an embodiment of the disclosure. Referring to FIG. 73, FIG. 74, FIG. 76 and FIG. 80, the second charging assembly 475 is inserted into the first charging assembly 459 along the X direction. During the second process of using the first charging assembly 459 and the second charging assembly 475, the protruding portion 476 is inserted into the embedded space (not labelled in the drawings), a connection between the first initial contact portion 472 and the first charging contact portion 473 is in resilient contact with the third fixing part 481, the first charging contact portion 473 is in resilient contact with the first bump 483. A connection between the second initial contact portion 498 and the second charging contact portion 497 is in resilient contact with the fourth fixing portion 499, the second charging contact portion 497 is in resilient contact with the second bump 500, shapes of the tapered portion 478 and the tapered port 468 correspond with each other, and the tapered portion 478 can fully fill the tapered port 468.

As illustrated in FIG. 80, the first elastic terminal 463 and the third elastic terminal 479 are in resilient contact with each other, and there are two contact points between the first resilient terminal 463 and the third resilient terminal 479. The connection between the first initial contact portion 472 and the first charging contact portion 473 may touch against the first bump. The second resilient terminal 466 and the fourth resilient terminal 480 are in resilient contact with each other, there are two contact points between the second resilient terminal 466 and the fourth resilient terminals 480, and the connection between the second initial contact portion and the second charging contact portion 498 may touch against the second bump. Such arrangement not only ensures the stability of contact, but also prevents the second charging assembly 475 from detaching from the first charging assembly 459.

As illustrated in FIG. 74 through FIG. 76, the first resilient terminal 463, the second resilient terminal 466, the third resilient terminal 479, and the fourth resilient terminal 480 may be constructed using bent metal sheets.

Figure 81:
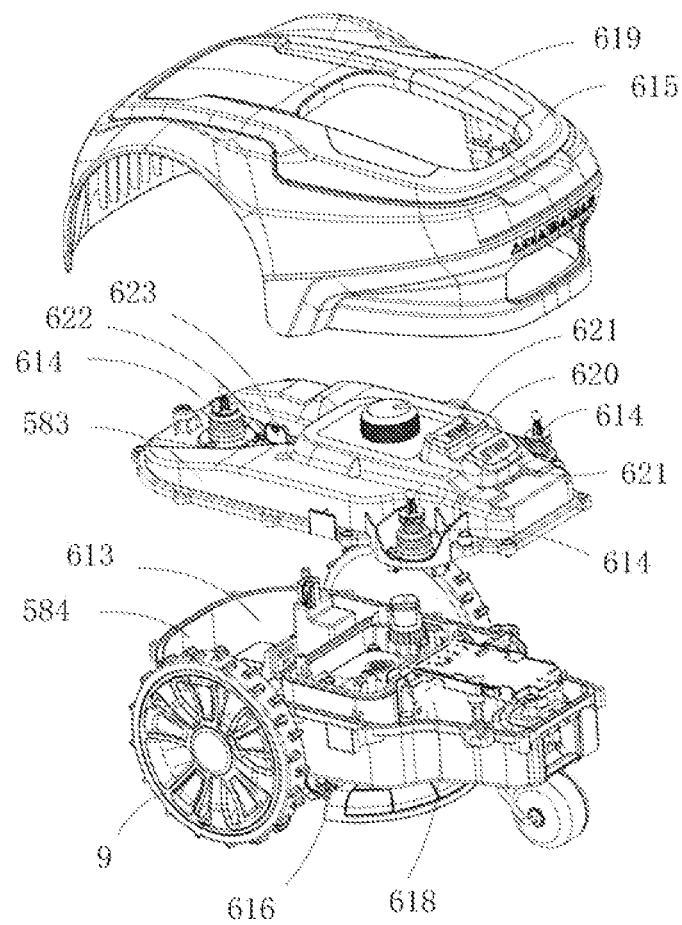
FIG. 81 is a schematic perspective exploded view of a mower.
Figure 82:
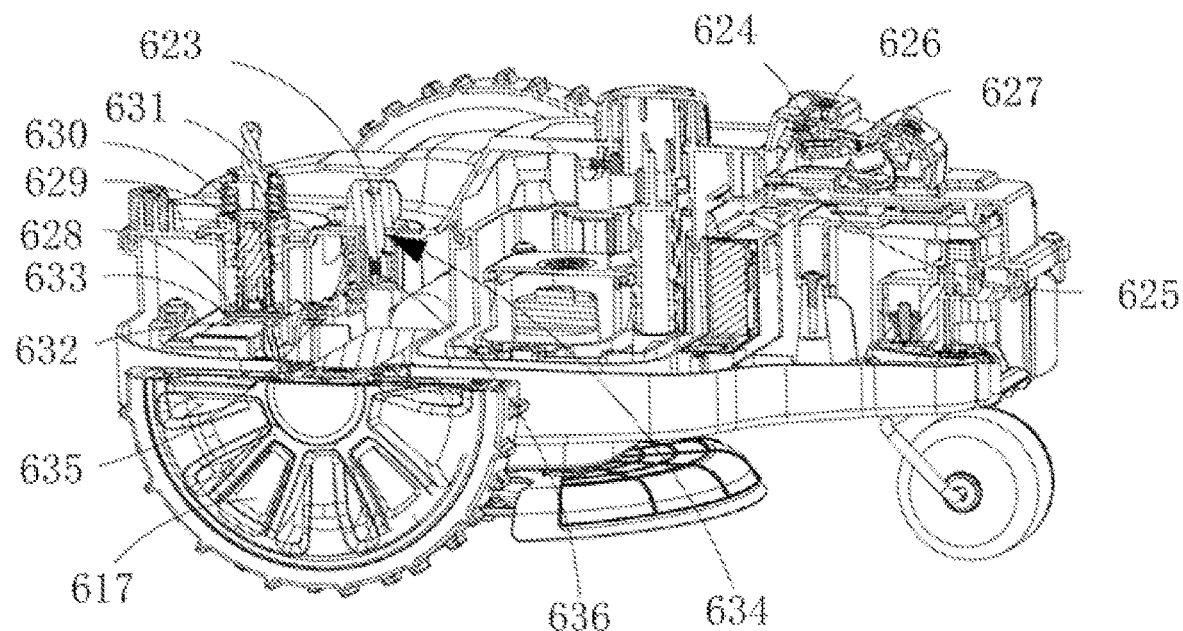
FIG. 82 is a cut-away view of the mower.
Figure 83:
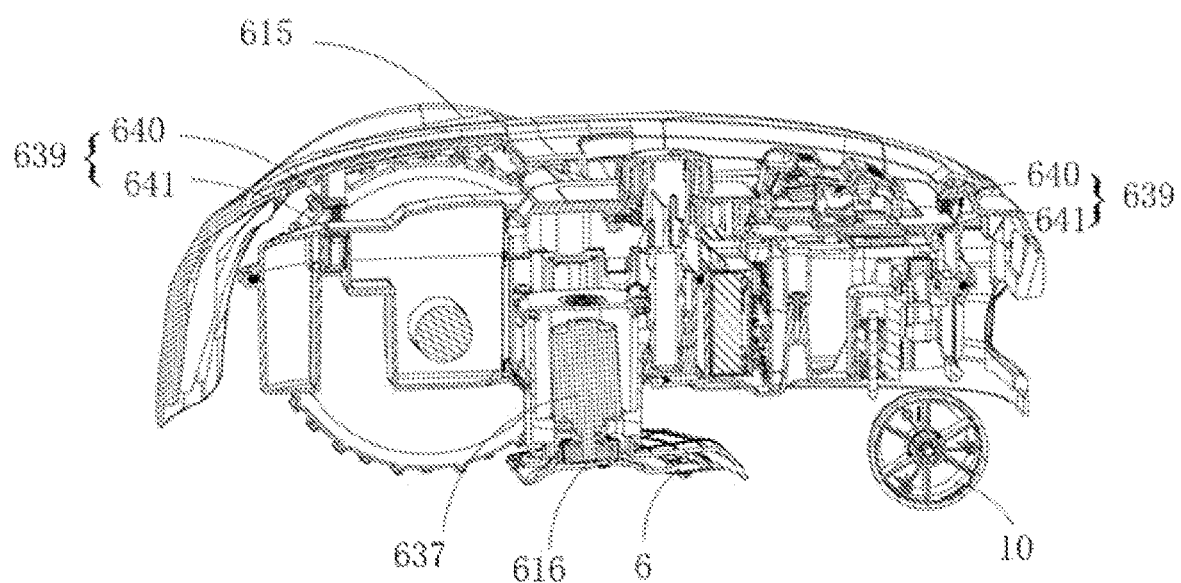
FIG. 83 is a cut-away view of the mower from another viewing angle.
Figure 84:
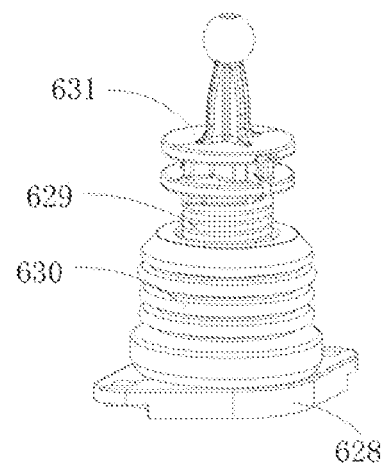
FIG. 84 is a schematic perspective structural view of a support column.
Figure 85:
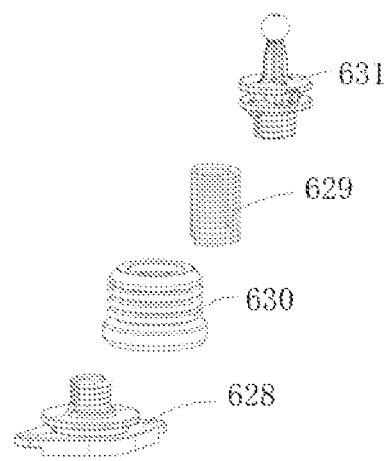
FIG. 85 is a schematic perspective exploded view of the support column in FIG. 84.
Figure 86:
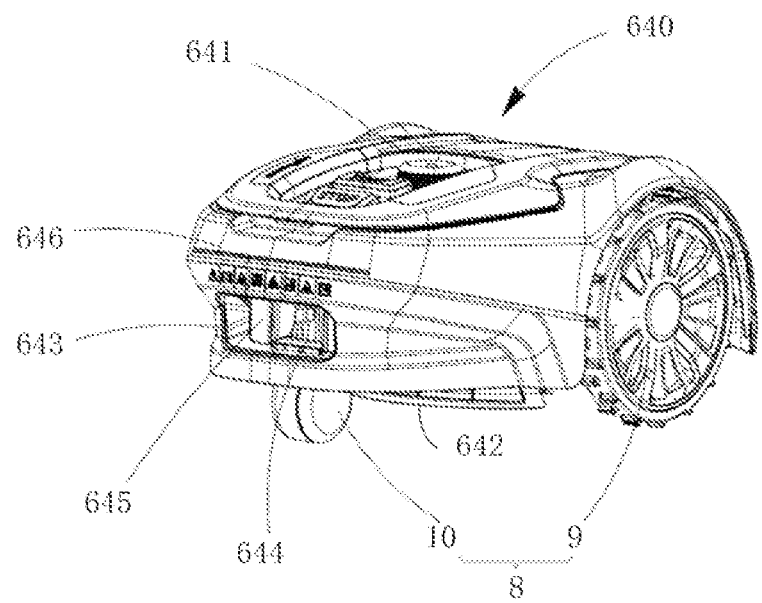
FIG. 86 is a schematic structural view of a mower.
Figure 87:
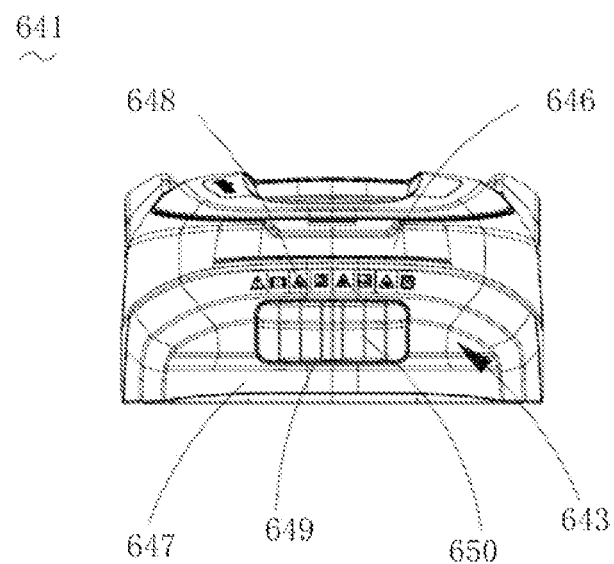
FIG. 87 is a schematic front view of a first casing.

Referring to FIG. 81 through FIG. 83, the upper base 583 and the lower base 584 of the case 18 jointly form a receiving cavity 613 for receiving a control circuit board 618. The control circuit board 618 is installed on the lower base 584. The mower may further include a battery pack (not shown) for supplying power to the motor. The battery pack and the motor 637 are installed on the lower base 584. Combination device as provided is used to directly or indirectly control the mower to perform a certain action, and include a first device installed on the upper base 583 and a second device installed on the lower base 584. The first device and the second device are not electrically connected. Such arrangement can effectively avoid an electrical connection between the components arranged in the upper base 583 and the components arranged in the lower base 584 which causes inconvenience to the replacement of the upper base 583.

In the illustrated embodiment, regardless of whether the devices are working or not working, the first device will not be energized. That is, no operating current may passes through the first device when the second device is energized (i.e., there is an operating current passing through the second device). When the first device and the second device are cooperative, the combination device controls the mower to perform a corresponding action. In this case, the first device and the second device are contactless or non-connected electrically. That is, there is no cable connecting between the first device and the second device, for example, the first device and the second device are induced by magnetic component or optical component. This arrangement can not only control the mower directly or indirectly by the non-contact cooperation of the first device and the second device, but also avoid the disadvantage in the prior art, in which components installed on the upper base 583 and components installed on the lower base 584 need to be electrically connected through wired lines or conductive terminals. Thus, this arrangement reduces the difficulty of assembling the upper base 583 and the lower base 584.

When the upper base 583 needs to be replaced due to aging or damage caused by collision, the operator can directly disassemble and replace the upper base 583 conveniently and quickly without arranging the wires or re-plugging the conductive terminals, thereby improving the working efficiency of the operator. In addition, since the first device is mounted on the upper base 583, the second device is mounted on the lower base 584, and the first device and the second device are in contactless cooperation, the second device and the lower base 584 can be packaged as a whole, thereby enhancing the waterproof performance of the mower.

In one embodiment, the second device is integrated on the control circuit board 618. The combination device may be a lifting sensor 632 that detects whether the mower is lifted, a collision sensor 639 that detects whether the mower collides with an obstacle, a safety switch 620 that controls power on or off of the mower, and/or a safety lock 622 that controls whether the mower is in an active state. In other embodiments, the second device may include other electrical components, such as a circuit board, a battery pack, a motor 637 and so on. Details of the lifting sensor 632, the collision sensor 639, the safety switch 620, and the safety lock 622 may be further described below.

Referring to FIG. 81 through FIG. 85, the upper base 583 is provided with support columns 614 with a top cover 615 mounted on the support columns 614. As illustrated in FIG. 82 and FIG. 83, the support column 614 can include a mounting plate 628 fixedly mounted on the upper base 583, an elastic element 629 mounted on the mounting plate 628, a damper 631 at one end of the elastic element 629 away from the mounting plate 628, and a protective sleeve 630 sheathed around the elastic element 629. In the illustrated embodiment, the elastic element 629 is a spring, and the protective sleeve 630 is a bellows. The top cover 615 is mounted on the damper 631, and a handle 619 is provided thereon. When a user holds the handle 619 to lift the mower, the elastic element 629 undergoes an elastic deformation, and the top cover 615 moves in a direction away from the upper base 583. When the mower collides with an obstacle, the top cover 615 continues to move for a certain distance along an original forward direction of the mower under the action of inertia. In this case, the elastic element 629 undergoes an elastic deformation.

As illustrated in FIG. 81 and FIG. 82, the lifting sensor 632 is used to detect up and down relative motions between the top cover 615 and the case 18. The lifting sensor 632 can include a metal plate (not shown) installed on the support column 614 and a first Hall sensor 633 installed on the lower base 584. The first device can include a control component, and the control component is the metal plate. The second component is the first Hall sensor 633. The control component is not electrically connected to the second device and is used to control the second device. When the mower is lifted, the metal plate is moved away from the first hall sensor 633 under the action of the support column 614, which causes a signal change of the first hall sensor 633. In this case, the first Hall sensor 633 controls the mower to stop working, so as to prevent the cutting assembly 616 from hurting people. In other embodiments, the first Hall sensor 633 may send a corresponding signal to the control circuit board 618, so that the control circuit board 618 controls the cutting assembly 616 to stop working.

In the illustrated embodiment, the first device of the lifting sensor 632 is a metal plate, and the second device is a Hall sensor. In other embodiments, the first device of the lifting sensor 632 may be a magnet, and the second device may be a reed switch; or, the first device of the lift sensor 632 may be an armature, and the second device may be an inductive sensor. In the illustrated embodiment, the first device of the lift sensor 632 is installed on the support column 614. In other embodiments, the first device of the lifting sensor 632 may be installed on the top cover 615 instead. In the illustrated embodiment, the first device is a metal plate, and the second device is a Hall sensor. In other embodiments, the first device may be a Hall sensor, and the second device is a metal plate.

As illustrated in FIG. 83, the collision sensor 639 is used to detect a horizontal movement of the top cover 615. The collision sensor 639 can include a third magnet 640 installed on the top cover 615 and a third Hall sensor 641 installed on the lower base 584. The third magnet 640 is a control component of the first device, and the third Hall sensor 641 is the second device. When the mower collides with an obstacle during traveling, the top cover 615 will continue to move forward for a certain distance along an original forward direction of the mower under the action of inertia, so that the magnet 640 and the third Hall sensor 641 produce a relative displacement, causing a signal change of the third Hall sensor 641. In this case, the third Hall sensor 641 controls the mower to reverse for a certain distance so as to make the mower avoid the obstacle. In the illustrated embodiment, the third Hall sensor 641 directly controls the retreat of the mower. In other embodiments, the third Hall sensor 641 may send a corresponding signal to the control circuit board 618, and the mower is controlled to retreat through the control circuit board 618. In the illustrated embodiment, the collision sensors 639 are provided at the front and rear of the mower. In other embodiments, the first device of the collision sensor 639 may be an armature, and the second device may be an inductive sensor.

As shown in FIG. 81 and FIG. 82, the upper base 583 is provided with a first switch, and the lower base 584 is provided with a second switch. The first switch is electrically disconnected from the second switch. The first switch controls the second switch to be on or off. Specifically, the safety switch 620 is used to control the power on or off of the mower. The safety switch 620 can include a button 621 installed on the upper base 583, a first magnet 624 (i.e., first device or first switch) installed on the button 621, and a first reed switch 625 (i.e., second device or second switch) installed on the lower base 584. The button 621 is pivotally mounted on the upper base 583 via a pivot, and the button 621 can include a first end 626 and a second end 627 arranged at two sides of the pivot. The first magnet 624 is installed on the first end 626. When the first end 626 is pressed, the first magnet 624 closes to the first reed switch 625. In this case, the first reed switch 625 is in the on-state, and the mower is in an energized state. When the second end 627 is pressed, the first magnet 624 is away from the first reed switch 625. In this case, the first reed switch 625 is in the off-state, and the mower is in a switched-off state.

As illustrated in FIG. 81 and FIG. 82, the safety lock 622 is used to control whether the mower is in an activated state (also referred to as active state). When the mower is in the activated state, the mower can be started. When the mower is in an inactive state or in a locked state, the mower cannot be started. The safety lock 622 can include a safety key 623, a motor lock body 634 installed on the upper base 583 corresponding with the safety key 623, and a second reed switch 635 (i.e., second device) installed on the lower base 584 or the lock body 634. A second magnet 636 (i.e., first device) is provided at one end of the safety key 623 close to the second reed switch 635. When the safety key 623 is inserted into the lock body 634 and the safety key 623 is rotated to make the second magnet 636 closing to the second reed switch 635, the second reed switch 635 is in an on-state, and the mower is in the activated state correspondingly. When the safety key 623 is pulled out from the lock body 634 or the safety key 623 is rotated to make the second magnet 636 away from the second reed switch 635, the second magnetic reed switch 635 is in an off-state, and the mower is in a locked state at this time.

Referring to FIG. 86 through FIG. 91, a main body 644 of the mower at least can include a battery assembly (not shown) for power supply, and at least two drive motors (not shown) for driving the cutting assembly and the walking assembly 8. The main body 644 of the mower should also include other components used to control and drive the operation of the mower. Especially, the main body 644 can further include charging terminals 645 for electrically connecting an external charging post to charge the battery assembly. A casing assembly 640 is used for supporting the cutting assembly and the walking assembly 8 accommodated in the main body 644. In the disclosure, the casing assembly 640 can include a first casing 641 and a second casing 642 that are buckled/engaged with each other, and the main body 644 is received between the first casing 641 and the second casing 642 to prevent the main body 644 from being affected by the external environment during use and thereby ensure the normal operation of the main body 644.

Referring to FIG. 87 through FIG. 91, the first casing 641 is hollow, the second casing 642 is generally plate-shaped. The first casing 641 is fastened onto an edge of the second casing 642 by a fastening structure, and a projection of the first casing 641 on a horizontal plane covers a projection of the second casing 642 on the horizontal plane. In one embodiment, the fastening structure is a snap-fit structure. In other embodiments of the disclosure, the fastening structure may also be, without limiting, a threaded structure, as long as the detachable connection between the first housing 641 and the second housing 642 is ensured.

As illustrated in FIG. 87 through FIG. 91, the first casing 641 and the second casing 642 are respectively formed with a first handle structure 643 and a second handle structure 654 for carrying the casing assembly 640 or the mower. As the casing assembly 640 is defined to have a first end and an opposite second end, the first handle structure 643 is located at the first end of the first casing 641, and the second handle structure 654 is located at the second end of the second casing 642. Projections of the first handle structure 643 and the second handle structure 654 on the horizontal plane are staggered arranged.

As illustrated in FIG. 87 through FIG. 91, the first handle structure 643 and the universal wheel 10 are both located at the first end of the casing assembly 640; and the second handle structure 654, the walking wheel 9, and a third walking wheel are all located at the second end of the casing assembly 640. With this arrangement, it is convenient for users to choose different handle structures to carry the casing assembly 640 or the mower according to different needs.

Figure 88A:
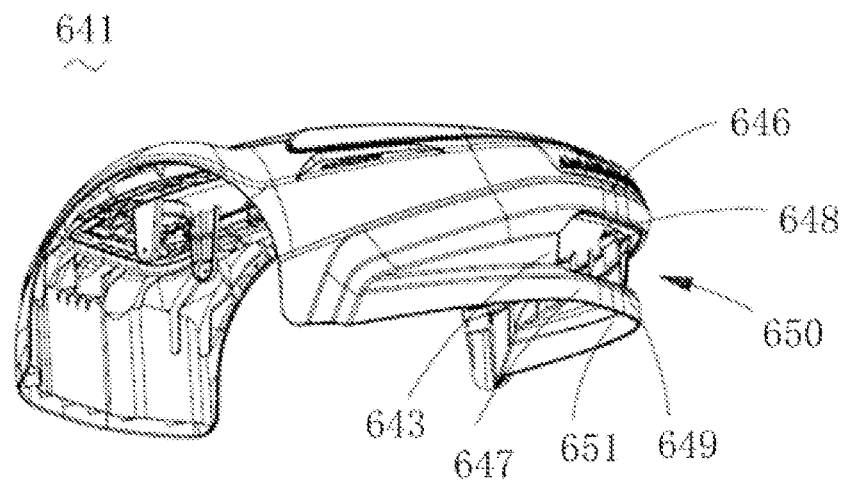
FIG. 88a is a schematic perspective structural view of the first casing.

Referring to FIG. 88a, the first handle structure 643 is recessed from outside to inside of the first casing 641, and the first handle structure 643 penetrates through the first casing 641 and forms at least a gripping portion 652 along an edge of the penetrating position. Specifically, the first end of the first casing 641 in the illustrated embodiment can include a first protrusion 646 protruding outward along the horizontal plane and a second protrusion 647 that is vertically offset from the first protrusion 646. The first handle structure 643 is located between the first protrusion 646 and the second protrusion 647. The positions and orientations of the user hands when transporting the casing assembly 640 or the mower together may constitute gripping positions during transporting. The first handle structure 643 and the second handle structure 654 each can provide gripping portions 652 corresponding to at least two gripping positions.

Figure 88B:
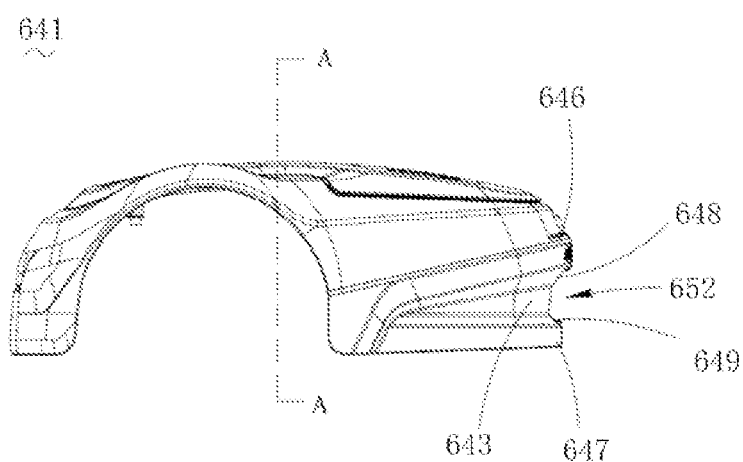
FIG. 88b is a schematic perspective structural view of the first casing from another viewing angle.

Referring to FIG. 88a and FIG. 88b, the gripping portions 652 provided on the first handle structure 643 can include a first gripping portion 648, a second gripping portion 649, and a through hole 605 between the first gripping portion 648 and the second gripping portion 649. The gripping positions of the first gripping portion 648 and the second gripping portion are arranged up and down in a staggered manner. A distance between the through hole 650 and the main body 644 is about 5-10 cm, so as to facilitate the user to extend his hand into the first handle structure 643 to achieve the transporting of the casing assembly 640 or the mower.

Referring to FIG. 86 through FIG. 88b, both the first gripping portion 648 and the second gripping portion 649 are arranged obliquely, an inclination degree of the first gripping portion 648 is greater than an inclination degree of the second gripping portion 649, and the charging terminals 645 are arranged toward the through hole 650. Such an arrangement allows the external charging device to be directly and electrically connected to the charging terminals 645 through the through hole 650, which further improves the practicability of the mower.

Figure 89:
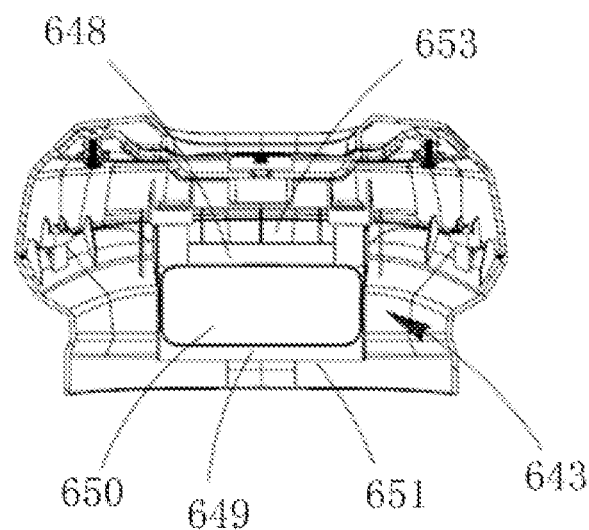
FIG. 89 is a schematic cross-sectional view of the first casing in FIG. 88b taken along the direction of A-A.

Referring to FIG. 89, the gripping portion 652 can further include a first gripping space 653 recessed from an edge of the first gripping portion 648 into the interior of the first casing 641, and a second gripping space 651 recessed from an edge of the second gripping portion 649 into the interior of the first casing 641. A projection of the first gripping space 653 on the horizontal plane covers a projection of the second gripping space 651 on the horizontal plane. In the illustrated embodiment, the first gripping space 653 is formed on the first protrusion 646, and the second gripping space 651 is formed on the second protrusion 647. In such an arrangement, when the user lifts the casing assembly 640 or the mower through the first gripping portion 648 or the second gripping portion 649, the user can bend and place his/her fingers in the first gripping space 653 or the second gripping space 651, thereby effectively reducing user fatigue accumulated when grasping the first griping portion 648 or the second gripping portion 649.

Figure 90:
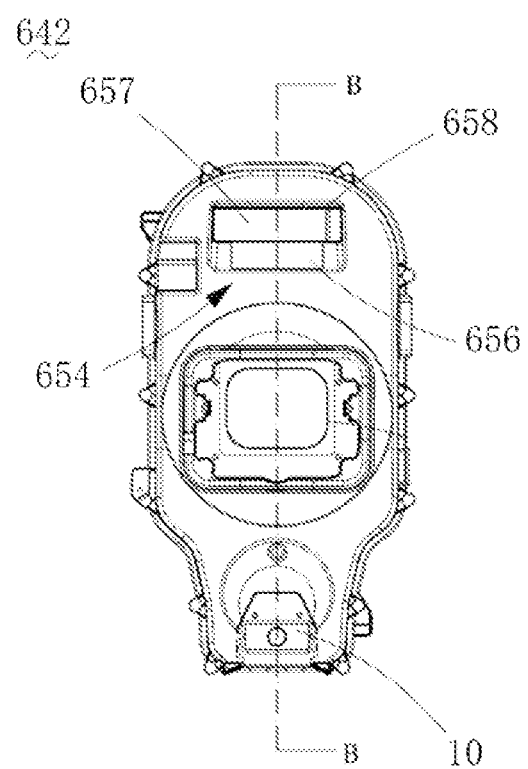
FIG. 90 is a schematic structural view of a second casing.
Figure 91:
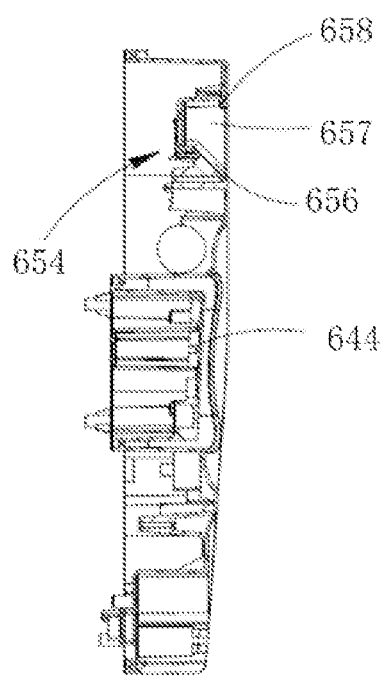
FIG. 91 is a schematic cross-sectional view of the second casing in FIG. 90 taken along the direction of B-B.

Referring to FIG. 90 and FIG. 91, the second handle structure 654 is arranged in a groove shape. In the disclosure, the second handle structure 654 is formed by recessing from a bottom of the second casing 642 toward the interior of the casing assembly 640, and an edge of the second handle structure 654 forms at least one gripping portion 652.

As illustrated in FIG. 90 and FIG. 91, the gripping portion 652 formed on the second casing 642 can include a third gripping portion 658 and a third gripping space 657 corresponding to the third gripping portion 658. The third gripping portion 658 extends along a surface of the second casing 642 toward the center of the third gripping portion 658. In an embodiment of the disclosure, the second handle structure 654 can further include an inclined guiding surface 656 opposite to the third gripping portion 658, and such arrangement can facilitate the user to extend the fingers into the third gripping space 657 and hold onto the third gripping portion 658, thus achieving the transportation of the casing assembly 640 or the mower.

Referring to FIG. 86 through FIG. 91, in an embodiment of the disclosure, the parts used for griping and inclined to the housing assembly 640/mower in the first grip portion 648, the second grip portion 649, and the third grip portion 658 are all set to rounded corners. Such arrangement can effectively reduce the tightening feeling of the grip part 652 and effectively improve the use-friendliness of the housing assembly 640 and the mower.

Referring to FIG. 86 through FIG. 91, in an embodiment of the disclosure, for example, the first handle structure 643 has the first gripping portion 648 and the second gripping part 649 and the second handle structure 654 has the third gripping portion 658. In other embodiments of the disclosure, the first handle structure 643 and the second handle structure 654 each can be provided with multiple gripping structures. That is, the number and structure of the gripping portion(s) 652 corresponding to each handle structure can be configured according to actual needs, without being limited herein.

As shown in FIG. 86 through FIG. 91, in the disclosure, when the casing assembly 640 is provided with the first handle structure 643 and the second handle structure 654, the casing assembly 640 can include gripping portions 652 with at least two gripping ways, and the user can choose different gripping positions of the gripping portions 652 according to his/her own physical condition and needs. First it can effectively reduce the accumulated fatigue when the user grasps the casing assembly 640; and second, it can prevent the user's fingers being laborious or strangled by the gripping portion. Meanwhile, the mower with the casing assembly 640 can be easily carried/transported, which effectively improves the practicability of the mower.

Figure 92:
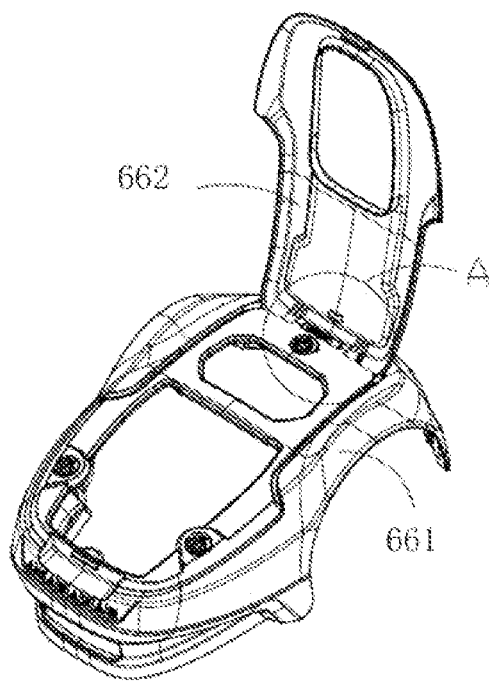
FIG. 92 is a schematic perspective partial view of a housing of the disclosure.

Referring to FIG. 92, an embodiment of the disclosure provides a connection structure, which can be used as a connection method on the housing 1 of the mower and used for the installation between a main body 661 and a rear cover 662 of the housing 1.

Figure 93:
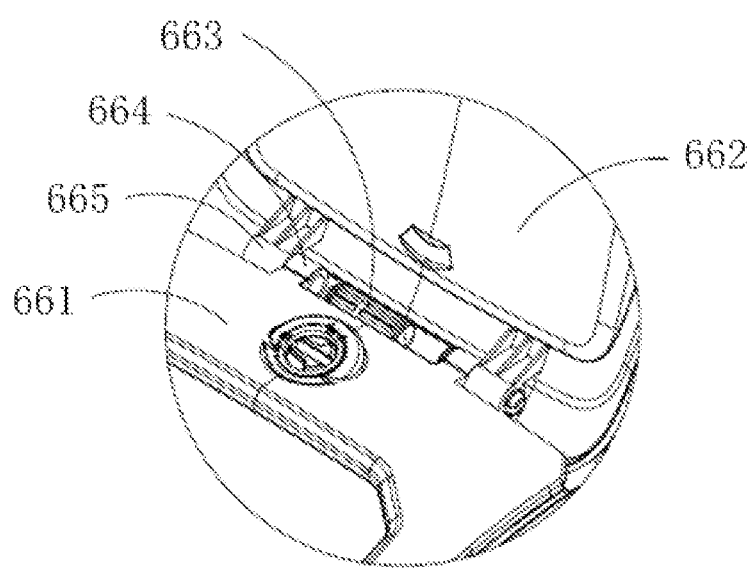
FIG. 93 is a schematic enlarged view of the portion A in FIG. 92.
Figure 94:
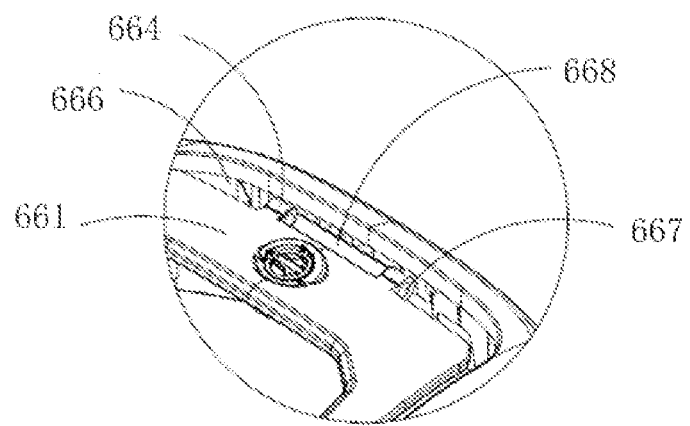
FIG. 94 is a schematic partial enlarged view of a main body of the disclosure.
Figure 95:
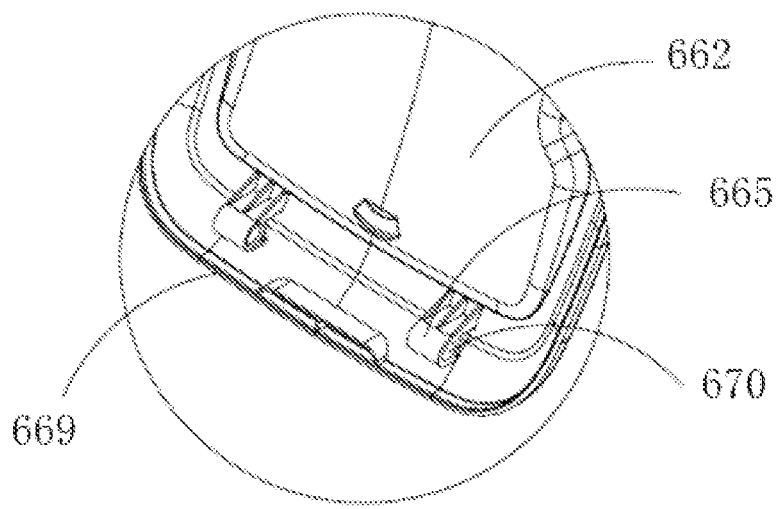
FIG. 95 is a schematic partial enlarged view of a rear cover of the disclosure.

Referring to FIG. 93 through FIG. 95, the connection structure can include a mounting portion 664 provided on the main body 661 and a fixing portion 665 provided on the rear cover 662. The mounting portion 664 and the fixing portion 665 are disposed opposite to each other. Specifically, the mounting portion 664 is located in an opening 666 on a side of the main body 661, and the fixing portion 665 is located at an edge 669 on a side of the rear cover 662. The mounting portion 664 is rotatably connected with the fixing portion 665 in the opening 666 through a shaft pin 663. Such a connection mechanism is simple in structure and convenient to operate.

As illustrated in FIG. 92 through FIG. 95, the mounting portion 664 can include two mounting holes 667, the fixing portion 665 can include two mounting holes 670, and the two mounting holes 667 are arranged in one-to-one correspondence with the two mounting holes 670 on the fixing portion 665. The mounting portion 664 is provided with a shaft pin receiving groove 668. To install the main body 661 and the rear cover 662 together, the shaft pin 663 can be pre-placed in the shaft pin receiving groove 668 and fixed to the mounting portion 664 and the fixing portion 665, and the installation of the main body 661 and the rear cover 662 is completed consequently. In other embodiments of the disclosure, the shaft pin receiving groove 668 may be disposed on the fixing portion 665.

As shown in FIG. 92 through FIG. 95, the shaft pin receiving groove 668 is located between the two mounting holes 667. The mounting holes 667 and the shaft pin receiving groove 668 connect with each other and are located on the same straight line. A length of the shaft pin receiving groove 668 is greater than a length of the shaft pin 663, thereby facilitating the shaft pin 663 to slide along the pin receiving groove 668 and then pass through the mounting holes 667 and the mounting holes 670.

As illustrated in FIG. 92 through FIG. 95, the length of the shaft pin receiving groove 668 is slightly greater than twice the length of the shaft pin 663. In this way, two shaft pins can be placed in the shaft pin receiving groove 668 at the same time. In other embodiments of the disclosure, the shaft pin receiving groove 668 may be located on both sides of the mounting hole 667. The mounting portion 664 and the fixing portion 665 can be arranged alternately.

Figure 96:
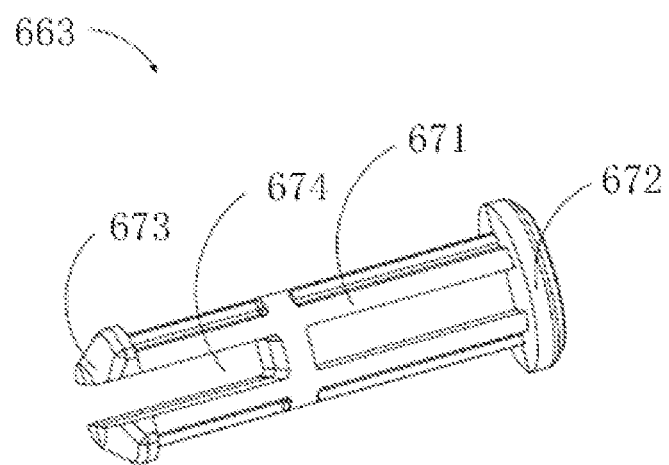
FIG. 96 is a schematic perspective view of a shaft pin of the disclosure.

Referring to FIG. 96, the shaft pin 663 can include a body portion 671, a head portion 672 at one end of the body portion 671, and a tail portion 673 at the other end of the body portion 671. The body portion 671, the head portion 672, and the tail portion 673 can be integrally constructed, without being limited herein.

As illustrated in FIG. 96, the shaft pin 663 is provided with a penetrating opening 674 from the middle of the body portion 671 to the tail portion 673. The tail portion 673 is cone-shaped, and is made of an elastic material. A diameter of one end of the tail portion 673 near the body portion 671 is larger than that of the other end. The opening 674 can be opened and closed according to the force applied onto the tail portion 673, and the opening 674 can be elastically deformed, thereby can change the diameter of the tail portion 673. The diameters of the head portion 672 and the tail portion 673 are both larger than a diameter of the body portion 671.

After the installation is completed, the mounting holes 667 and the mounting holes 670 can be interposed between the head portion 672 and the tail portion 673. Moreover, a diameter of the shaft pin receiving groove 668 is not less than the diameters of the head portion 672 and the tail portion 673, so as to prevent the shaft pin 663 from sliding out of the shaft pin receiving groove 668 when the shaft pin 663 slides along the shaft pin receiving groove 668. Opening diameters of the mounting holes 670 and the mounting holes 667 each are smaller than the diameter of the tail portion 673. The opening diameters of the mounting holes 670 and the mounting holes 667 each are larger than the diameter of the body portion 671.

Referring to FIG. 92 through FIG. 96, in an embodiment of the disclosure, specific installation operations (or steps) of the main body 661 and the rear cover 662 are as follows.

Step 1: placing the shaft pin 663 in the shaft pin receiving groove 668 in advance, and aligning the mounting holes 667 on the main body 661 with the mounting holes 670 on the rear cover 662 one by one.

Step 2: pushing the shaft pin 663 into the mounting holes 667 and the mounting holes 670 along the shaft pin receiving groove 668. In this case, the tail portion 673 of the shaft pin 663 is squeezed by the mounting hole 667 and the mounting hole 670, and the opening 674 is closed, resulting the tail portion 673 and the main body 671 sequentially passing through the mounting hole 667 and the mounting hole 670.

Step 3: pushing the tail portion 673 completely out of the mounting hole 667 and the mounting hole 670. In this case, the tail portion 673 of the shaft pin 663 is not pressed by the mounting hole 667 and the mounting hole 670, and the opening 674 is opened. Thus, the tail portion 673 exposes from the mounting hole 670, the body portion 671 is accommodated in the mounting hole 667 and the mounting hole 670, and the head portion 672 is exposed from the mounting hole 667 and is accommodated in the shaft pin accommodating groove 668, thereby the installation of the shaft pin 663 at one side is completed.

Step 4: repeating the above steps to install the shaft pin 663 at the other side, until all installation tasks are completed.

The connection structure includes the mounting portion 664 and the fixing portion 665 disposed opposite to the mounting portion 664, and the mounting portion 664 is connected to the fixing portion 665 through the shaft pins 663. The shaft pin accommodating groove 668 is provided on the mounting portion 664, and the shaft pin 663 is placed in the shaft pin accommodating groove 668 in advance, so that the installation is completed only by sliding the shaft pin 663 along the shaft pin receiving groove 668 to fix onto the mounting portion 664 and the fixing portion 665. The above structure is simple and the above operation is convenient.

Referring to FIG. 97 through FIG. 101, a lifting detection device 267 of a mower is used to detect a lifting displacement of a main body 265 of the mower relative to a chassis 266 of the mower. The main body 265 is located directly above the chassis 266, and the main body 265 can be lifted upwards and is displaced in the vertical direction relative to the chassis 266.

Figure 97:
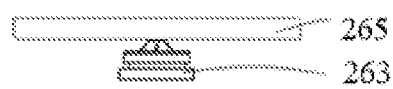
FIG. 97 is a schematic structural view of lifting detection device of a mower of the disclosure, wherein the lifting detection device is located between a main body and a chassis.
Figure 97:
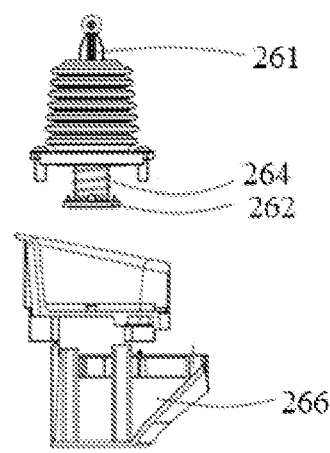

As illustrated in FIG. 97, the lifting detection device 267 of the mower can include a shock absorber 261 connected with the main body 265, a sliding member 262 connected with the shock absorber 261, a metal plate 278 arranged at the bottom of the sliding member 262, a sensor 281 arranged on a printed circuit board (PCB) in the chassis 266, and a connector 268 connecting the main body 265 and the shock absorber 261. Through the connection of the connector 268, the shock absorber 261, the sliding member 262 and the metal plate 278 may move upward with the main body 265.

Figure 98:
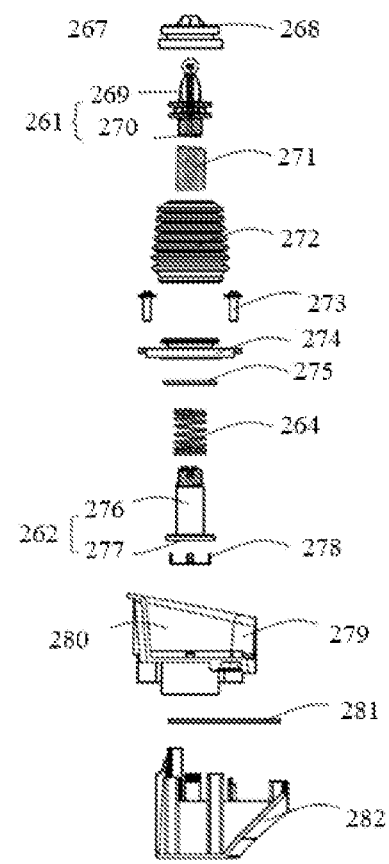
FIG. 98 is a schematic perspective exploded view of the lifting detection device of the mower of the disclosure.

As illustrated in FIG. 98, the metal plate 278 can be buckled or fixed by screws to the bottom of the sliding member 262. The sensor 281 is used to detect a distance D between the chassis 266 and the metal plate 278 in the vertical direction. When the main body 265 is lifted relative to the chassis 266, the metal plate 278 moves upward correspondingly. When the distance between the metal plate 278 and the chassis 266 in the vertical direction exceeds a preset value, the sensor 281 sends a trigger signal to a control device of the mower (not shown) to control the mower to stop working, so as to prevent the mower from injuring the operator.

As shown in FIG. 98, a material of the shock absorber 261 may be rubber. The shock absorber 261 can include a first connecting end 269 facing toward the main body 265 and a second connecting end 270 facing toward the sliding member 262. The connector 268 can include a receiving groove 285 with an opening facing toward the shock absorber 261, the receiving groove 285 is used for receiving the first connecting end 269. The connection method of the connector 268 and the shock absorber 261 is not limited herein, and it can be realized by bolt connection, or by snap connection, or other commonly used connection method, as long as the two can be tightly connected.

As illustrated in FIG. 98, the sliding member 262 is fixedly connected to the shock absorber 261. That is, the movement states of the sliding member 262 and the shock absorber 261 are consistent. A material of the sliding member 262 may be plastic. The sliding member 262 can include a connecting portion 276 extending in the vertical direction and a fixing portion 277 perpendicular to the connecting portion 276. The connecting portion 276 is connected to the second connecting end 270 of the shock absorber 261. The fixing portion 277 is located at the bottom and protrudes toward the periphery relative to the connecting portion 276 to form an enlarged end. The metal plate 278 is fixed on the bottom surface of the fixing portion 277.

Figure 99:
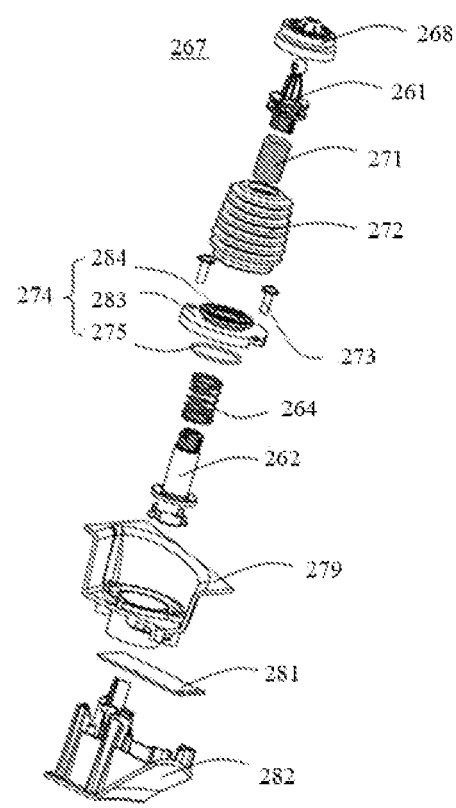
FIG. 99 is a schematic perspective exploded view of the lifting detection device of the mower of the disclosure from another viewing angle.

Referring to FIG. 98 and FIG. 99, the lifting detection device 267 of the mower can further include a connecting plate 274 fixed on the chassis 266. The connecting plate 274 can include a mounting plate 283 provided with a through hole, a sleeve 284 fixed in the through hole, and a sealing ring 275 between the mounting plate 283 and the sleeve 284. The connecting portion 276 of the sliding member 262 passes upward through the sleeve 284 and is slidably arranged. The mounting plate 283 is fixed to the chassis 266 by fastening devices 273. The fastening device 273 may be a screw or other commonly used connectors.

As illustrated in FIG. 98, the lifting detection device 267 of the mower can further include a first spring 264 and a second spring 271. The first spring 264 is sleeved between the sleeve 284 and the fixing portion 277 of the sliding member 262, and the first spring 264 is sleeved on the outer circumference of the connecting portion 276 of the sliding member 262. Since the sleeve 284 is fixed, when the sliding member 262 moves upward with the main body 265, the first spring 264 is compressed.

As shown in FIG. 98, the second spring 271 is disposed between the shock absorber 261 and the sliding member 262. Both the shock absorber 261 and the sliding member 262 are made of plastic. An upper end of the second spring 271 is threadedly connected to a lower end of the shock absorber 261. A lower end of the second spring 271 is threadedly connected to a top end of the connecting portion 276 of the sliding member 262. The shock absorber 261 provides a stable zero position by using the second spring 271, which makes it easy to install the main body 265. This is because the second spring 271 is fixed by the shock absorber 261 in an initial position, and the second spring 271 is not easy to deform.

As illustrated in FIG. 98 and FIG. 99, a plane where the mower collides with an obstacle is defined as a collision plane. When the robotic mower collides horizontally, a deflection elastic force of the second spring 271 may resist the horizontal movement. With this arrangement, when the mower collides with the obstacle, e.g., when the mower hits a tree, the shock absorber 261 can be used to reduce a vertical displacement caused by a displacement of the main body 265 relative to the chassis 266 on the collision plane. Therefore, it is ensured that the main body 265 of the mower will not move upward when a collision with the obstacle occurs, thereby avoiding the situation that the mower stops working due to the vertical displacement caused by the collision with the obstacle. That is, the shock absorber 261 allows the main body 265 to move only in the vertical direction relative to the chassis 266 during the collision of the mower robot. The collision plane is approximately parallel to a mowing plane, that is, roughly a horizontal plane.

Referring to FIG. 98 and FIG. 99, when the mower is in a normal working state, the first spring 264 is in a freely extended state, and the sliding member 262 needs to overcome the elastic force of the first spring 264 to move the main body 265 forward, which is to move away from the chassis 266. With this arrangement, when the mower is slightly collided or faces a bumpy situation (when the mower passes a ramp, a stone or other obstacle), the sliding member 262 receives less force than the elastic force of the first spring 264, the sliding member 262 will not move in the vertical direction, thereby avoiding the sliding member 262 moving upward due to slight turbulence which may cause the sensor 281 erroring or cause the mower to stop working. As a result, the working stability of the mower is improved consequently.

As illustrated in FIG. 98 and FIG. 99, the lifting detection device 267 of the mower can further include a protective cover 272 covering the outer periphery of the shock absorber 261. In the illustrated embodiment, the protective cover 272 is a bellows. One end of the bellows 13 is connected with the shock absorber 261, and the other end is connected with the mounting plate 283 of the connecting plate 274. This arrangement prevents the shock absorber 261 from being contaminated and damaged, and prolongs the service life of the shock absorber 261. A material of the metal plate 278 may be aluminum. The sensor 281 may be a Hall sensor, an inductive sensor, or a magnetic sensor.

Figure 101:
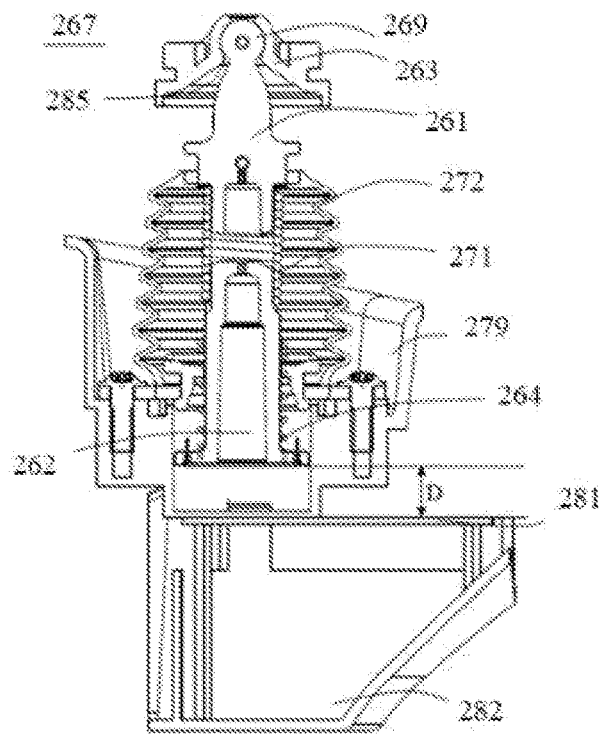
FIG. 101 is a schematic cross-sectional structural view of the lifting detection device of the mower in a lifted state of the disclosure.

Referring to FIG. 101, the chassis 266 can include a lower base 282 and an upper base 279. The sensor 281 is disposed on the lower base 282 and is tightly attached to a bottom surface of the upper base 279. The connecting plate 274 is fixed on the upper base 279 by the fastening devices 273. The upper base 279 is further provided with a receiving cavity 280 for receiving and supporting the bottom of the sliding member 262. The metal plate 278 touches against the bottom surface of the receiving cavity 280.

Figure 100:
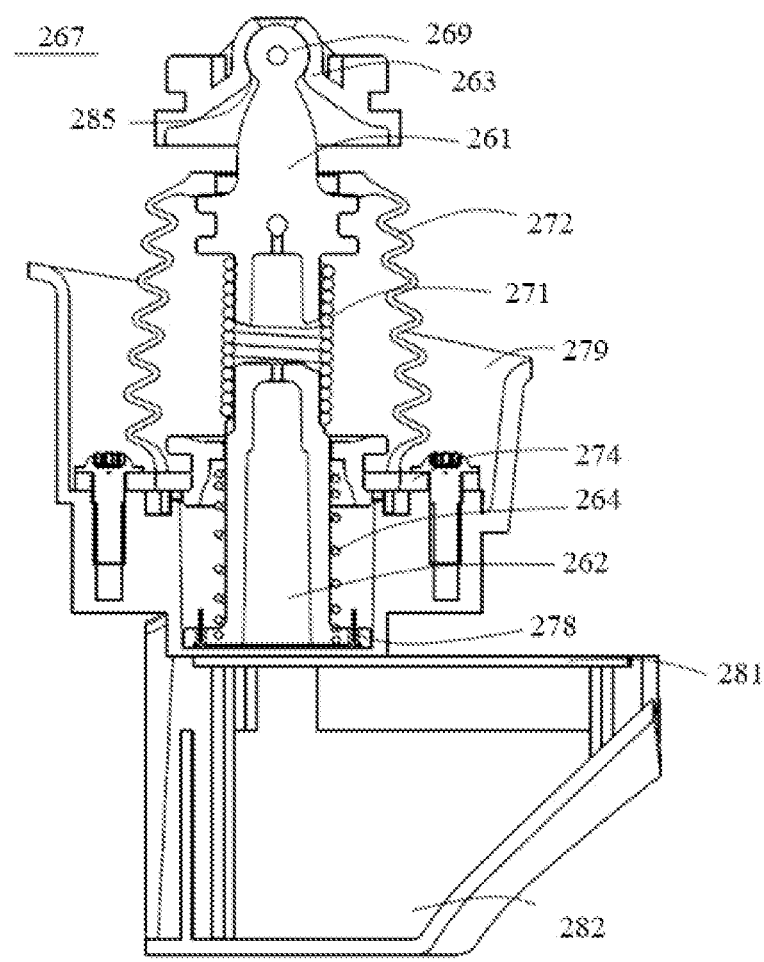
FIG. 100 is a schematic cross-sectional structural view of the lifting detection device of the mower in a normal working state of the disclosure.

Referring to FIG. 100, a working process of the lifting detection device 267 of the mower will be described below: when the mower is in a normal working state, the first spring 264 is in a naturally extended state, and the metal plate 278 is positionally close to the sensor 281. When the mower is lifted, the main body 265 moves upward, the shock absorber 261 and the sliding member 262 are driven to move upward relative to the chassis 266, as shown in FIG. 101. In this case, the first spring 264 is in a compressed state, the metal plate 278 located at the bottom of the sliding member 262 moves upward, and the sensor 281 detects the distance D between the metal plate 278 and the sensor 281. When the distance D reaches the preset value, the sensor 281 sends a trigger signal to the control device of the mower to control the blades of the mower to stop rotating, so as to prevent the operator from being injured.

When the mower is only colliding with an obstacle instead of being lifted (for example, when hitting a tree), the shock absorber 261, the first spring 264, and the second spring 271 can play a role in damping vibration, so that the sliding member 262 will not move upward. That is, the positions of the metal plate 278 and the sensor 281 are kept close to each other, which prevents the sliding member 262 from moving upward due to slight bumps which may cause the sensor 281 erroring and thereby cause the mower to stop working. As a result, the working stability of the mower is improved consequently.

Therefore, in the lifting detection device 267 of the mower, the sensor 281 is installed in the chassis 266 to detect the distance between the metal plate 278 provided on the sliding member 262 and the chassis 266, and to determine the distance between the main body 265 of the mower and the chassis 266. The lifting detection device 267 of the mower can include a simple structure and the space of the mower is saved. There is no need to construct a hole on the chassis 266 for the wire connecting the lifting detection device and the chassis to pass through, and thus the waterproof performance is preserved. The shock absorber 261 can reduce the occurrence of a situation in which the mower is mistakenly stop working due to the displacement in the vertical direction caused by the collision with obstacles, and thus improves the stability of the mower.

Figure 102:
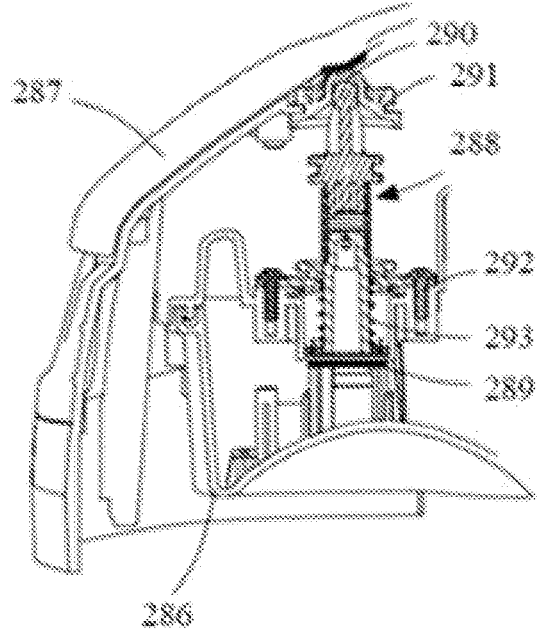
FIG. 102 is a schematic cut-away structural view of the mower of the disclosure.

Referring to FIG. 102, an intelligent/smart/robotic mower can automatically work on a grassland. The mower can include a body 286, a casing 287 covering the body 286, and a suspension device 288 movably connecting the body 286 and the casing 287.

As illustrated in FIG. 102, the body 286 is provided with a walking wheel(s) (not shown) for moving the mower, a driving motor (not shown) for driving the walking wheel, a cutting assembly/tool for mowing (not shown), a control assembly (not shown) for controlling operations of the driving motor and the cutting assembly, and a battery pack for providing power to the mower. The structures of the walking wheel, the driving motor, the cutting assembly, the control assembly, and the battery pack are described in details throughout this disclosure.

As shown in FIG. 102, the casing 287 which covers the outside of the body 286 can protect the body 286 as well as the operator. For example, it can provide dustproof and waterproof to protect the structures such as the driving motor, the cutting assembly, the control assembly and the battery pack, and can prolong the service life of each of the structures. Meanwhile, it can also prevent the operator from accidents when using the mower, thereby improving the safety factor of the mower consequently.

Figure 103:
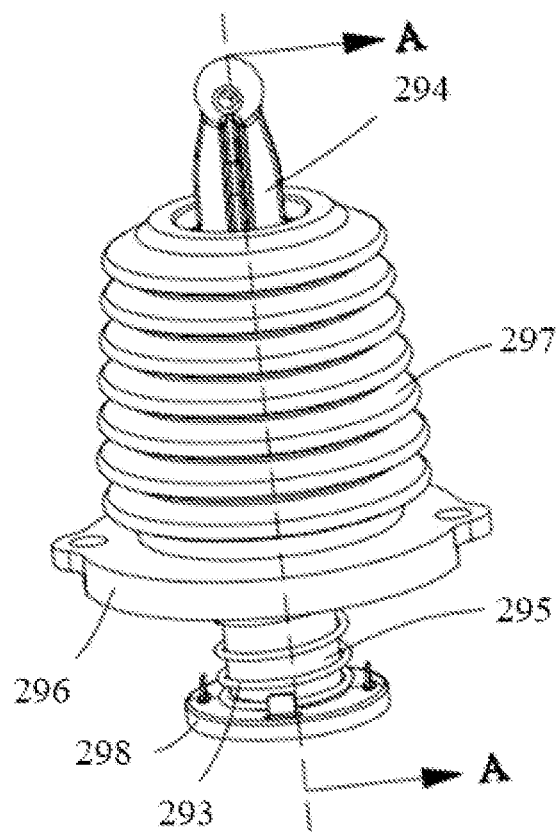
FIG. 103 is a schematic perspective view of a suspension device in FIG. 102.
Figure 104:
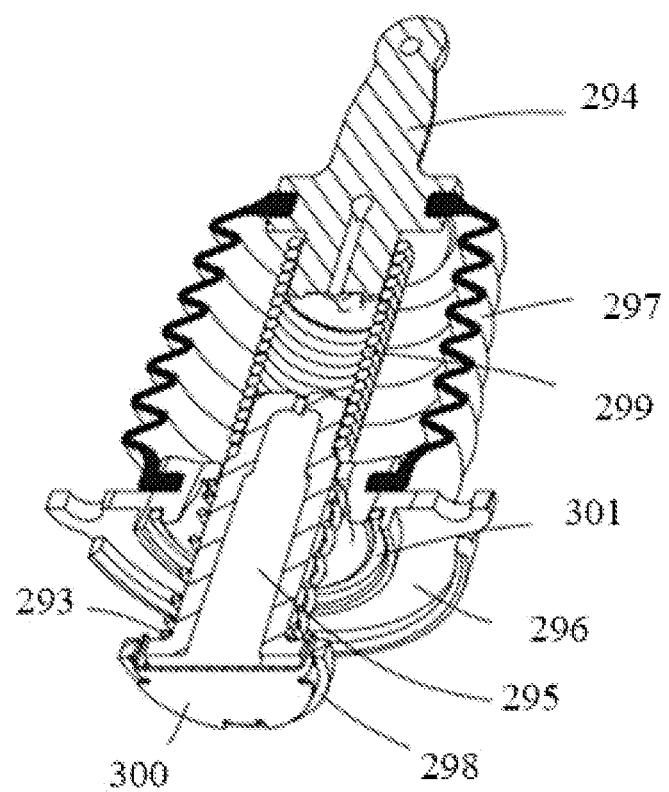
FIG. 104 is a schematic cross-sectional view of the suspension device in FIG. 103 taken along the direction of A-A.
Figure 105:
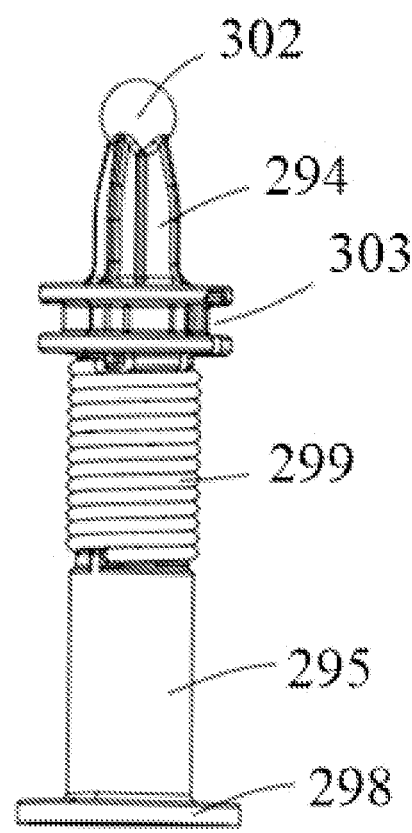
FIG. 105 is a schematic perspective partial structural view of the suspension device in FIG. 103.

Referring to FIG. 102 through FIG. 104, the suspension device 288 can include a first support column 294 connected to the casing 287, a second support column 295 connected to the body 286, and a flexible connecting member 299 connecting the first support column 294 and the second support column 295. Specifically, one end of the flexible connecting member 299 is connected to the first support column 294, and the other end is connected to the second support column 295, so that the casing 287 can move relative to the body 286 in a direction perpendicular to the body 286 and/or in a horizontal direction.

As illustrated in FIG. 102 through FIG. 104, in the direction perpendicular to the body 286, the first support column 294 is opposite to the second support column 295, and the first support column 294 is located above the second support column 295. It can be understood as that: the horizontal direction is a direction parallel to the ground, and the direction perpendicular to the body 286 is a direction perpendicular to the ground and shall be referred to as the vertical direction.

Referring to FIG. 102 and FIG. 105 through FIG. 107, the first support column 294 is provided with a connecting portion 302, the casing 287 is correspondingly provided with a receiving portion 90, and the connecting portion 302 is received in the receiving portion 90. Specifically, in the illustrated embodiment, the first support column 294 is roughly a columnar structure, and the connecting portion 302 is provided on the top of the first support column 294 and can include a spherical structure. The casing 287 is correspondingly provided with a rubber cap 291, the rubber cap 291 is fixedly connected to the casing 287, the receiving portion 90 is a spherical receiving cavity formed in the rubber cap 291, and the spherical connecting portion 302 is received in the spherical receiving cavity so as to achieve a fixed connection between the first support column 294 and the casing 287. Thus, when the casing 287 is moved by an external force, the first support column 294 will be driven to move correspondingly. In other embodiments, the first support post 294 and the housing 287 can be connected by other structures, as long as the first support column 294 and the casing 287 can be fixedly connected, without being limited herein.

Figure 106:
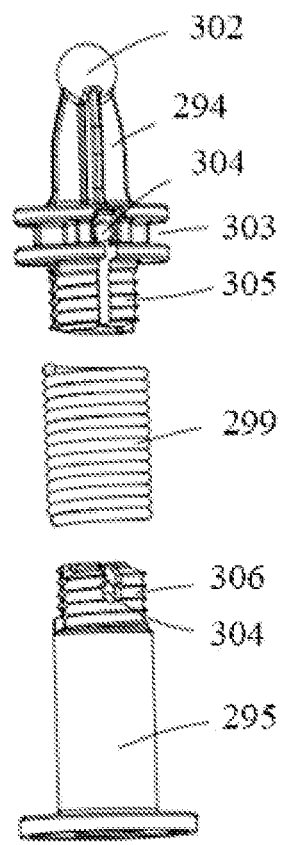
FIG. 106 is a schematic exploded view of FIG. 105.

As illustrated in FIG. 106, the first support column 294 is further provided with a groove 303 surrounding an axial direction thereof, and the groove 303 is approximately located at a middle position of the first support column 294.

As shown in FIG. 106, The flexible connecting member 299 can include a spring. One end of the first support column 294 is provided with a first thread 305 matching the spring, and one end of the second support column 295 is provided with a second thread 306 matching the spring. One end of the spring is threadedly connected with the first support column 294, and the other end is threadedly connected with the second support column 295. Specifically, in the vertical direction, the first thread 305 is provided on the bottom of the first support column 294, and the second thread 306 is provided on the top of the second support column 295.

Figure 107:
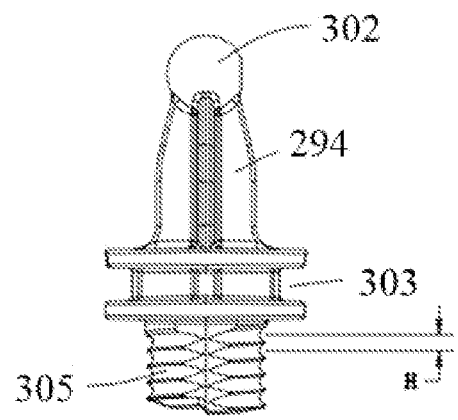
FIG. 107 is a schematic perspective view of a first support column in FIG. 106.

As illustrated in FIG. 107, a pitch H of the first thread 305 gradually increases from bottom to top. In this way, when the spring is screwed onto the first support column 294, the spring will gradually tighten to increase a pressure between the spring and the first support. The increasing the friction between the spring and the first support column 294 makes the spring difficult to escape. Similarly, a pitch of the second thread 306 is correspondingly set to gradually increase from top to bottom.

As illustrated in FIG. 106, the flexible connecting member 299 can further include a rope (not shown). Both ends of the rope are provided with spherical fixing members. The first support column 294 and the second support column 295 are respectively provided with spherical grooves 304 for correspondingly accommodating the spherical fixing members.

As shown in FIG. 106, the spherical groove 304 on the first support column 294 is recessed inwardly from an inner side wall of the groove 303, the spherical groove 304 on the second support column 295 is recessed on the second thread 306 and close to the top of the second support column 295.

As shown in FIG. 106, the flexible connecting member 299 can include a spring and a rope, and a length of the rope is greater than a length of the spring. This arrangement can ensure that the mower stops working when the mower is lifted in case the spring is failed. In some embodiments, the flexible connecting member 299 may have other structures, as long as it can achieve the effect of stopping the mower when it is lifted, without being limited herein.

Referring to FIG. 102 through FIG. 104, FIG. 108, and FIG. 109, the suspension device 288 can further include a fixing frame 296 fixedly connected to the body 286. The fixing frame 296 is provided with a through hole 311. In the vertical direction, the top of the second support column 295 penetrates the fixing frame 296 via the through hole 311. Specifically, in the disclosure, the fixing frame 296 can include a cylindrical structure, and the through hole 311 is formed at the center of the fixing frame 296.

Figure 108:
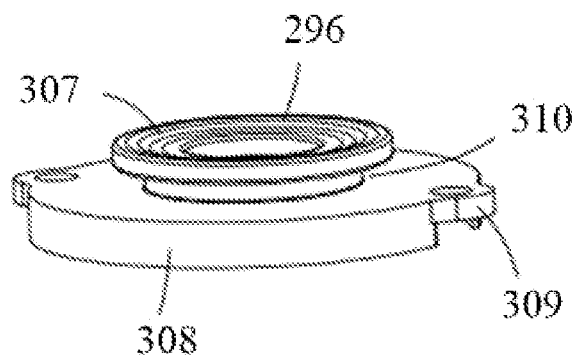
FIG. 108 is a schematic perspective view of a fixing frame of the suspension device in FIG. 103.

As illustrated in FIG. 108, the fixing frame 296 can include a first fixing portion 307 and a second fixing portion 308. A diameter of the first fixing portion 307 is smaller than a diameter of the second fixing portion 308. The through hole 311 penetrates through the first fixing portion 307 and the second fixing portion 308 in the vertical direction. The through hole 311 can include a first through hole 315 formed on the first fixing portion 307 and a second through hole 313 formed on the second fixing portion 308, and a diameter of the first through hole 315 is smaller than a diameter of the second through hole 313.

As shown in FIG. 108, the top of the first fixing portion 307 is slightly recessed downwardly so as to accommodate one end of the spring 299 and to positionally limit one end of the spring 299. An annular groove 314 is recessed at the bottom of the second fixing portion 308. The annular groove 314 is located at the periphery of the second through hole 313 and used for accommodating a sealing ring 301. The sealing ring 301 (also referred to as gasket) is used to strengthen waterproof performance of the body 286.

As illustrated in FIG. 108, the fixing frame 296 is fixed on the body 286, an annular protrusion (not labelled) protrudes from a position of the body 286 corresponding to the annular groove 314, so that the annular protrusion, the annular groove 314 and the sealing ring 301 are mutually cooperated, which not only enables the fixing frame 296 to be closely integrated with the body 286, but also can provide good waterproof performance.

Figure 109:
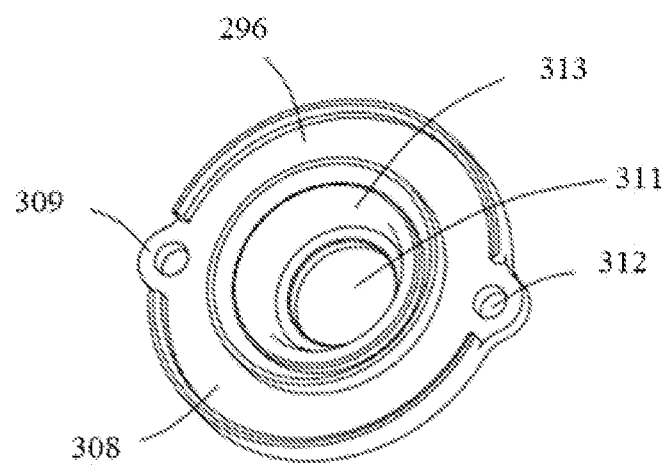
FIG. 109 is a schematic perspective view of the fixing frame in FIG. 108 from another viewing angel.
Figure 110:
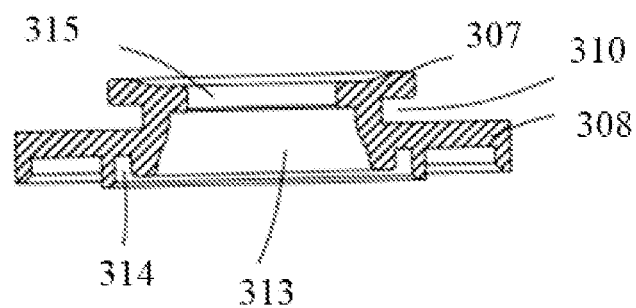
FIG. 110 is a schematic cross-sectional view of the fixing frame in FIG. 108.

As illustrated in FIG. 109, the fixing frame 296 is installed and fixed on the fuselage 286 by screws 292. The second fixing portion 308 is provided with two lugs 309, and each lug 309 is provided with an opening 312. The two lugs 309 are arranged opposite to each other. The screws 292 pass through the openings 312 to fix the fixing frame 296 on the body 286. In other embodiments, the fixing frame 296 can be installed and fixed on the body 286 in other ways, such as snap-fit, hard interference, etc., without limiting herein.

Referring to FIG. 102 through FIG. 104 again, in the vertical direction, the bottom of the second support column 295 is provided with a fixing head 298, and a metal sheet 300 is installed on the fixing head 298. A displacement sensor 289 is provided in the body 286. The displacement sensor 289 is located under the metal sheet 300 and used to detect a displacement of the second support column 295. The suspension device 288 can further include a compression spring 293 arranged between the fixing frame 296 and the fixing head 298. One end of the compression spring 293 is received in the second through hole 313 and touches against an inner wall surface of the second fixing portion 308, and the other end touches against an upper surface of the fixing head 298.

As illustrated in FIG. 102 through FIG. 104, when the mower is lifted for some reason, the casing 287 can drive the first support column 294, the flexible connecting member 299, and the second support column 295 to move upward. In this case, the compression spring 293 is compressed. If the displacement sensor 289 detects the second support column 295 is displaced and the detected displacement exceeds a preset value, an induction signal is sent to the control assembly, and the control assembly then sends a control signal to the cutting assembly to stop the mower. When the external force disappears, a restoring force of the compression spring 293 can prompt the second support column 295, the flexible connecting member 299, and the first support column 294 to return to the initial position. In this case, the mower can resume its work.

As shown in FIG. 102 through FIG. 104, the suspension device 288 can further include a dust-proof rubber sleeve 297 covering the first support column 294, a flexible connecting member 299, and a second support column 295. An open end at one side of the dustproof rubber sleeve 297 is positioned in the groove 303, and another open end at the other side is positioned in the fixing frame 296. Specifically, a limiting space 310 is provided between the first fixing portion 307 and the second fixing portion 308 of the fixing frame 296. The dust-proof rubber sleeve 297 is substantially in a column shape. And in the vertical direction, the top open end of the dust-proof rubber sleeve 297 is positioned in the groove 303, and the bottom open end is positioned in the limiting space 310, so as to protect the flexible connecting member 299, a connecting position of the flexible connecting member 299 and the first support column 294, and a connecting position of the flexible connecting member 299 and the second support column 295.

Referring to FIG. 102 through FIG. 104 again, four suspension devices 288 are respectively arranged at the four corners of the body 286. In other embodiments, the number and positions of the suspension devices 288 can be changed, without being limited herein.

As illustrated in FIG. 102, when the mower works normally, the casing 287 cannot move disorderly. When the mower hits an obstacle during operation, the casing 287 may stop while the body 286 may continue to move forward, which may cause a relative displacement between the body 286 and the casing 287. In this case, the collision sensor on the body 286 (not shown) sends a collision signal to the control assembly, and the control assembly then controls the mower to reverse or retreat. In the event of a collision, since the rubber cap 291 is fixed on the casing 287, the rubber cap 291 may drive the first support column 294 to deflect. Since the second support column 295 is housed in a cylindrical hole of the body 286, a horizontal degree of free-space is small, and therefore the rubber cap 291 may drive the spring 299 to deflect at the same time.

As illustrated in FIG. 102, after the mower collides, the spring 299 may not directly return to its original state, but may continue to vibrate/shake. In this case, both the spring 299 and the rubber cap 291 can be deformed. The rubber cap 291 can include a damping effect and can offset vibration. Therefore, the rubber cap 291 can be used to absorb/offset part of the vibration to prevent the body 286 from cracking, thereby greatly extending the service life of the mower and reducing the use cost.

Accordingly, in the mower of the disclosure, the suspension device 288 is configured to include the first support column 294, the second support column 295, and the flexible connecting member 299 connecting the first support column 294 and the second support column 295. The first support column 294 is connected to the casing 287, and the second support column 295 is connected to the body 286, so that the casing 287 cannot move disorderly during normal operation. The casing 287 can flexibly move relative to the body 286 in the direction perpendicular to the body 286 and/or in the horizontal direction when it collides with an obstacle.

Figure 115:
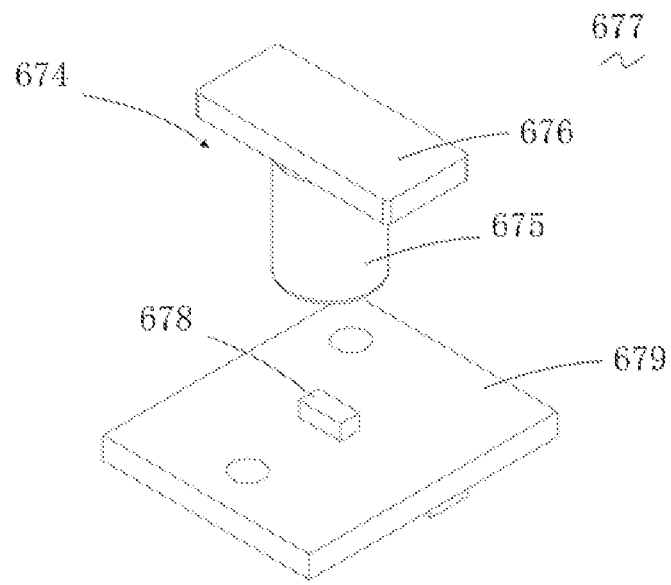

Referring to FIG. 111 through FIG. 115, an embodiment of the disclosure can include a collision sensor 677 for detecting collisions. The collision sensor 677 can include a magnet fixing structure 674. As shown in FIG. 115, the collision sensor 677 can include a magnet 675, the magnet fixing structure 674, and a Hall sensor 678 corresponding to the magnet fixing structure 674. The magnet fixing structure 674 and the Hall sensor 678 are respectively and fixedly arranged on the housing 1 and a mower body (including the cutting assembly 616, the walking assembly 8 and the battery pack assembly). The mower body is provided with a circuit board 679, the Hall sensor 678 is electrically connected to the circuit board 679, and the Hall sensor 678 is correspondingly disposed directly under the magnet fixing structure 674.

As illustrated in FIG. 111 through FIG. 115, there may be one set of the Hall sensor 678, and the collision sensor 677 can be used to detect collision. In another embodiment of the disclosure, there may be four sets of the Hall sensors 678 which are respectively arranged in the front, rear, left, and right directions directly below the magnet fixing structure 674 to detect specific collision directions. Furthermore, the number of Hall sensors 678 can be more. For example, there may be four additional sets of Hall sensors 678 (for a total of eight sets of Hall sensors 678) respectively positioned on the left front, left rear, right front, and right rear directions, besides the front, rear, left, and right directions, so as to improve detection accuracy of collision direction. In the illustrated embodiment, after detecting a collision direction, the mower may control the walking assembly 8 to retreat in the collision direction, so as to avoid a possible subsequent collision.

Figure 111:
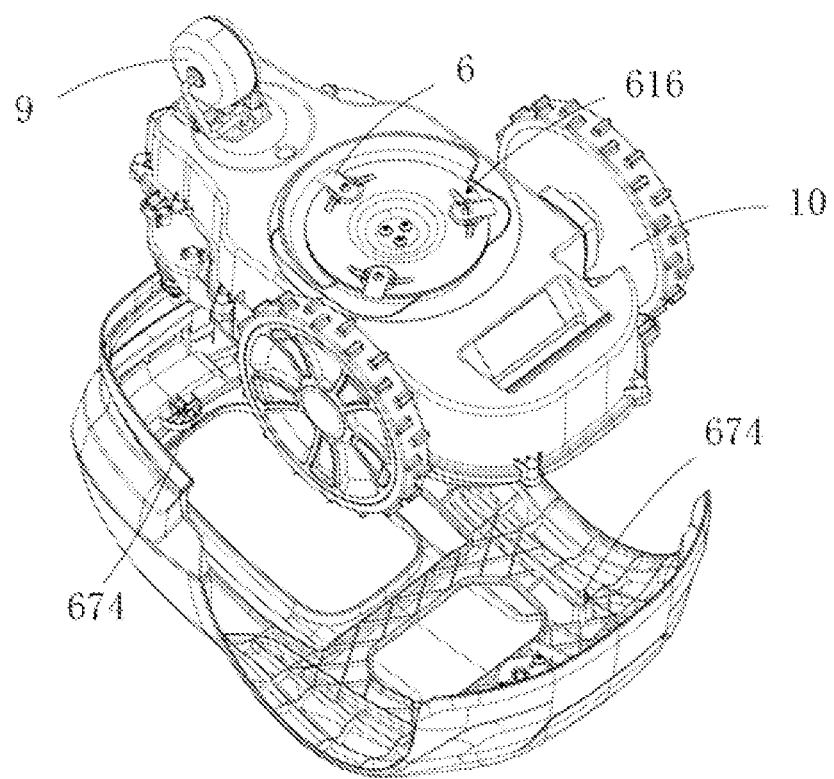
FIG. 111 is a schematic view of the mower from another viewing angle.
Figure 112:
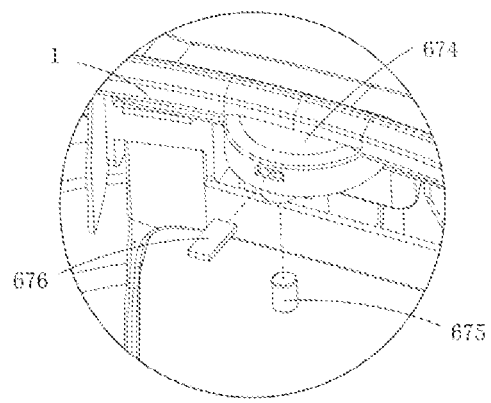
FIG. 112 is a schematic exploded view of a magnet fixing structure of the disclosure.
Figure 113:
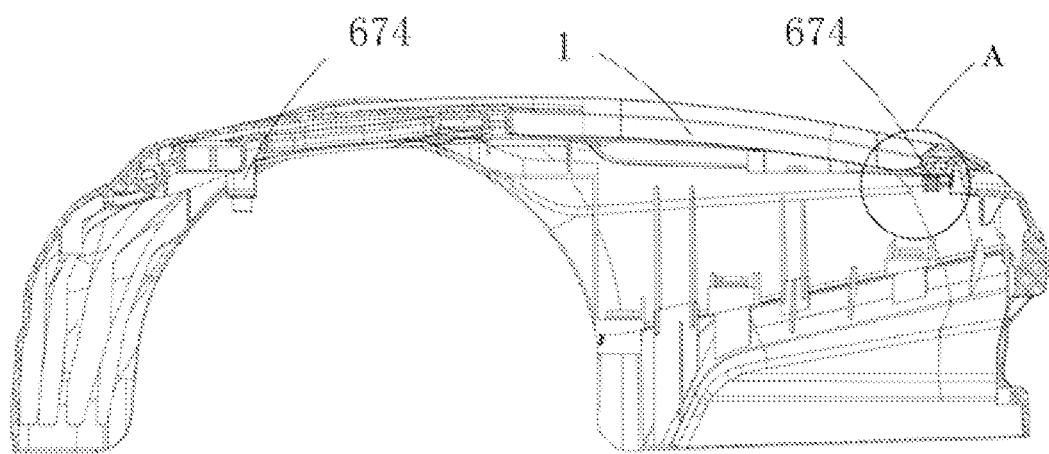
Figure 114:
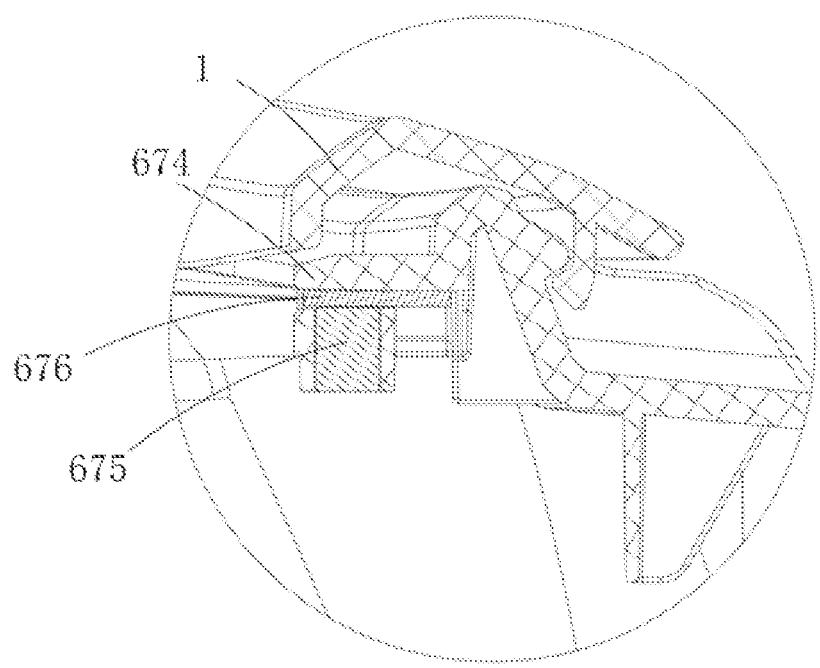

Referring to FIG. 111 through FIG. 113, in an embodiment of the disclosure, there may be two groups of collision sensors 677 respectively arranged at the front and rear ends of the mower.

Referring to FIG. 112 through FIG. 115, the magnet fixing structure 674 can include a first cavity and a second cavity. The first cavity extends in the vertical direction, the first cavity is cylindrical, and the second cavity extends in the horizontal direction and is arranged above the first cavity. The first cavity is provided with the columnar magnet 675, and the second cavity is provided with a metal sheet 676 for the magnet 675 to pull, so as to fix the magnet 675 in the first cavity. When the mower encounters obstacles or collisions with other objects, the magnet fixing structure 674 may vibrate, so that the magnet 675 is displaced in the first cavity. In this case, based on the Hall effect, the Hall sensor 678 may generate a corresponding Hall voltage to determine that the mower encountered a collision. In other embodiments of the disclosure, the first cavity may have other regular shapes, and the magnet 675 is correspondingly set in the first cavity to have a corresponding shape including but not limited to a cube and other shapes, without being limited herein.

As illustrated in FIG. 115, the first cavity is provided with a hole with an opening facing downward, and the hole is used for fixing the magnet 675 to pull toward the metal sheet 676, particularly pulling into contact with the metal sheet 676 arranged in the second cavity above the first cavity. In one embodiment, the hole is circular in shape, and a diameter of the hole is larger than a diameter of the magnet 675, so that the magnet 675 and the metal sheet 676 can be magnetically connected. When the magnet 675 needs to be repaired, the metal sheet 676 in the second cavity can be taken out, the magnet 675 can be removed from the hole. In other embodiments of the disclosure, the hole may also be formed on a side surface of the first cavity, and the magnet 675 may be correspondingly inserted through the hole on the sidewall of the first cavity. In order to prevent accidental detaching of the magnet 675 from the first cavity, the magnet 675 can be enclosed in the first cavity, without being limited herein.

As shown in FIG. 115, the magnet 675 is a permanent magnet, so that the magnet 675 can be pulled toward the metal sheet 676. In another embodiment of the disclosure, the magnet 675 may be an electromagnet or an electro-permanent magnet. When the magnet 675 is the electromagnet, a blocking structure (not shown) is correspondingly provided at the hole at the lower end of the first cavity, so as to prevent the electromagnet from being disengaged after the mower is powered off. When the magnet 675 is the electro-permanent magnet, the magnet 675 can also be constantly pulled toward the metal sheet 676. Meanwhile, a magnetic field of the electro-permanent magnet can be controlled by adjusting the current magnitude.

As illustrated in FIG. 115, a spacing/distance between the magnet fixing structure 674 and the Hall sensor 678 in the vertical direction may be less than 10 mm. That is, a vertical distance between the magnet fixing structure 674 and the Hall sensor 678 may be less than 10 mm. For example, the distance between the magnet fixing structure 674 and the Hall sensor 678 in the vertical direction can be 1 mm, 5 mm, or 9 mm. The distance can also be adjusted according to specific conditions. For example, when the magnet 675 includes a large magnetism, the distance can be increased accordingly; when the magnetism of the magnet 675 is relatively small, the distance can be reduced accordingly to ensure detection accuracy.

Referring to FIG. 111 through FIG. 115, a diameter of the first cavity is larger than a diameter of the magnet 675, so that the magnet 675 can be displaced in the first cavity. The diameter of the first cavity should not be set excessively large, so as to prevent the magnet 675 from deviating from an upright position after displacement, which may cause a decrease in detection accuracy and prevent the magnet 675 from shaking or even falling off when encountering accidentally violent collision. In the illustrated embodiment, the first cavity may also be provided with a reset structure (not shown) for resetting the magnet 675 after displacement, and the reset structure can include, without limitation, a spring, and can be set according to actual needs without being limited herein.

Referring to FIG. 111 through FIG. 115, the first cavity and the second cavity are connected with each other. Correspondingly, the magnet 675 is magnetically connected to the metal sheet 676. In the illustrated embodiment, the metal sheet 676 may be fixedly arranged in the second cavity. In this case, the magnet 675 will be relatively displaced with the metal sheet 676 after the mower collides. The metal sheet 676 can also be movably arranged in the second cavity instead. In this case, the second cavity is correspondingly provided with a limiting structure to prevent the metal sheet 676 from being separated. The magnet 675 would bring the metal sheet 676 to move synchronously after the mower collides. In another embodiment of the disclosure, the first cavity and the second cavity are not connected with each other, and correspondingly, the magnet 675 is magnetically attracted to the metal sheet 676 but is not directly contacted with the metal sheet 676. After the mower collides, the magnet 675 moves closer to the bottom surface of the second cavity along the first cavity.

As illustrated in FIG. 111 through FIG. 115, the collision sensor 677 may further include a magnetic reed switch (not shown) for detecting a relative movement of the casing 1 and the mower body in the vertical direction. That is, when the magnet 675 moves in the vertical direction, it controls the reed switch to be on or off, which may control the cutting assembly and walking assembly 8 of the mower to stop working in the case of the casing 1 being disassembled or accidental damage occurred, thereby preventing injury, etc. In other embodiments, the reed switch can include other forms such as a relay or an inductive sensor, without being limited herein. The magnet fixing structure 674 provided by the disclosure is convenient to install and disassemble, which may reduce the production cost.

Figure 116:
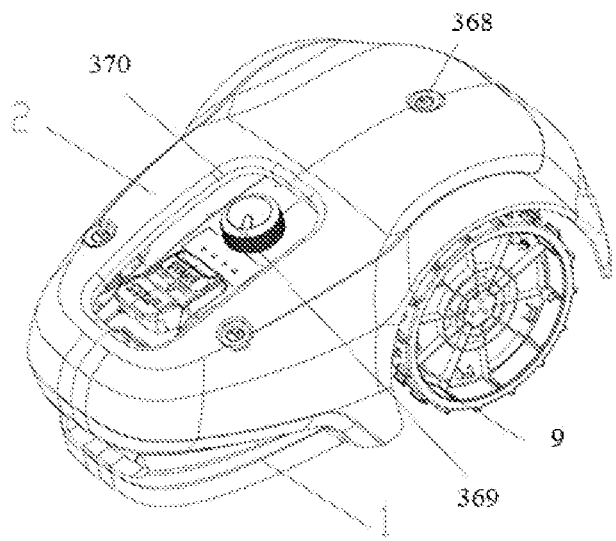

Referring to FIG. 116, in an embodiment of the disclosure, an automatic working device is provided. The automatic working device may be an intelligent/smart/robotic mower, a vacuum cleaner, etc. In the illustrated embodiment, the intelligent mower is taken as an example for description. The intelligent mower can include, without limitation, a housing 1 and a movable upper cover 2. A walking wheel 9 is installed on the housing 1, a control circuit is installed inside the housing 1, and a manipulation area 369 is provided on the top of the housing 1. The movable upper cover 2 is installed above the casing 1. The movable upper cover 2 can include an outer contour larger than that of the housing 1, and an opening 20 is provided to expose the manipulation area 369 and convenient for consumers to control the intelligent mower.

Further, a collision detector is provided between the movable upper cover 2 and the housing 1, such as a displacement sensor having a Hall sensor and a magnet. When a collision occurs causing a relative displacement between the movable upper cover 2 and the housing 1, a change of relative position between the magnet and the Hall sensor brings about a change of magnetic field. The Hall sensor may sense the change of magnetic field and output a signal to the control circuit, which may control the intelligent mower to change its moving direction and avoid collisions.

In an embodiment of the disclosure, a connection device is further provided. In an illustrated embodiment, multiple manipulation areas 368 are movably connected between the movable upper cover 2 and the housing 1 of the intelligent mower, so as to allow the movable upper cover 2 to be displaced relative to the housing 1. As an embodiment of the disclosure, there may be three manipulation areas 368, two of them are located at the rear of the intelligent mower, and the other one is located at the front of the intelligent mower. The manipulation areas 368 of the disclosure greatly facilitates the removal the upper cover and avoids the problem of the upper cover easily falling off.

Figure 117:
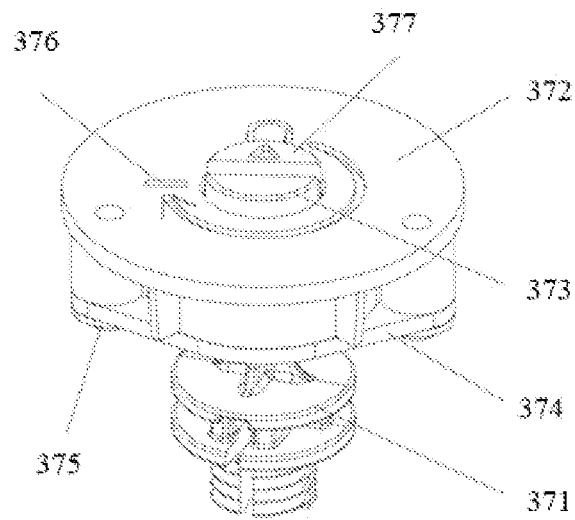

Referring to FIG. 117, the manipulation area 368 of the disclosure can include a connecting rod 371 and a connecting base. The connecting rod 371 is fixed on the housing 1, and the connecting base is fixed on the movable upper cover 2. The connecting rod 371 can include a connecting head 378. The connecting head 378 is movably arranged inside the connecting base so that the housing 1 and the movable upper cover 2 are movably connected. The connecting base can include a mounting base 372, a locking member 373, and a bottom plate 374. The bottom plate 374 is located on the bottom side of the mounting base 372, and the locking member 373 is located between the mounting base 372 and the bottom plate 374.

Figure 118:
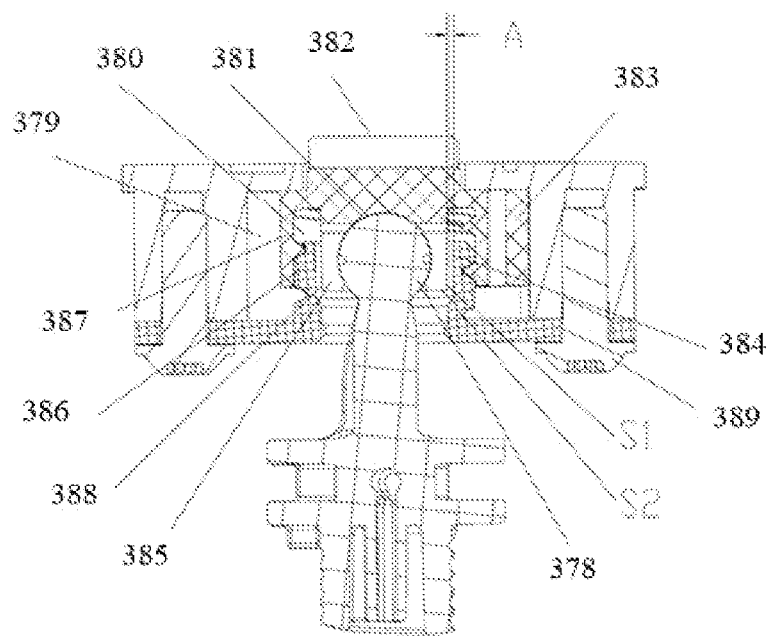
Figure 119:
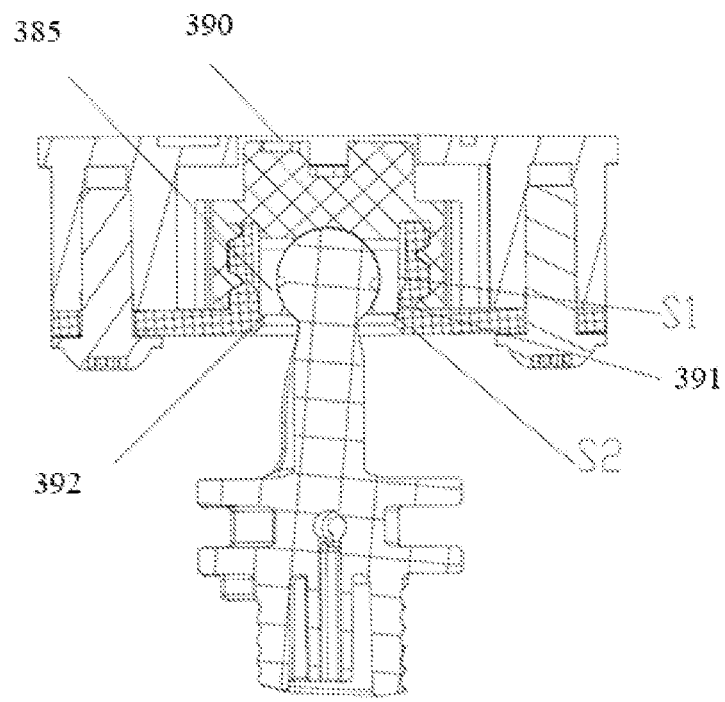

As illustrated in FIG. 118 and FIG. 119, the mounting base 372 is provided with a cavity 379, the locking member 373 is contained in the cavity 379 and the top thereof is exposed for operation by the operator. The locking member 373 is provided with an annular cavity 380, and an inner wall of the annular cavity 380 is provided with an internal thread 404. The locking member 373 is further provided with a recessed cavity 381 located in the annular cavity 380. The recessed cavity 381 is formed by multiple elastic connecting walls 385. Each of the elastic connecting walls 385 may have a certain elasticity and can be deformed appropriately to allow the connecting head 378 in the recessed cavity 381 to be detached from the recessed cavity 381. The connecting head 378 may be spherical, and the recessed cavity 381 may be a spherical recessed cavity.

As illustrated in FIG. 117 and FIG. 118, the bottom plate 374 is fixed on the mounting base 372 and the bottom plate 374 is provided with a protruding post 386. An outer side of the protruding post 386 is provided with an external thread 405, which can be threadedly connected with the internal thread 404 of the annular cavity 380. The protruding post 386 is a hollow structure, and the inner of the protruding post 386 has an adjustment cavity 388 that penetrates up and down. The locking member 373 and the bottom plate 374 are assembled from the bottom side of the mounting base 372. In particular, the locking member 373 and the bottom plate 374 may first be screwed together, and then assembled together on the mounting base 372.

After assembled, the annular cavity 380 of the locking member 373 is located in the cavity 379, the protruding post 386 of the bottom plate 374 extends into the annular cavity 380, the external thread 405 matches with the internal thread 404 of the annular cavity 380, and the recessed cavity 381 of the locking member 373 is located inside the adjustment cavity 388 of the protruding post 386. The connecting head 378 of the connecting rod 371 passes through the bottom plate 374 and is movably received in the recessed cavity 381.

As shown in FIG. 117 and FIG. 118, the bottom plate 374 is locked onto the bottom side of the mounting base 372 by screws 375, and its position remains unchanged relative to the mounting base 372. The threaded connection between the locking member 373 and the bottom plate 374 enables the locking member 373 to rotate and move up and down, which in turn drives the elastic connecting walls 385 to move up and down in the adjustment cavity 388. The adjustment cavity 388 may be substantially cylindrical with a stepped inner wall and a diameter of the adjustment cavity 388 near the bottom is smaller.

Figure 122:
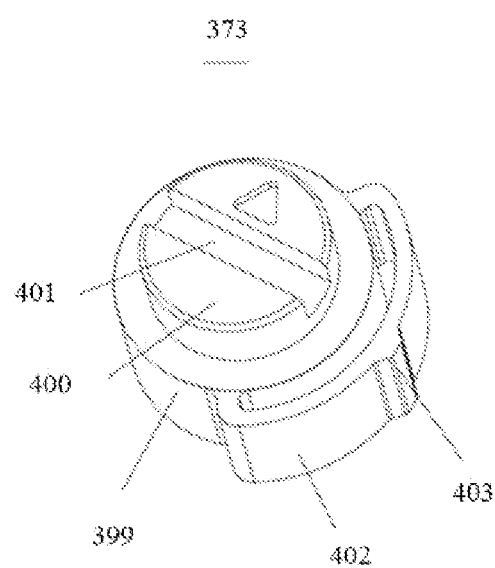

As shown in FIG. 122, when the elastic connecting walls 385 are located at a high place, there is a gap A between the inner wall surface of the adjustment cavity 388 and the outer side surface S1 of the elastic connecting walls 385. The gap A allows the elastic connecting walls 385 to deform outwards. In this case, the connecting head 378 may be detached from the recessed cavity 381 and separated from the movable upper cover 2, so that the movable upper cover 2 and the casing 1 can be separated. When the elastic connecting walls 385 are located at a low position, the inner wall surface of the adjustment cavity 388 restricts an outward deformation of the elastic connecting walls 385, thereby restricting the connecting head 378 in the cavity 381 and keeping the movable upper cover 2 connected to the housing 1.

Referring to FIG. 118 and FIG. 119, the above restriction can be that the inner wall surface of the adjustment cavity 388 touches against the elastic connecting walls 385, or the inner wall surface of the adjustment cavity 388 is very close to the elastic connecting walls 385. Although the elastic connecting walls 385 can be slightly expanded and deformed, the degree of deformation is insufficient to make the connecting head 378 being detached from the recessed cavity 381.

As shown in FIG. 118 and FIG. 119, the locking member 373 can include a releasing position and a locking position. When the locking member 373 is located at the releasing position, the elastic connecting walls 385 can expand and deform outward, allowing the connecting head 378 to be detached from the recessed cavity 381, and the connecting base and the connecting rod 371 to be separated from each other. When the locking member 373 is in the locking position, the elastic connecting walls 385 are restricted by the inner wall surface of the adjustment cavity 388 and cannot expand outwards and deform enough, so that the connecting head 378 is restricted in the recessed cavity 381, and the connecting base and the connecting rod 371 are connected with each other. Therefore, the releasing position and the locking position of the locking member 373 can meet different usage requirements of the manipulation area 368.

As illustrated in FIG. 118, when the intelligent mower with the manipulation area 368 is in normal use, the locking member 373 is in the locking position. Since the connecting head 378 is restricted in the recessed cavity 381, even if the movable upper cover 2 is lifted during carrying of the intelligent mower, it will not cause a separation of the upper cover 2 from the housing 1. When an operator needs to remove the movable upper cover 2 for cleaning or maintenance, the locking member 373 can be rotated to the releasing position, and the movable upper cover 2 can be lifted up and easily removed. After the cleaning or maintenance, the operator can place the movable upper cover 2 on the housing 1, insert the connecting head 378 into the recessed cavity 381, then turn the locking member 373 from the releasing position to the locking position, and the intelligent mower can continue its normal work.

As shown in FIG. 117 and FIG. 118, the bottom plate 374 cannot move up and down, and the locking member 373 can move up and down when rotating. As a simple alternative, the locking member 373 can be set to not-able-to move up and down, the bottom plate 374 can be driven to move up and down when rotates the locking member 373, and other structures can remain unchanged. When the locking member 373 is in the releasing position, the bottom plate 374 is at a high position, and the connecting head 378 can escape from the recessed cavity 381. When the locking member 373 is in the locking position, the bottom plate 374 is at a low position, and the connecting head 378 is confined in the recessed cavity 381.

As illustrated in FIG. 117 and FIG. 118, when the locking member 373 is in the releasing position, the existence of the gap A between the inner wall surface of the adjustment cavity 388 and the outer side surface S1 of the elastic connecting walls 385 enables the elastic connecting walls 385 to expand outwards. As a simple alternative, the gap A may not exist, that is, when the locking member 373 is in the releasing position, the elastic connecting walls 385 are located outside the adjustment cavity 388, so that the elastic connecting walls 385 can expand outwards without restriction. The above embodiment can be utilized especially when the threaded connection between the locking member 373 and the bottom plate 374 can produce sufficient up and down displacement.

Referring to FIG. 117 and FIG. 120 through FIG. 125, in which specific structures of the mounting base 372, the bottom plate 374 and the locking member 373 are described in detail. The bottom plate 374 is fixed relative to the mounting base 372. The bottom plate 374 and the mounting seat 372 may be assembled together. Alternatively, the bottom plate 374 can be manufactured integrally with the mounting base 372 or riveted together after being manufactured separately. The locking member 373 is movably arranged relative to the mounting base 372, meaning the locking member 373 can rotate, or move up and down. The following description takes the bottom plate 374 and the mounting seat 372 set separately as an example.

Figure 120:
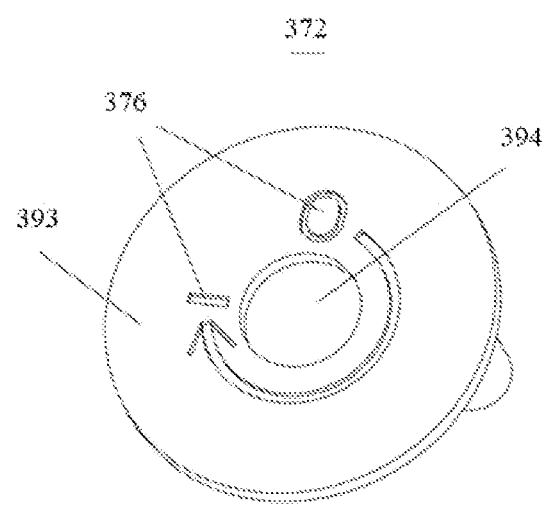
Figure 121:
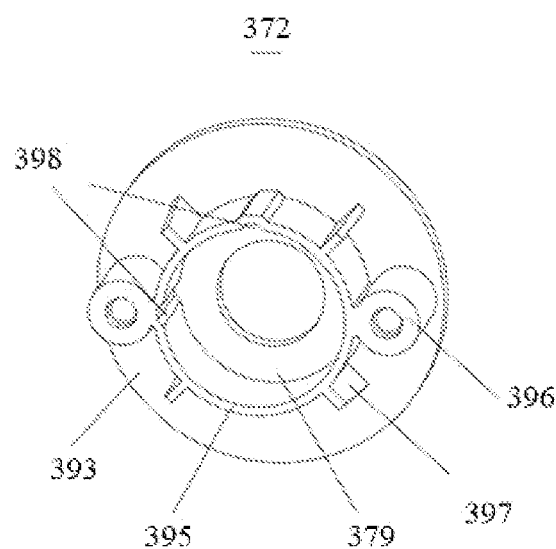

FIG. 120 and FIG. 121 are schematic perspective views of the mounting base 372. The mounting base 372 can include a top wall 393 and an annular side wall 395 extending downward from the middle of the top wall 393. The annular side wall 395 and the top wall 393 together form the aforementioned cavity 379. The bottom plate 374 is installed on the bottom surface of the annular side wall 395, and the locking member 373 is accommodated in the cavity 379. The top wall 393 is substantially circular, and a through hole 394 is provided at the center of the top wall 393 for the locking member 373 to be partially exposed. The lower side of the top wall 393 is provided with a pair of mounting posts 396, which are respectively located at opposite ends of the cavity 379 for fixing screws 375 and mounting the bottom plate 374 to the bottom surface of the mounting base 372. The annular side wall 395 is provided with several protruding ribs 397 connected to the top wall 393, the protruding ribs 397 can strengthen the strength of the annular side wall 395.

Figure 123:
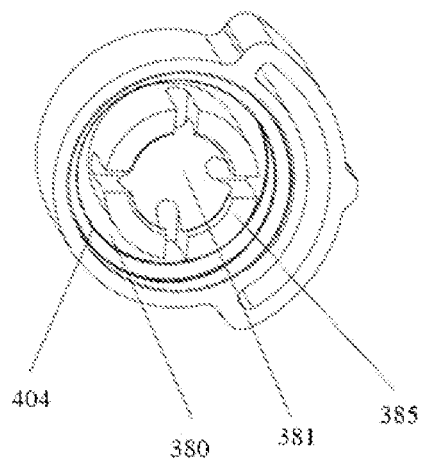

FIG. 122 and FIG. 123 are schematic perspective views of the locking member 373. The locking member 373 can include a column 399 and an operating part 400 on the top of the column 399. The column 399 is approximately cylindrical with an open bottom. The operating part 400 is also cylindrical and located at the center of the top surface of the column 399. A diameter of the operating part 400 is smaller than a diameter of the column 399.

Figure 124:
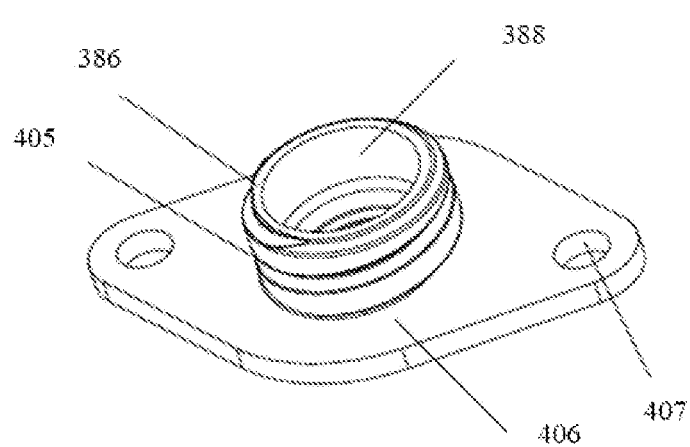

In combination with the illustration of FIG. 124, a diameter of the through hole 394 of the top wall 393 of the mounting base 372 is larger than the diameter of the operating part 400, but smaller than the diameter of the column 399, so that the operating part 400 can protrude into the through hole 394 and expose at outside of the mounting base 372. The movable upper cover 2 is provided with a hole (not labeled) to expose the operating part 400 for consumers to operate. The column 399 is always restricted below the through hole 394. The top of the operating part 400 is provided with a groove 401, and when the operator needs to turn the locking member 373, a screwdriver or other tool can be used to snap into the groove 401 to drive the locking member 373.

Referring to FIG. 122 and FIG. 123, the annular cavity 380 with the internal thread 404 is formed in the column 399. The column 399 is also provided with the elastic connecting walls 385 and the recessed cavity 381 formed by the elastic connecting walls 385. A center line of the recessed cavity 381 overlaps with a center line of the operation part 400, and when the operation part 400 is rotated, the recessed cavity 381 will not move eccentrically. In the illustrated embodiment, there may be four elastic connecting walls 385, with the adjacent ones of the elastic connecting walls 385 having a gap therebetween, so that the connecting walls 385 are elastic and can be deformed outwards.

Referring FIG. 121 and FIG. 122, the locking member 373 can further include a positioning member 402 beside the column 399. The positioning member 402 is roughly in the shape of an arc and surrounds the column 399, and the positioning member 402 and the column 399 form a gap. One end of the positioning member 402 is connected to the column 399, so that the positioning member 402 can include certain elasticity and can be deformed appropriately. A protrusion 403 is provided on an outer surface of the positioning member 402. In combination with the illustration of FIG. 124, the inner wall of the cavity 379 is further provided with two vertical positioning grooves 398 spaced apart.

When the locking member 373 rotates in the cavity 379, the positioning member 402 drives the protrusion 403 to rotate and thereby engage with corresponding positioning grooves 398 respectively in the releasing position and the locking position. An engaging force of the positioning grooves 398 of the positioning member 402 can prevent the locking member 373 from rotating and shifting by itself when the consumer is not operating. Meanwhile, it is convenient for consumers to obtain a clear response whether the locking member 373 is turned into proper position during operation.

As illustrated in FIG. 122, a top surface of the top wall 393 is provided with an indication mark 376 around the through hole 394, the indication mark 376 can further tell the consumer whether the locking member 373 is turned into proper position. The indication mark 376 can include "0" and "1". In combination with the illustration of FIG. 120, the top surface of the operating part 400 of the locking member 373 is provided with an arrow used together with the indication mark 376.

In the illustrated embodiment, the arrow pointing to "0" indicates that the locking member 373 is in the released position, and the arrow pointing to "1" indicates that the locking member 373 is in the locking position. In order to prevent mis-operation, a directional arrow 329 indicating a rotation direction of the locking member 373 can be arranged between "0" and "1". When the locking member 373 is rotated to "0" or "1", the protrusion 403 is engaged with the positioning groove 398. As a simple alternative, "0" and "1" can be represented by other words or graphics, such as "release" or "lock", "separation" or "connection", unlock and unlock icons, etc., without being limited herein.

FIG. 124 is a schematic perspective view of the bottom plate 374. The bottom plate 374 is provided with a bottom wall 406 and the protruding post 386 extending upward from the middle of the bottom wall 406. The bottom wall 406 is substantially diamond-shaped, and two opposite corners are provided with mounting holes 407. The screws 375 pass through the mounting holes 407 respectively and are fixed to the mounting posts 396 of the mounting base 372 to fix the bottom plate 374 to the mounting base 372.

FIG. 125 is a schematic cross-sectional view of the bottom plate 374. The inner side wall of the adjustment cavity 388 is provided with a step, so that different height positions of the adjustment cavity 388 have different inner diameters. The inner wall of the adjustment cavity 388 is divided into an upper inner wall 384 and a lower inner wall 391 by the step. The step is located between the upper inner wall 384 and the upper inner wall 384 and the step is provided with a chamfer.

Referring to FIG. 123 through FIG. 125, outer surfaces of the elastic connecting walls 385 are located on one circle, and a diameter of the circle is defined as an outer diameter of the elastic connecting walls 385. The inner diameter of the upper inner wall 384 is greater than the outer diameter of the elastic connecting walls 385, and the inner diameter of the lower inner wall 391 is equal to the outer diameter of the elastic connecting walls 385. It is noted that the term "equal to" herein means substantially equal, that is, the difference in size between the inner diameter of the lower inner wall 391 and the outer diameter of the elastic connecting walls 385 is not enough to allow the elastic connecting walls 385 to deform enough so that the connecting head 378 can escape from the recessed cavity 381.

Therefore, when the elastic connecting walls 385 are aligned with the upper inner wall 384 but staggered up and down with the lower inner wall 391, the elastic connecting walls 385 can be deformed outwards, which is corresponding to the releasing position of the locking member 373. When the elastic connecting walls 385 are at least partially aligned with the lower inner wall 391, the elastic connecting walls 385 are restricted from deforming outwards, which is corresponding to the locking position of the locking member 373.

As shown in FIG. 125, the adjustment cavity 388 is further provided with another ring-shaped stopping step 392 below the lower inner wall 391. An inner diameter of the stopping step 392 is smaller than the outer diameter of the elastic connecting walls 385. When the locking member 373 is in the locking position, that is, when the elastic connecting walls 385 are at a low position, bottom surfaces S2 of the elastic connecting walls 385 may touch against the stopping step 392, and the stopping step 392 provides a stopping function.

Returning to FIG. 117, when the movable upper cover 2 is mounted on the mower body 1, the operating portion 400 of the locking member 373 is located in the through hole 394 of the mounting base 372, and the arrow on the operating portion 400 points to "0" of the mounting base 372. In this case, the locking member 373 is in the releasing position. As shown in FIG. 122, the connecting head 378 can be easily inserted into the recessed cavity 381 formed by the elastic connecting walls 385, and the manipulation area 368 is movably connected to the mower body 1 and the movable upper cover 2. Afterwards, the operating portion 400 is rotated by a tool to rotate the locking member 373 until the arrow on the operating portion 400 points to "1", which indicates that the rotation is in place. The locking member 373 moves downwardly to the locking position while rotating, as shown in FIG. 123, the connecting head 378 is held in the recessed cavity 381, which can prevent the movable upper cover 2 from being easily separated from the mower body 1.

As illustrated in FIG. 116 through FIG. 118, when the intelligent mower is in normal use, the locking member 373 is always in the locking position to prevent the movable upper cover 2 from being separated from the mower body 1. When the movable upper cover 2 needs to be removed for cleaning or maintenance, the locking member 373 is rotated in a reverse direction, which makes it moves from the locking position to the releasing position, the connecting head 378 can be easily separated from the recessed cavity 381, and then the movable upper cover 2 can be removed simply and conveniently.

Please refer to FIG. 126 through FIG. 129, according to an embodiment of the disclosure, a switch 316 can include a casing 1 and a pressing device disposed above the casing 1. A magnet 319 is provided on the pressing device, and a reed switch 320 that senses a magnetic field of the magnet 319 is provided in the casing 1. The switch 316 is further provided with a fixing portion 322 fixed on the upper side of the casing 1. The pressing device is pivotally connected to the top of the fixing portion 322 via a pivot shaft 321 and can rotate above the casing 1 with the pivot shaft 321 as a center. The fixing portion 322 connects the casing 1 and the pressing device, and the fixing portion 322 may be separately provided and fixed to the casing 1, or it may be integrally formed with the casing 1. Positions of the reed switch 320 and the magnet 319 correspond to each other. A direction in which the magnet 319 and the reed switch 320 are oppositely arranged is defined as a first direction. When the pressing device is moved/triggered, a distance between the magnet 319 and the reed switch 320 in the first direction can be changed so as to switch on/off the reed switch 320.

Please refer to FIG. 127, in combination with the illustration of FIG. 129, the pressing device can include a main body portion 323. The main body portion 323 is substantially in the shape of a horizontal plate. A middle portion of the main body portion 323 is extended to form a connecting portion 325. The connecting portion 325 is connected with a pivot shaft 321, and is used for rotatably fixing the pressing device to the fixing portion 322. The pressing device can further include a protruding portion 324 protruding from the main body portion 323 toward the reed switch 320. One end of the protruding portion 324 close to the reed switch 320 can include a receiving groove (not labelled). The receiving groove can include an opening toward the reed switch 320 and is used for receiving the magnet 319. The magnet 319 is fixed in the receiving groove which allows a side of the magnet 319 facing toward the reed switch 320 to be exposed.

As illustrated in FIG. 127, the main body portion 323 can include a first pressing part 332 and a second pressing part 333. For the convenience of description, from the FIG. 112's viewing perspective, two sides of the connecting portion 325 are defined as right side and left side respectively. The magnet 319 and the reed switch 320 are located on the right side, the first pressing part 332 is located on the left side, and the second pressing part 333 is located on the right side. The protruding portion 324 protrudes from an end of the second pressing part 333 toward the reed switch 320. The first pressing part 332 is located away from the magnet 319. By pressing the second pressing part 333, which would cause the main body portion 323 to rotate clockwise around the pivot shaft 321 and thereby reduce a distance between the magnet 319 and the reed switch 320, the reed switch 320 can sense a magnetic field of the magnet 319. In this case, two pieces of magnetic reeds of the reed switch 320 are contacted with each other, the reed switch 320 is in a switched-on state. By pressing the first pressing part 332, which would cause the main body portion 323 to rotate counterclockwise around the pivot shaft 321 and thereby increase the distance between the magnet 319 and the reed switch 320, the reed switch 320 cannot sense the magnetic field of the magnet 319. In this case, the two pieces of magnetic reeds of the reed switch 320 will return to an original non-contact state, and the reed switch 320 is switched off.

Referring to FIG. 127, the pressing device can further include a first abutting part 330 extending downwards from an end of the first pressing part 332 and a second abutting part 331 extending downwards from an end of the second pressing part 333. The casing 1 is provided with a first mating surface 327 for being touched against the first abutting part 330 and a second mating surface 329 for being touched against the second abutting part 331. The first mating surface 327 and the second mating surface 329 are used to limit rotation ranges of the first pressing part 332 and the second abutting part 331.

As shown in FIG. 127, the pressing device can further include an abutting part 334 protruding downwards from a portion of the first pressing part 332 near the connecting portion 325. In particular, the abutting part 334 protrudes downwards from the bottom side of the main body portion 323. The abutting part 334 can include an arc-shaped abutting surface, and the fixing portion 322 also can include an arc-shaped contact surface, so as to facilitate the abutting part 334 and the fixing portion 322 to touch against each other and thereby limit a rotation range of the pressing device.

As illustrated in FIG. 127, the pressing device can further include a first switch cap 326 and a second switch cap 328 respectively provided on upper surfaces of the first pressing part 332 and the second pressing part 333. In the illustrated embodiment, the first switch cap 326 and the main body portion 323 are detachably connected, and the second switch cap 328 and the main body portion 323 are also detachably connected. In other embodiments, the first switch cap 326, the second switch cap 328, and the main body 323 may be integrally constructed to form a one-piece structure.

As shown in FIG. 127, the switch 316 is installed on the mower. The mower can include a start-stop switch and a main switch. The start-stop switch may be the switch 316, the main switch may be the switch 316, or both the start-stop switch and the main switch are switches 316. In the illustrated embodiment, the mower is a robotic lawn mower.

As illustrated in FIG. 127, a working process of the switch 316 will be described below. When pressing the first switch cap 326, the main body portion 323 rotates counterclockwise around the pivot shaft 321, the magnet 319 is moved far away from the reed switch 320. Sine the reed switch 320 cannot senses the magnetic field of the magnet 319, the two pieces of magnetic reeds of the reed switch 320 return to the original non-contact state, the reed switch 320 is at the switched-off state, the switch 316 is turned off, and the mower stops working. Whereas, when pressing the second switch cap 328, the main body portion 323 rotates clockwise around the pivot shaft 321, the magnet 319 moves toward the reed switch 320, the reed switch 320 can sense the magnetic field of the magnet 319, the two pieces of magnetic reeds of the reed switch 320 are contacted with each other, the reed switch 320 is at a switched-on state, the switch 316 is turned on, and the mower can resume working.

As shown in FIG. 127, taking the robotic mower as an example, the switch 316 can be installed as an independent component on other garden tools or other control objects, especially as a control switch for products that require waterproofing. The solutions that are the same as or similar to the illustrated embodiment are all covered by the protection scope of the disclosure.

Therefore, regarding the switch 316 of the disclosure, the reed switch 320 is arranged inside the casing 1, and the magnet 319 is arranged outside the casing 1, so that the distance between the magnet 319 and the reed switch 320 can be controlled to control on-off states of the reed switch 320, which may in turn control the turned-on and turned-off states of the switch 316. This arrangement not only does not require an opening on the casing 1, but also reduces the risk of water ingress to the switch and prolongs the service life of the switch. In addition, the reed switch 320 is controlled by a magnetic field and does not require an external power supply, which saves electrical energy. The lawn mower with the switch 316 can provide a stable working state and a long battery life.

Referring to FIG. 130 through 134, a charging station system can include a charging station 335 and a ceiling 336. The charging station 335 can include a bottom plate 338 laid on the ground and a docking pile 339 on a side of the bottom plate 338. The docking pile 339 is provided with a protruding charging seat 340. The charging seat 340 is matched with the intelligent mower and used for charging the battery pack in the intelligent mower. The ceiling 336 can include a connecting base 337 detachably assembled on the docking pile 339 of the charging station 335 and a cover 342 pivotally connected to the connecting base 337. A projection of the ceiling 336 on the ground roughly covers the bottom plate 338, which effectively shields and protects the intelligent mower, including sun shading, rain sheltering, and avoiding external collisions. The ceiling 336 of the charging station system of the disclosure is detachably fixed, and when repairs are needed, the ceiling 336 can be removed first and then repair is made, which makes the operation more convenient.

In combination with the illustration of FIG. 132 and FIG. 133, the connecting base 337 can include a connecting portion 350 snapped on the periphery of the docking pile 339 of the charging station 335 and a supporting portion 351 extending laterally from the connecting portion 350. The supporting portion 351 extends laterally from the top end of the connecting portion 350 toward the bottom plate 338 and is used to stably support the cover 342 assembled on the connecting base 337. A cross section of the connecting portion 350 is roughly U-shaped and is arranged around the rear surface and opposite side surfaces of the docking pile 339.

Moreover, the connecting portion 350 covers the top of the docking pile 339. The bottom of the connecting portion 350 is detachably mounted to the side surfaces of the docking pile 339 by screws (not shown). The supporting portion 351 is provided with a storage space 352 with an opening upward, which is used for accommodating maintenance tools such as handles, screwdrivers, screws for repairing the ceiling 336 or the charging station 335. The connecting base 337 can further include multiple protruding ribs 353 arranged in the storage space 352. The protruding ribs 353 divide the storage space 352 into multiple areas, so that users can place tools of different types or sizes in different areas.

As shown in FIG. 132, the cover 342 is arranged roughly in the shape of a lid, which can include a top wall 356 and a side wall 357 extending downwards from the circumference of the top wall 356. The cover 342 can be used for shading sun and sheltering rain when the intelligent mower is parked at the charging station 335 for charging. The cover 342 can also include a protruding portion 343 bulging upwards and a groove 363 corresponding to the protruding portion 343. The protruding portion 343 is formed by a portion of the top wall 356 of the cover 342 corresponding to the storage space 352 of the connecting base 337 bulging upwards. The groove 363 is correspondingly disposed below the protruding portion 343 and directly above the storage space 352 of the connecting base 337. The protruding portion 343 can reinforce the strength of the cover 342, and the groove 363 can increase the volume of the storage space 352.

As shown in FIG. 132, the cover 342 can further include a transparent observation window 344 buckled on the top wall 356. The observation window 344 is set at a position of the top wall 356 in front of the protruding portion 343 to allow the user to observe a charging state of the intelligent lawn mower at the charging station 335. The observation window 344 can include a lid-shaped main body 360 and a snapping portion 441 extending downwardly from the periphery of the main body 360. The top wall 356 of the cover 342 can include a through hole 358 at a position corresponding to the observation window 344. A side wall of the through hole 358 is provided with a fitting groove 401 that cooperates with the snapping portion 441 of the observation window 344. In the illustrated embodiment, the observation window 344 is made of a transparent material and is fitted into the through hole 358 of the cover 342. The observation window 344 is substantially rectangular and located at the front of the protruding portion 343 and further staggered from the supporting portion 351. A size of the observation window 344 should be larger than a display area on the intelligent mower to facilitate observation.

Referring to FIG. 133 and FIG. 134, the cover 342 is pivotally assembled on the supporting portion 351, and can be opened or closed relative to the connecting base 337. In order to prevent the user from accidentally opening the cover 342, the ceiling 336 can further include a resilient buckle 345 for movably buckling the cover 342 onto the connecting base 337. The buckle 345 can be fixed to one of the connecting base 337 and the cover 342, and can be connected with the other resilient buckle. The setting of the buckle 345 requires the user to apply a certain external force to open the cover 342, which can prevent the cover 342 from being blown over when the wind is strong, and can also improve the user's operating feel. The buckle feeling can help the user to determine whether the cover 342 is in place.

As shown in FIG. 132 and FIG. 133, the buckle 345 is an inverted U-shaped metal resilient piece, which can include a fixing piece 346 fixed to the cover 342 by a screw 348 and two buckle arms 347 extending downwards from opposite ends of the fixing piece 346 respectively. The fixing piece 346 is fixed to a screw post 367 on the bottom surface of the cover 342 by the screw 348. The fixing piece 346 is assembled on the bottom of the protruding portion 343 of the cover 342. The fixing piece 346 is located at an end of the protruding portion 343 of the cover 342 close to the observation window 344. The supporting portion 351 of the connecting base 337 is provided with a buckling portion 354 protruding forward at an end away from the connecting portion 350. The buckling portion 354 can be matched with the buckling arms 347 of the buckle 345, to buckle the cover on the connecting base 337.

When the cover 342 is laid on the supporting portion 351, the buckling portion 354 of the supporting portion 351 of the connecting base 337 is accommodated in a space formed by the buckling arms 347 of the buckle 345. When the user needs to open the storage space 352, he/she needs to overcome a buckling force of the buckle 345, and then lift the cover 342 upwards. Referring to FIG. 134, which shows a state in which the cover 342 is opened, the buckle 345 is retained on the buckling portion 354, and the matching manner of the buckle 345 and the buckling portion 354 is clearly illustrated.

Referring to FIG. 131 through FIG. 133, an engagement between the cover 342 and the connecting base 337 will be described below. A rear edge of the cover 342 is provided with a notch 362 and two pivot ports 365 located on opposite sides of the notch 362. The pivot portions 365 protrude downwards from the cover 342 and are provided with pivot holes 364. Two pivot shafts 349 are respectively fixed to two sides of the connecting base 337 after passing through the two pivot holes 364, so as to pivotally connect the cover 342 to the connecting base 337. As shown in FIG. 132, the pivot 349 is similar to the structure of a tack, and an end thereof is provided with an elastic buckle structure. The elastic buckle structure is inserted into a corresponding hole (not labeled) of the connecting base 337 and then buckles with an edge of the hole. The two sides of the connecting base 337 are further provided with stoppers 366 for the opened cover 342 to bear against, which can limit an opened angle of the cover 342 and prevent the cover 342 from overturning and causing inconvenience in use.

Referring to FIG. 131 through FIG. 133, the notch 362 of the cover 342 is located in an area of the aforementioned protruding portion 343, and the top of the connecting base 337 is further provided with a convex portion 355. After the connecting base 337 and the cover 342 are assembled together, the convex portion 355 is inserted into the notch 362, a top surface of the convex portion 355 and a top surface of the protruding portion 343 are coplanar, which can improve the overall appearance of the ceiling 336 and enhance the beauty of product.

As illustrated in FIG. 131 through FIG. 133, to assemble, first fix the buckle 345 to the cover 342, and then pivotally connect the cover 342 to the connecting base 337 to form the ceiling 336. The buckle 345 is fastened/buckled to the buckling portion 354 of the connecting base 337 to keep the cover 342 in a closed state, and then the assembled ceiling 336 is fixed to the charging station 335. As a result, the installation of the charging station system with the ceiling 336 is completed.

As shown in FIG. 131 through FIG. 133, the ceiling 336 can be sold separately as a spare part, and can be installed on an existing charging station after the user purchases it. If the existing charging station has been installed with a casing protecting the docking pile 339, the casing can be removed first, and then the connecting base 337 can be detachably installed on the docking pile 339, so that the ceiling 336 can be assembled to the charging station 335 to form a charging station system. The ceiling 336 of the disclosure is convenient to disassemble, easy to maintain, and can be adapted to existing charging stations, and thus has a wide range of applications and flexibility.

FIG. 135 through FIG. 137 show an embodiment of a safety switch 421 of the disclosure rotated to a first position. In this case, the safety switch 421 is in a stopped state. FIG. 138 and FIG. 139 show a state of use when the safety switch 421 is rotated to a second position. In this case, the safety switch 421 is in an activated state. Furthermore, in the disclosure, the safety switch 421 is installed on a casing 422 or a chassis of a garden tool. The garden tool can be a robotic mower or any other garden tool to which the safety switch 421 can be applied. The garden tool is driven by an engine (not shown). Specifically, the engine may be an internal combustion engine or a driving engine. Optionally, the engine in the disclosure is an electric motor.

Please refer to FIG. 135, which is a schematic exploded view of the safety switch 421 of the disclosure in the first position. The safety switch 421 is installed on the casing 422 of the garden tool. The safety switch 421 can include a first button 423 and a second button 438 arranged on the first button 423. The safety switch 421 can be used to start a power device (not shown) of the engine so as to provide power to the engine.

As illustrated in FIG. 135, the safety switch 421 can further include a pivot shaft 424 connected to the casing 422. The first button 423 is pivotally connected to the pivot shaft 424. The first button 423 can include a first part 425 and a second part 426. The first part 425 and the second part 426 are respectively provided on two sides of the pivot shaft 424, and the second button 438 is provided on the second part 426. Furthermore, the first button 423 can rotate around the pivot shaft 424 and between a first position and a second position. When a tail end of the first part 425 is close to the casing 422, the first button 423 is in the first position; and when a tail end of the second part 426 is close to the casing 422, the first button 423 is in the second position.

As shown in FIG. 135, the second button 438 can include a first sliding button 427 and a second sliding button 428. When the safety switch 421 is installed on a horizontal surface 429 of the casing 422, the second sliding button 428 is located beside the first button 423, and the first sliding button 427 is located above the second sliding button 428. Furthermore, the first sliding button 427 and the second sliding button 428 are manufactured separately and subsequently assembled together. The first sliding button 427 is provided with a protrusion 439 protruding toward the second sliding button 428 (downwardly). The second sliding button 428 is provided with a cavity 430, and the protrusion 439 is placed in the cavity 430 to connect the first sliding button 427 with the second sliding button 428. Such arrangement facilitates the assembly and disassembly of the safety switch 421.

As illustrated FIG. 135, the second button 438 is further provided with a biasing device 431. The biasing device 431 is positioned and installed on the second sliding button 428 via a guiding pin 440. Specifically, the guiding pin 440 is disposed on the second sliding button 428 and extends in a direction substantially parallel to a first upper surface 432 of the first sliding button 427. During the starting of the safety switch 421, the guiding pin 440 can be used to fix and guide the biasing device 431 to ensure that the biasing device 431 is compressed and extended without deviating from its expansion and contraction direction. In this case, the expansion and contraction direction of the biasing device 431 can be described as an axial direction of a central axis formed along a center of the biasing device 431. Furthermore, the biasing device 431 may be a coil spring or any other suitable spring device.

Referring to FIG. 135, the first button 423 can include a first snapping portion 434 and a second snapping portion 435. The first snapping portion 434 is disposed above the second snapping portion 435. The pivot shaft 424 is disposed on the second snapping portion 435. Alternately, the pivot shaft 424 may penetrate through the second snapping portion 435. The second snapping portion 435 is provided with a sliding groove 436 at an end close to the second sliding button 428. A side of the sliding groove 436 facing toward the second sliding button 428 is opened, and the sliding groove 436 is provided with a limiting surface 16 facing toward the opening. The second sliding button 428 is provided with a protrusion 20 placed in the sliding groove 436. When the safety switch 421 is switched between the stopped and activated states, the protrusion 20 can slide along the sliding groove 436. Furthermore, the biasing device 431 and the guiding pin 440 are fixedly housed in the protrusion 20. Optionally, the biasing device 431 is located in the sliding groove 436, and two ends of the biasing device 431 are pressed against the limiting surface 16 and the second sliding button 428 respectively.

As illustrated in FIG. 135, the first button 423 is provided with a second upper surface 445 extending in a longitudinal direction, and the second button 438 is slidably disposed on the second upper surface 445 along the longitudinal direction. The second button 438 is slidable in the front and rear directions toward two opposite outer boundaries of the casing 422. Furthermore, the second button 438 can further include a pressing portion 441 extending toward the casing 422. Specifically, the pressing portion 441 is disposed at an end of the second sliding button 428 facing away from the first button 423. The casing 422 can include an abutting portion 442 extending toward the safety switch 421 and the second sliding button 428 (i.e., extending upwards).

As shown in FIG. 135 and FIG. 139, the first sliding button 427 can include a first protrusion 446 and a second protrusion 447 protruding toward the casing 422. The first protrusion 446 and the second protrusion 447 are disposed on a third lower surface 448 of the first sliding button 427.

As illustrated in FIG. 135, FIG. 137 and FIG. 139, the second part 426 of the first button 423 is provided with an accommodation chamber, the first sliding button 427 of the second button 438 covers the accommodation chamber, and the protrusion 439 is inserted into the accommodation chamber to connect with the second sliding button 428. The first button 423 is provided with a first receiving portion 449 for receiving the first protrusion 446 and a second receiving portion 450 for receiving the second protrusion 447. Specifically, the first accommodating portion 449 is provided with a first wall portion 451 and a second wall portion 452 extending toward the first sliding button 427; the second accommodating portion 450 is provided with a third wall portion 453 and a fourth wall portion 454 extending toward the first sliding button 427.

The first receiving portion 449 and the second receiving portion 450 are both U-shaped. A distance between the first wall portion 451 and the second wall portion 452, and a distance between the third wall portion 453 and the fourth wall portion 454 can be used to define a moving/sliding distance of the second button 438 relative to the first button 423. Furthermore, the first receiving portion 449, the first wall portion 451, the second wall portion 452 and the first protrusion 446 are arranged in a labyrinth manner. Meanwhile, the second receiving portion 450, the third wall portion 453, the fourth wall portion 454, and the second protrusion 447 are also arranged in a labyrinth manner. Such arrangement can effectively prevent garbage and dirt from entering the interior of the second button 438 one the one hand, and can prevent garbage from entering a use area of the biasing device 431 to cause abnormal use of the second button 438 on the other hand.

Referring to FIG. 135 and FIG. 137, the first button 423 can include the first part 425 and the second part 426. The first part 425 and the second part 426 are respectively arranged on two sides of an axis in an extending direction of the pivot shaft 424. The second button 438 is arranged on the second part 426.

Please refer to FIG. 135 through FIG. 137, when the first button 423 is in the first position, the position in which the second button 438 is located shall be deemed the stopping position. When the first button 423 is in the second position, the position in which the second button 438 is located shall be deemed the starting/activated position. When the first button 423 is in the first position, a rotation of the first button 423 is restricted and cannot be rotated toward the second position. In this case, the first part 425 of the first button 423 is close to the casing 422, and the end 443 of the pressing portion 441 touches against the abutting portion 442 on the casing 422. In the disclosure, the second button 438 is slidably connected to the second part 426, the second button 438 can slide along the second upper surface 445 of the second part 426, so that the second button 438 can be slidably switched between the stopping position and the starting position. Furthermore, when the second button 438 is switched to the stopping position, the engine is in a power-off state; whereas, when the second button 438 is switched to the starting position, the engine is in the energized state.

Please refer to FIG. 138 and FIG. 139, in which schematic diagrams of the first button 423 being rotated to the second position are disclosed. When the first button 423 rotates around the pivot shaft 424 to the second position, an extending direction of the second upper surface 445 located in a projection area of the safety switch 421 is substantially parallel to an extending direction of the casing 422. The end 443 of the pressing portion 441 touches against the casing 422. In this case, the first side surface 455 of the pressing portion 441 and the second side surface 456 of the abutting portion 442 are arranged oppositely, and the first side surface 455 and the second side surface 456 are approximately parallel. Furthermore, when the safety switch 421 is rotated to the second position, the restoring force of the biasing device 431 acts on the abutting portion 442 via the pressing portion 441, so that the safety switch 421 is positioned at the activation/starting position.

As shown in FIG. 137, when the first button 423 is in the first position, the second sliding button 428 touches against the second snapping portion 435 through a buckling portion 38, and the second button 438 is in the stopping position. Whereas, when the first button 423 is in the second position (as shown in FIG. 37), the second button 438 moves toward the first button 423, the biasing device 431 is compressed, the restoring force of the biasing device 431 acts on the second button 438, the pressing portion 441 touches against the abutting portion 442, so that the second button 438 is in the activation position.

Referring to FIG. 137, when the first button 423 rotates to the first position, that is, the first part 425 of the first button 423 rotates around the pivot shaft 424 and obliquely leans against the casing 422, the safety switch 421 is in a disabled/deactivated state. When the safety switch 421 is in a deactivated state before being activated, the safety switch 421 is at a start/initial position. That is, at the first position shown in FIG. 133 through FIG. 135, the second button 438 is in the stopping position.

Referring to FIG. 137, when the safety switch 421 of the disclosure is activated/started, the safety switch 421 can be switched from the stopping position to the starting position. In this process, an external force is applied firstly onto the first button 423 in the first position, the first sliding button 427 slides toward the first part 425 of the first button 423 and compresses the biasing device 431, and the end 443 of the pressing portion 441 is disengaged from the top end of the abutting portion 442. Furthermore, an external force is applied to the second button 438, so that the second part 426 rotates around the pivot shaft 424 toward the casing 422 until a stopping portion 458 of the second button 438 touches against the casing 422. In this case, the safety switch 421 reaches the starting position.

Finally, the external force applied to the second button 438 is stopped, the biasing device 431 stretches on its own restoring force and drives the second button 438 to move away from the first part 425 and further drives the first side surface 455 of the pressing portion 441 to touch against the second side surface 456 of the abutting portion 442. In this case, the safety switch 421 is in the activated state, which can be used to activate the power device of the electric engine/motor and provide power to the electric engine.

Referring to FIG. 137 and FIG. 138, when stopping the motor, the first part 425 of the first button 423 is pushed to rotate around the pivot 424 toward the casing 422, the first side surface 455 and the second side surface 456 are separated, and the biasing device 431 drives the second button 438 to move away from the first part 425. Finally, when the end 443 of the pressing portion 441 touches against the abutting portion 442, the safety switch 421 is in the stopping position and the motor stops working.

Therefore, the safety switch 421 of the disclosure is provided with the first button 423 and the second button 438. The second button 438 is controlled to slide during a using process to further control the first button 423 and the second button 438 to rotate with the pivot shaft 424 as an axis, so that the safety switch 421 is in the activated state. The safety switch 421 of the disclosure is activated/started by performing two different continuous control actions. Such arrangement makes the safety switch 421 of the disclosure to be fool-proof, and the accidental activation of the garden tool is avoided. Thus, garden tools using the safety switch 421 of the disclosure can have relatively good safety. The safety switch 421 of the disclosure can be applied to a robotic mower, a power mower, or any other garden tools suitable for using the safety switch 421.

In an embodiment of the disclosure, a method is provided for providing power to an engine of a garden tool. The garden tool is provided with the safety switch 421. The first button 423 can rotate between the first position and the second position with the pivot shaft 424 as an axis. The second button 438 can slide between the stopping position and the starting position. Furthermore, the method of using the safety switch 421 specifically can include the following steps.

Step 1, press the first part of the first button of the safety switch to make it closer to the casing, in order to rotate the first button to the first position; Since the second button is located in the stopping position and touches against the casing, the rotation of the first button toward the second position is restricted.

Step 2: slide the second button to compress the biasing device, and separate the second button from the casing.

Step 3: downwardly press the second button so that the first button rotates around the pivot shaft from the first position to the second position, and the second button slides from the stopping position to the starting position under the effect of an elastic force from the biasing device.

Step 4: place the safety switch in the starting state, which allows the activation of the power plant/device and starting of the engine.

Referring to FIG. 140 through FIG. 142, a light guide member 690 is provided in the disclosure and used for guiding light. In the disclosure, the light guide member 690 is substantially in a cylindrical shape, and can include a light guide portion 683, a light output portion 680, and a light incident portion 691 respectively provided at two ends of the light guide portion 683 in an extending/lengthwise direction.

As illustrated in FIG. 140 through FIG. 142, the light output portion 680 is arranged at the front end of the light guide portion 683 along the extending direction of the light guide portion 683. The light incident portion 691 is arranged opposite to the light output portion 680 and is located at the tail/rear end of the light guide portion 683 in the extending direction. In an embodiment of the disclosure, the light guide portion 683, the light output portion 680, and the light incident portion 691 are integrally constructed (i.e., one-piece structure). In other embodiments of the disclosure, the light guide portion 683, the light output portion 680, and the light incident portion 691 can be separately manufactured.

Referring to FIG. 140 through FIG. 142, the light guide portion 683 is further provided with guiding parts 688 and a snapping part 686 formed along the extending direction. The guiding parts 688 and the snapping part 686 are staggered along the circumferential direction of the light guide portion 683. In the disclosure, the guiding parts 688 are used to guide the light guide member 690 to fit with other structure and used to prevent a relative rotation between the light guide member 690 and the other structure, thereby ensuring the stability of the light guide member 690 fitting with the other structure.

As illustrated in FIG. 140 through FIG. 142, the guiding parts 688 are provided on an outer wall surface of the light guide portion 683 and are formed extending outwards along a radial direction of the light guide portion 683. Furthermore, the guiding part 688 extends from the tail end of the light guide portion 683 along the extending direction of the light guide portion 683. In the extending direction of the light guide portion 683, ends of the guiding part 688 are located below the light output portion 680.

As shown in FIG. 140 through FIG. 142, the guiding part 688 is provided with a guiding structure 687 at an end of its extending direction, and the guiding structure 687 is formed by inclined guiding surfaces 685 arranged obliquely, so as to make the light guide member 690 connecting with the other structure conveniently. In an embodiment of the disclosure, the guiding part 688 is substantially rectangular, the guiding structure 687 is formed by three inclined guiding surfaces 685, and each the inclined guiding surface 685 is a flat surface, so that the guiding structure 687 is roughly in a pyramid shape. In other embodiments of the disclosure, the inclined guide surface 685 can be in an arc shape, so that the guiding structure 687 is roughly in the shape of a bullet. That is, the specific setting form of the guiding structure 687 in the disclosure can be selected according to actual needs, without limiting herein.

As illustrated in FIG. 140 through FIG. 142, in an embodiment of the disclosure, there are two guiding parts 688 respectively provided on two sides of the extending direction of the light guide portion 683. The two guiding parts 688 is symmetrically arranged relative to a central axis of the light guide portion 683. In other embodiments of the disclosure, one or more than two guiding parts 688 may be provided instead, and when there are more than one guiding part 688, these guiding parts 688 are evenly distributed on the outer circumferential wall of the light guide portion 683. That is, the number and position of the guiding part 688 in the disclosure can be selected according to actual needs, as long as it can ensure that the guiding part(s) 688 can facilitate the fitting of the light guide member 690 with other structure and can prevent the occurrence of relative rotation between the light guide member 690 and the other structure.

As illustrated in FIG. 140 through FIG. 142, the snapping part 686 is arranged close to the tail end of the light guide portion 683 to limit a displacement of the light guide part 690 in a connecting direction when the light guide member 690 is connected to other structure, and to prevent the light guide member 690 from detaching from the other structure. In an embodiment of the disclosure, there is a snapping gap 689 between the snapping part 686 and the tail end of the light guide portion 683. The setting of the snapping gap 689 can facilitate the fitting of the light guide member 690 with the other structure. Furthermore, the snapping part 686 can include a guiding surface 686*b* arranged obliquely and an abutting surface 686*a* arranged perpendicular to the extending direction. When the light guide member 690 is connected to the other structure, the abutting surface 686*a* touches against the other structure, so as to fix the connection position of the light guide member 690 with the other structure.

Referring to FIG. 140 through FIG. 142, the light output portion 680 can include a light-emitting surface 682 and a light blocking wall 681 disposed around the light-emitting surface 682. Specifically, the light output portion 680 is formed by being recessed from the front end of the light guide portion 683 toward the tail end. In other words, the light output portion 680 is formed by the outer circumferential surface of the light guide portion 683 extending along the extending direction in a manner of facing away from the tail end of the light guide portion 683, so that an edge of the light blocking wall 681 is located above the light-emitting surface 682. In the disclosure, the light-emitting surface 682 is a flat surface to realize a linear transmission of light. Furthermore, when the light-emitting surface 682 is configured as a concave/convex surface, the light-emitting surface 682 can be used to realize the convergence/divergence of light, so as to transmit the light to a place that needs to be illuminated.

As shown in FIG. 141, the light incident portion 691 is provided in a groove shape and is recessed from the tail end to the front end of the light guide portion 683, and is further used for accommodating a light-emitting element. In the disclosure, the light-emitting element can be indicator lamp, an LED and other component used for light-emitting. Furthermore, the light guide member 690 can conduct/guide the light emitted from the light-emitting element through the light guide portion 683 and achieve the exporting and transmission of the light through the light output portion 680.

As shown in FIG. 140 through FIG. 142, the light guide member 690 can further include a sealing member 684 arranged at the front end of the light guide portion 683, the light guide portion 683 is provided with a receiving groove 692 for receiving the sealing member 684, and the receiving groove 692 is located on the periphery of the light output portion 680. Specifically, the sealing member 684 and the receiving groove 692 both are ring-shaped, and the receiving groove 692 is recessed from a center line of the light blocking wall 681 to the tail end of the light guide portion 683. Such arrangement facilitates the connection of the sealing member 684 with the light output portion 680 on the one hand, and can improve the sealing performance when the light guide member 690 is connected to other structure on the other hand. In one embodiment, an inner wall surface of the receiving groove 692 is sloped so as to further improve the sealing performance of the light guide member 690 connected with the other structure.

As illustrated in FIG. 140 through FIG. 142, the light guide member 690 is provided with the guiding part(s) 688 and the snapping part 686 for positioning and connecting the light guide member 690 with other structure, which effectively improves the stability of connection between the light guide member 690 and the other structure. Meanwhile, the arrangement of the sealing member 684 improves the sealing performance of the light guide member 690 connected with the other structure, thereby effectively preventing rainwater from entering the other structure along a gap between the light guide member 690 and the other structure when the light guide member 690 is connected to the other structure.

Referring to FIG. 143, a mower provided by the disclosure can include a first casing 641 and a second casing 642 snapped/engaged with each other, a driving unit 695 and a power supply 693 housed between the first casing 641 and the second casing 642, and a working unit 694 for performing garden work tasks. The power supply unit 693 is used to provide power to the driving unit 695, and the driving unit 695 is used to drive the working unit 694 to complete corresponding garden work tasks.

Referring to FIG. 144 through FIG. 146, the first casing 641 is provided with a lamp receiving groove 696, an indicator lamp 697 corresponding to the lamp receiving groove 696, and the light guide member 690 accommodated in the lamp receiving groove 696. The light guide member 690 guides light emitted from the indicator lamp 697 from inside of the first casing 641 to outside of the first casing 641. Further, the lamp receiving groove 696 can include guiding slots 696a for holding the light guide member 690 and a holding slot 696b for positioning a connection position of the light guide member 690 with the lamp receiving groove 696.

Referring to FIG. 144 through FIG. 146, the guiding parts 688 of the light guide member 690 are received in the guiding slots 696a and can slide along the guiding slots 696a to realize the fitting between the light guide member 690 and the lamp receiving groove 696, which facilitates the light guide member 690 to be inserted into the first casing 641 on the one hand, and can prevent a relative rotation between the light guide member 690 and the lamp receiving groove 696 on the other hand. The stability of the connection between the light guide member 690 and the lamp receiving groove 696 is thereby ensured.

Referring to FIG. 144 through FIG. 146, after the light guide member 690 slides into the lamp receiving groove 696, the abutting surface 686a of the snapping part 686 touches in the holding slot 696b to prevent the light guide member 690 from being separated from the lamp receiving groove 696. Further, the guiding parts 688 and the guiding slots 696a correspond to each other, and the snapping part 686 and the holding slot 696b are arranged in one-to-one correspondence. There are guiding parts 688 arranged corresponding to the guiding slots 696a, and the snapping part 686 arranged corresponding to the holding slot 696b.

As illustrated in FIG. 144 through FIG. 146, the circumferential edge of the lamp receiving groove 696 is further provided with an abutting groove 696c for accommodating the light blocking wall 681. The sealing member 684 is interposed between the light blocking wall 681 and the abutting groove 696c, and is accommodated between the abutting groove 696c and the receiving groove 692. Such arrangement can enable the sealing member 684 to close a connection gap between the lamp receiving groove 696 and the light guide member 690, thereby ensuring the airtightness of the mower.

Referring to FIG. 143 through FIG. 146, the indicator lamp 697 is used for status indication. There may be multiple indicator lamps 697, and the multiple indicator lamps 697 can independently emit lights. Further, the first casing 641 is provided with a display panel 695 covering the lamp receiving grooves 696, and the display panel 695 is provided with display areas (not shown) set in one-to-one correspondence with the lamp receiving grooves 696 and the indicator lamps 697. By way of bright/dark states of the display areas, working states of the mower can be determined.

As illustrated in FIG. 143 through FIG. 146, the light guide member 690 of the disclosure is provided with the guiding part(s) 688 and the snapping part 686, so that the light guide member 690 can be firmly connected to the first casing 641 of the mower. The setting of the sealing member 684 makes the light guide member 690 be tightly connected with the upper casing of the mower, which prevents rainwater from entering the mower at the connection position of the light guide member 690 with the first casing 641, and effectively improves waterproof performance and use safety of the mower which uses the light guide member 690 to guide out the light emitted from the indicator lamp 697.

Referring to FIG. 147 through FIG. 153, in the disclosure, a light guide member 700 is also provided to seal the indicator lamp on an equipment and guide out light emitted by the indicator lamp. A material of the light guide member 700 may be a light conductive material. In an embodiment of the disclosure, the light conductive material may be a polycarbonate (PC) material. The light guide member 700 can include a light incident portion 701 matched with the indicator lamp, a light output portion 702, and a light guide portion 706 connected to the light incident portion 701 and the light output portion 702. In the illustrated embodiment, the light incident portion 701, the light output portion 702, and the light guide portion 706 are integrally formed. In other embodiments, the light incident portion 701, the light output portion 702, and the light guide portion 706 may be individual structures.

A top surface of the light guide portion 706 is higher than a top surface of the light output portion 702, and the top surface of the light output portion 702 extends to the top surface of the light guide portion 706 and thereby forms an upward slope. Such arrangement can effectively prevent rainwater from entering into the casing of equipment along the light guide member 700, effectively seal the indicator lamp, and prevent the problem of damage to components inside the casing resulting from rainwater entering into the casing of equipment from a lamp receiving groove. In the illustrated embodiment, the top surface of the light incident portion 701 is higher than the top surface of the light guide portion 706; the top surface of the light incident portion 701, the top surface of the light guide portion 706 and the top surface of the light output portion 702 are coplanar, so that the light emitted by the indicator lamp can be guided out with maximum efficiency.

In other embodiments, the top surface of the light incident portion 701 can be set lower than the top surface of the light guide portion 706. In the illustrated embodiment, a width of the light guide member 700 along the B-B direction (as shown in FIG. 147) and a thickness along the A-A direction gradually increase along a direction from the light incident portion 701 to the light output portion 702. Such arrangement can effectively increase a light-emitting area of the light output portion 702, so that the user can easily observe the state of the indicator lamp. In other embodiments, the width of the light guide member 700 along the B-B direction and the thickness along the A-A direction can be set to be constant instead.

As shown in FIG. 147 and FIG. 148, an end of the light incident portion 701 facing away from the light guide portion 706 is matched with the indicator lamp, so as to collect light emitted from the indicator lamp. In one embodiment, an end of the light incident portion 701 facing away from the light guide portion 706 is disposed with a lighting cover (not shown), so as to improve light collection efficiency of the light incident portion 701. The light guide portion 706 connects the light incident portion 701 and the light output portion 702 and is used for guiding the light collected by the light incident portion 701 toward the light output portion 702. The light guide portion 706 is further provided with a mounting hole 707, and the light guide member 700 can be fixedly installed on the casing of equipment by a screw or a bolt. The mounting hole 707 may be a through hole or a blind hole.

The light output portion 702 can include a light-emitting surface 703 for guiding light out, and a side of the light-emitting surface 703 facing away from the light guide portion 706 protrudes outwards to form a convex surface. Such arrangement allows the user to observe the light emitted from the light output portion 702 in a wide range, and thus facilitates the user to observe the state of the indicator lamp. An end of the light output portion 702 facing away from the light guide portion 706 extends outwards to form a waterproof cap 704 that is matched with the casing of equipment so as to prevent rainwater from entering into a lamp receiving groove provided on the casing of equipment along the light guide member 700.

In the illustrated embodiment, the waterproof cap 704 and the light-emitting surface 703 are coplanar. In other embodiments, the waterproof cap 704 and the light-emitting surface 703 may not be coplanar. In additional embodiments, a diversion groove (not shown) may be provided on a side of the light output portion 702 to guide a small amount of rainwater that may be fallen between the waterproof cap 704 and the top surface of the light output portion 702 to the outside of the casing of equipment. In one embodiment, a side of the light output portion 702 is further provided with a limiting block 705 that matches with the casing of equipment, so as to prevent the light guide member 700 from being excessively inserted into the lamp receiving groove on the casing of equipment during an installation process, which would destroy the indicator lamp. The bottom of the limiting block 705 is further provided with a positioning protrusion 708 that matches with the casing of equipment and facilitates a quick positioning during installation.

Referring to FIG. 147 and FIG. 148, the light guide member 700 of the disclosure sets the top surface of the light guide portion 706 higher than the top surface of the light output portion 702, and an upward slope surface is formed from the top surface of the light output portion 702 to the top surface of the light guide portion 706. As a result, it can effectively prevent rainwater from entering the casing of equipment/device along the light guide member 700 and thereby effectively seal the indicator lamp and prevent rainwater from entering the casing of equipment from the lamp receiving groove.

Referring to FIG. 149 through FIG. 152, the disclosure also provides a charging device 709, which can include a bottom plate 710, a charging part 712 mounted on the bottom plate 710, an indicator lamp 722, a light guide member 700, and a boundary line (not shown).

As illustrated in FIG. 150 through FIG. 152, the bottom plate 710 is laid on the ground, and a number of fixing holes 711 are provided on the bottom plate 710, so that the bottom plate 710 can be fixedly installed on the ground by screws or bolts. The charging part 712 is fixedly installed on a side edge of the bottom plate 710 and is substantially perpendicular to the bottom plate 710. The charging part 712 can include a first side wall 713 facing toward a center of the bottom plate 710, a third side wall 718 disposed opposite to the first side wall 713, and a second sidewall 714 located on the first side wall 713 and the third side wall 718.

The first side wall 713, the second side wall 714, and third side wall 718 jointly define a receiving space for receiving electronic components and the indicator lamp 722 of the charging device 709. The first side wall 713 is provided with a lamp receiving groove 719 and a charging interface 720 matched with a device to be charged. The lamp receiving groove 719 is recessed inwardly from the first side wall 713 and connects with the indicator lamp/light 722, so that the indicator lamp 722 is located at the bottom of the lamp receiving groove 719. The bottom wall of the lamp receiving groove 719 is provided with a water guide/diversion hole 721 to guide water in the lamp receiving groove 719 to the outside of the lamp receiving groove 719.

It can be understood that a groove side wall and a groove top wall of the lamp receiving groove 719 can also be provided with water diversion holes as required. The side edge of the lamp receiving groove 719 is provided with a limiting groove 720 (as shown in FIG. 152) that matches with the limiting block 705, and the groove bottom wall of the limiting groove 720 is fitted with the positioning protrusion 708. The top of the charging part 712 is further provided with a rain shelter 715. The light guide member 700 is installed in the lamp receiving groove 719 and matches with the indicator lamp 722 to guide light emitted by the indicator lamp 722.

Meanwhile, the top surface of the light guide portion 706 is higher than the top surface of the light output portion 702, so that an upward slope is formed from the top surface of the light output portion 702 to the top surface of the light guide portion 706, and rainwater is effectively prevented from entering the lamp receiving groove 719 as well as the inside of the charging part 712 along the light guide member 700. The light emitting surface 703 is partially located on the first side wall 713 and partially located on the second side wall 714. Such arrangement can facilitate the user to observe the state of the indicator lamp 722 in a wider range.

Please refer to FIG. 150, an intersection of the first side wall 713 and the second side wall 714 is provided with a fixing hole 716 connecting with the mounting hole 707, so that the screw 717 passes through the fixing hole 716 and the mounting hole 707 and causing the light guide member 700 to be fixedly installed on the charging part 712. In the illustrated embodiment, the waterproof cap 704 directly touches against the first side wall 713 as well as the second side wall 714 and protrudes out of the charging part 712. In other embodiments, a receiving groove (not shown) for receiving the waterproof cap 704 may be provided on the periphery of the lamp receiving groove 719. The boundary line is electrically connected to the charging device 709, and the indicator lamp 722 is used to display whether the boundary line and the charging device 709 are normally connected. In other embodiments, the indicator lamp 722 can also be used to display other states, for example, to display whether the device to be charged is fully charged.

Referring to FIG. 147 through FIG. 152, the disclosure also discloses a charging system including an electronic device (not shown) and a charging device 709 for charging the electronic device. The light guide member 700 of the disclosure can seal the indicator lamp and guide the light emitted by the indicator lamp, thereby effectively preventing rainwater from entering the inside of the casing of device from the lamp receiving groove and causing damage to the components inside the casing.

In summary, the control assembly is for example but not limited to a single-chip microcomputer (also referred to MCU) or a processor module, and can control various mechanisms to perform different working processes through corresponding driving circuits. For example, the airtightness of the housing can be detected through the airtight nozzle on the housing, and then the air filter hood can be used to ensure that the mower maintaining the air pressure balance in the housing during the working process, and thereby ensures the normal working condition of mower. In another example, the height of the blade carrier disc is adjusted by the assisted height-adjustment assembly in the cutting mechanism, and the prime mover is controlled to rotate through the control assembly to drive the blade carrier disc to rotate correspondingly, which drives the blades for mowing.

In still another example, during working or moving of the mower, the relative displacement between the movable upper cover and the housing in the vertical direction is detected by the suspension-lift detection assembly in the detecting mechanism, so that when a relative displacement in the vertical direction occurs between the movable upper cover and the housing, a current signal change is produced/generated and sent to a control module or its connected current sensor to regulate the working state of the mower (such as stopping the mowing action or stopping the moving action). When the mower is working or moving, a relative displacement between the movable upper cover and the housing in the horizontal direction is detected by the collision detection assembly in the detecting mechanism, so that when the relative displacement in the horizontal direction occurs between the movable upper cover and the housing, a current signal change is generated and delivered to a control module or its connected current sensor to regulate the working status of the mower (such as stopping the mowing action or stopping the moving action).

The suspension-lift detection assembly and the collision detection assembly are set independently to respectively detect the relative displacement in the vertical direction and the relative displacement in the horizontal direction between the movable upper cover and the housing, which can effectively reduce false triggering. In even still another example, the wheel cover trim can be detached and replaced on the traveling/walking wheel, which can achieve the purpose of changing the color of the traveling wheel. In the disclosure, the above working processes can be implemented individually or in combination, so that the mower can meet different functional or design requirements.

The above embodiments are only used to illustrate the technical solutions of the disclosure and not construed as limiting. Although the disclosure can include been described in detail with reference to the preferred embodiments, those of ordinary skill in the art should understand that the technical solutions of the disclosure can be modified or equivalently replaced without departing from the spirit and scope of the technical solution of the disclosure.

What is claimed is:

1. A mower comprising:
    a case,
    a charging circuit, provided in the case, and
    a combination of a wheel assembly and a charging interface assembly, arranged on the case,
    wherein the combination includes:
    a wheel assembly, and
    a charging interface assembly, electrically connected to the charging circuit,
    wherein the wheel assembly is fixed to the charging interface assembly, the charging interface assembly is connected to the case, and thereby the wheel assembly and the charging interface assembly are an integrated structure mounted onto the case.

2. The mower according to claim 1, wherein
the mower further includes a driving wheel assembly, a functional assembly or a power supplying assembly, and
the driving wheel assembly, the functional assembly or the power supplying assembly is installed on the case.

3. The mower according to claim 2, wherein
the case comprises a lower case and an upper case,
the upper case is movably connected to the lower case,
a cavity is formed between the upper case and the lower case, and
the functional assembly and the power supplying assembly are partially received in the cavity.

4. The mower according to claim 1, wherein
the case is provided with a receiving portion for receiving the combination, and
the receiving portion is provided at the front or bottom of the case.

5. The mower according to claim 1, wherein
the charging interface assembly comprises a charging socket and a charging interface provided on the charging socket, and
the charging socket and the wheel assembly are integrated molding structure.

6. The mower according to claim 5, wherein
the charging interface includes charging terminals, and
the charging terminals include at least a pair of guiding pieces.

7. The mower according to claim 5, wherein
the charging interface assembly is provided with a fixing component for fixing with the case, and
the fixing component is provided on the charging socket.

8. The mower according to claim 5, wherein
the case is provided with a cover shielding the charging interface assembly, and
the charging interface assembly and the cover are provided with an opening portion.

9. The mower according to claim 5, wherein
the charging interface assembly further includes a charging seal, and
the charging seal has a cable hole for a charging cable passing therethrough.

10. The mower according to claim 9, wherein
the charging seal is a thread structure.

11. The mower according to claim 10, wherein
the charging socket is provided with a cable positioning groove, and
the cable positioning groove extends from the charging seal to the charging interface.

12. The mower according to claim 1, wherein
the wheel assembly includes a supporting wheel, a wheel shaft, and a wheel mounting base, and
the wheel mounting base and the charging interface assembly are integrated molding structure.

13. The mower according to claim 12, wherein
the wheel mounting base has a hole extending from top to down direction, and
the wheel shaft is fixed in the hole.

14. The mower according to claim 12, wherein
the supporting wheel comprises a first half wheel and a second half wheel, and
the first half wheel and the second half wheel are engaged with each other to form a receiving cavity for receiving the wheel shaft.

15. The mower according to claim 14, wherein
the wheel assembly further comprises an axle positioning component and a seal component.

16. The mower according to claim 15, wherein
the seal component includes a first seal and a second seal,
the first half wheel and the wheel shaft form a first mating gap,
the first half wheel and the second half wheel form a second mating gap,
the first seal component is used to seal the first mating gap, and
the second seal is used to seal the second mating gap.

17. A charging system for a mower, the system comprises
a mower and a charging station for charging the mower, characterized in that, the mower comprising:
a case,
a charging circuit, provided in the case, and
a combination of a wheel assembly and a charging interface assembly, arranged on the case,
wherein the combination includes:
a wheel assembly, and
a charging interface assembly, electrically connected to the charging circuit,
wherein the wheel assembly is fixed to the charging interface assembly, the charging interface assembly is connected to the case, and thereby the wheel assembly and the charging interface assembly are an integrated structure mounted onto the case.

18. A combination of a wheel assembly and a charging interface assembly provided on a mower, the mower comprises
a case and a charging circuit, characterized in that, the combination comprising:
a wheel assembly, and
a charging interface assembly, electrically connected to the charging circuit,
wherein the wheel assembly is fixed to the charging interface assembly, the charging interface assembly is connected to the case, and thereby the wheel assembly and the charging interface assembly are an integrated structure mounted onto the case.

19. The combination according to claim 18, wherein
the wheel assembly includes a supporting wheel, a wheel shaft, and a wheel mounting base, and
the wheel mounting base and the charging interface assembly are integrated molding structure.

20. The combination according to claim 18, wherein
the charging interface assembly comprises a charging socket and a charging interface provided on the charging socket, and
the charging socket and the wheel assembly are integrated molding structure.

* * * * *